(12) United States Patent
Liu et al.

(10) Patent No.: US 8,849,740 B2
(45) Date of Patent: Sep. 30, 2014

(54) RECRUITING SYSTEM

(75) Inventors: Simon Shuo Liu, Sydney (AU); Ruwantha Vidanaarachchi, Brunswick East (AU)

(73) Assignee: Ausgrads Pty Ltd, Sydney (AU)

( * ) Notice: Subject to any disclaimer, the term of this patent is extended or adjusted under 35 U.S.C. 154(b) by 373 days.

(21) Appl. No.: 13/011,837

(22) Filed: Jan. 21, 2011

(65) Prior Publication Data

US 2011/0313963 A1 Dec. 22, 2011

(30) Foreign Application Priority Data

Jan. 22, 2010 (AU) .............................. 2010900247

(51) Int. Cl.
*G06F 17/00* (2006.01)
*G06N 5/02* (2006.01)
*G06Q 10/06* (2012.01)

(52) U.S. Cl.
CPC .................................. *G06Q 10/06* (2013.01)
USPC ............................................ 706/48; 705/321

(58) Field of Classification Search
USPC .......................... 705/7.17, 320, 321; 706/48
See application file for complete search history.

(56) References Cited

U.S. PATENT DOCUMENTS

| | | | | |
|---|---|---|---|---|
| 7,945,522 B2 * | 5/2011 | McGovern et al. | ........... | 705/320 |
| 8,046,251 B2 * | 10/2011 | Scarborough et al. | ....... | 705/7.17 |
| 8,082,168 B1 * | 12/2011 | Judy | ............................. | 705/7.14 |
| 8,112,365 B2 * | 2/2012 | Foster | ........................... | 705/321 |
| 8,170,898 B2 * | 5/2012 | Shapiro et al. | ................ | 705/7.14 |
| 2002/0069080 A1 * | 6/2002 | Roy et al. | ........................... | 705/1 |
| 2005/0131756 A1 * | 6/2005 | Benson | .......................... | 705/11 |
| 2006/0229896 A1 * | 10/2006 | Rosen et al. | ..................... | 705/1 |
| 2006/0265270 A1 * | 11/2006 | Hyder et al. | ...................... | 705/9 |
| 2006/0277056 A1 * | 12/2006 | Broberg | ............................ | 705/1 |
| 2009/0299993 A1 * | 12/2009 | Novack | ............................. | 707/5 |
| 2009/0327013 A1 * | 12/2009 | McGovern et al. | .............. | 705/8 |
| 2010/0153289 A1 * | 6/2010 | Schneiderman et al. | ...... | 705/320 |
| 2011/0015958 A1 * | 1/2011 | April et al. | ......................... | 705/7 |
| 2012/0095931 A1 * | 4/2012 | Gurion et al. | ................. | 705/319 |
| 2012/0123957 A1 * | 5/2012 | Coleman | ........................ | 705/321 |
| 2012/0130915 A1 * | 5/2012 | Diaz et al. | ...................... | 705/321 |

OTHER PUBLICATIONS

CareerOne, CareerOne Pty Ltimited, [Retrieved Oct. 22, 2012]. Retrieved from the Internet <URL: http://www.careerone.com.au/>.
GradConnection, GradConnection, Inc., [Retrieved Oct. 22, 2012]. Retrieved from the Internet <URL: http://www.gradconnection.com.au/>.

(Continued)

*Primary Examiner* — Jeffrey A Gaffin
*Assistant Examiner* — Thomas Fink
(74) *Attorney, Agent, or Firm* — Davis Wright Tremaine LLP

(57) ABSTRACT

A recruiting system for use in determining suitability of at least one recruitment candidate for at least one job position, or suitability of at least one job position for at least one recruitment candidate, the system including at least one server configured to:
  access rule data representing:
    one or more rules associated with the position,
    at least one rule value for each rule, and
    one or more model attributes for each rule, the model attributes being associated with a model candidate for the position;
  access candidate data representing a candidate profile with one or more candidate attributes of the recruitment candidate;
  determine matching ones of the rules based on whether the candidate attributes match the model attributes of each rule; and
  generate data representing a matching metric value, representing the suitability of the recruitment candidate for the position, based on the rule values that correspond to the matching rules.

12 Claims, 38 Drawing Sheets

(56) References Cited

OTHER PUBLICATIONS

Lode, [Retrieved Oct. 22, 2012]. Retrieved from the Internet <URL: http://lode.com.au/welcome/>.
MyCareer, Fairfax Media, [Retrieved Oct. 22, 2012]. Retrieved from the Internet <URL: http://mycareer.com.au/>.
Seek, [Retrieved Oct. 22, 2012]. Retrieved from the Internet <URL: http://www.seek.com.au/>.
Unigrad, unimail Pty Ltd., [Retrieved Oct. 22, 2012]. Retrieved from the Internet <URL: http://www.unigrad.com.au/home/>.

* cited by examiner

| LookupTable |
|---|
| +lookupTableName(lookup_id:unsigned int): string |
| +lookupTableID(table_name:string): unsigned int |
| +addLookupTable(table_name:string): unsigned int |
| +getLookupValue(lookup_id:unsigned int, value_id:unsigned int): string |
| +getLookupValues(lookup_id:unsigned int): List<string> |
| +getLookupID(lookup_id:unsigned int, value:string): unsigned int |
| +addLookupValue(lookup_id:unsigned int, value:string) |
| +lookupLocationName(location_id:unsigned int): string |
| +lookupLocationID(location_name:string): unsigned int |
| +lookupResidencyName(residency_id:unsigned int): string |
| +lookupResidencyID(residency_name:string): unsigned int |

Figure 43

FieldType

+SINGLE_INTEGER
+SINGLE_STRING
+SINGLE_DATE
+SINGLE_BOOL
+SINGLE_DOUBLE
+SINGLE_LOOKUP_CONFINED
+SINGLE_LOOKUP_OTHER
+MULTI_INTEGER
+MULTI_STRING
+MULTI_DATE
+MULTI_DOUBLE
+MULTI_LOOKUP_CONFINED
+MULTI_LOOKUP_OTHER
+SPECIAL

Field

-is_field: bool
  *if "is_field" == true (i.e. field), we have field_id and module_id*
  *if "is_field" == false (i.e. subfield), we have subfield_id and subrecord_id*
-id: unsigned int
  *Either field_id or subfield_id*
-parent_id: unsigned int
  *Either module_id or subrecord_id*
-name: string
-mandatory: bool
-lookup_id: unsigned int
  *Only used and non-zero if "type" == SINGLE_LOOKUP_CONFINED,*
  *SINGLE_LOOKUP_OTHER, MULTI_LOOKUP_CONFINED, or MULTI_LOOKUP_OTHER*
-type: FieldType +Field(is_field:bool, parent_id:unsigned int,
       name:string, mandatory:bool, type:FieldType)
  *New field/subfield definition, Type not equal to SINGLE_LOOKUP_CONFINED,*
  *SINGLE_LOOKUP_OTHER, MULTI_LOOKUP_CONFINED, or MULTI_LOOKUP_OTHER*
+Field(is_field:bool, parent_id:unsigned int,
       name:string, mandatory:bool, type:FieldType)
  *New field/subfield definition, Type == SINGLE_LOOKUP_CONFINED,*
  *SINGLE_LOOKUP_OTHER, MULTI_LOOKUP_CONFINED, or MULTI_LOOKUP_OTHER*
-Field(is_field:bool, id:unsigned int, parent_id:unsigned int,
       name:string, mandatory:bool, type:FieldType)
  *Existing field/subfield definition, Type not equal to SINGLE_LOOKUP_CONFINED,*
  *SINGLE_LOOKUP_OTHER, MULTI_LOOKUP_CONFINED, or MULTI_LOOKUP_OTHER*
-Field(is_field:bool, id:unsigned int, parent_id:unsigned int,
       name:string, mandatory:bool, lookup_id:unsigned int, type:FieldType)
  *Existing field/subfield definition, Type == SINGLE_LOOKUP_CONFINED,*
  *SINGLE_LOOKUP_OTHER, MULTI_LOOKUP_CONFINED, or MULTI_LOOKUP_OTHER*
+isField(): bool
+getID(): unsigned int
+getParentID(): unsigned int
+getName(): string
+setName(name:string)
+isMandatory(): bool
+getLookupID(): unsigned int
+getType(): FieldType
+loadField(field_id:unsigned int): Field
+loadSubfield(subfield_id:unsigned int): Field
+removeField(field_id:unsigned int)
+removeSubfield(subfield_id:unsigned int)
+getFieldLookupID(field_id:unsigned int): unsigned int
+getSubfieldLookupID(subfield_id:unsigned int): unsigned int
+addToDatabase()
+updateToDatabase()

Figure 44

| SiteConstants |
|---|
| +SPECIAL_NUM_JOBS_FIELD_ID: unsigned int |
| +SPECIAL_NUM_JOBS_TYPE: ValueType = INTEGER |
| +SPECIAL_TOTAL_PERIOD_FIELD_ID: unsigned int |
| +SPECIAL_TOTAL_PERIOD_TYPE: ValueType = INTEGER |
| +INTERNATIONAL_STUDENT_VALUE_ID: unsigned int |
| +RESIDENCY_STATUS_FIELD_ID: unsigned int |
| +IELTS_MODULE_ID: unsigned int |
| +WORK_ENTRY_SUBRECORD_ID: unsigned int |
| +START_DATE_SUBFIELD_ID: unsigned int |
| +END_DATE_SUBFIELD_ID: unsigned int |
| +CITY_OF_RESIDENCE_FIELD_ID: unsigned int |
| +RELOCATION_CITIES_FIELD_ID: unsigned int |
| +MAJORS_SUBFIELD_ID: unsigned int |
| +MINORS_SUBFIELD_ID: unsigned int |
| +COMPLETION_DATE_FIELD_ID: unsigned int |
| +TEMP_DIRECTORY: string = "/tmp" |
| +LOGO_WIDTH: unsigned int = 300 |
| +LOGO_HEIGHT: unsigned int = 300 |
| +BANNER_VERTICAL_WIDTH: unsigned int = 160 |
| +BANNER_VERTICAL_HEIGHT: unsigned int = 600 |
| +BANNER_HORIZONTAL_WIDTH: unsigned int = 600 |
| +BANNER_HORIZONTAL_HEIGHT: unsigned int = 160 |

PositionRules
*Used when creating new or removing existing graduate job positions only.*
*For displaying graduate job positions, use the Position class.*

```
-position: Position
-rules: List<Rule>
+PositionRules(position:Position,rules:List<Rule>)
+getPosition(): Position
+getRules(): List<Rule>
+removePositionRules(position_id:unsigned int)
+addToDatabase()
+updateToDatabase()
```

BasicPositionRules
*For use by the matching algorithm only.*

```
-position_id: unsigned int
-rules: List<Rule>
+BasicPositionRules(position_id:unsigned int,
                    rules:List<Rule>)
+getPositionID(): unsigned int
+getRules(): List<Rule>
+loadBasicPositionRules(position_id:unsigned int): BasicPositionRules
```

Figure 49

| MatchingAlgorithm |
|---|
| -MAX_STUDENT_RESULTS: unsigned int |
| +matchPositions(student_id:unsigned int): List<MatchResult><br>-matchPositionsHeuristics(student_profile:StudentProfile): List<unsigned int><br>-getDateValue(student_profile:StudentProfile,<br>    field_id:unsigned int): Date<br>-getLookupValue(student_id:unsigned int,<br>    field_id:unsigned int): unsigned int<br>-getLookupValues(student_id:unsigned int,<br>    field_id:unsigned int): List<unsigned int><br>-getLookupSubvalues(student_id:unsigned int,<br>    subfield_id:unsigned int): List<unsigned int><br>-mergeLists(list1:List<unsigned int>,list2:List<unsigned int>): List<unsigned int><br>+matchStudents(position_id:unsigned int): List<MatchResult><br>-matchStudentsHeuristics(pos_rules:BasicPositionRules): List<unsigned int><br>-isFilledIn(rules:List<Rule>,field_ids:List<unsigned int>,<br>    subfield_ids:List<unsigned int>): bool<br>-applyHighestWeightedRules(rules:List<Rule>,<br>    students:List<unsigned int>): List<unsigned int><br>-applyNPredicates(predicates:List<ValuePredicate>,<br>    students:List<unsigned int>,<br>    num_rules:unsigned int): List<unsigned int><br>-generatePredicateSQL(predicate:ValuePredicate,<br>    students:List<unsigned int>): string<br>-generateListPredicateSQL(predicate:ListPredicate,<br>    students:List<unsigned int>): string<br>-generateTernaryPredicateSQL(predicate:TernaryPredicate,<br>    students:List<unsigned int>): string<br>-generateBinaryPredicateSQL(predicate:BinaryPredicate,<br>    students:List<unsigned int>): string<br>-getOperatorString(operator:OperatorType): string<br>-getValueString(value:Value): string<br>-generateList(int_list:List<unsigned int>): string<br>-generateStringList(str_list:List<string>): string<br>-evaluateRules(student_profile:StudentProfile,<br>    pos_rules:BasicPositionRules): MatchResult<br>-evaluatePredicate(student_profile:StudentProfile,<br>    predicate:Predicate,module_id:unsigned int): int<br>-evaluateValuePredicate(student_profile:StudentProfile,<br>    predicate:ValuePredicate): int<br>-evaluateValue(value:Value,predicate:ValuePredicate): bool<br>-evaluateImpliesPredicate(student_profile:StudentProfile,<br>    predicate:ImpliesPredicate,<br>    module_id:unsigned int): int<br>+matchBreakdown(student_id:unsigned int,<br>    position_id:unsigned int): Map<unsigned int,<br>    MatchResult> |

| MatchResult |
|---|
| -student_id: unsigned int<br>-position_id: unsigned int<br>-relevance: double<br>  0 <= "relevance" <= 1<br>-accuracy: double<br>  0 <= "accuracy" <= 1 |
| +MatchResult(student_id:unsigned int,position_id:unsigned int,<br>    relevance:double,accuracy:double)<br>+getStudentID(): unsigned int<br>+getPositionID(): unsigned int<br>+getRelevance(): double<br>+getAccuracy(): double<br>+getSuitability(): double |

Figure 51

Student Profile-Related Tables:
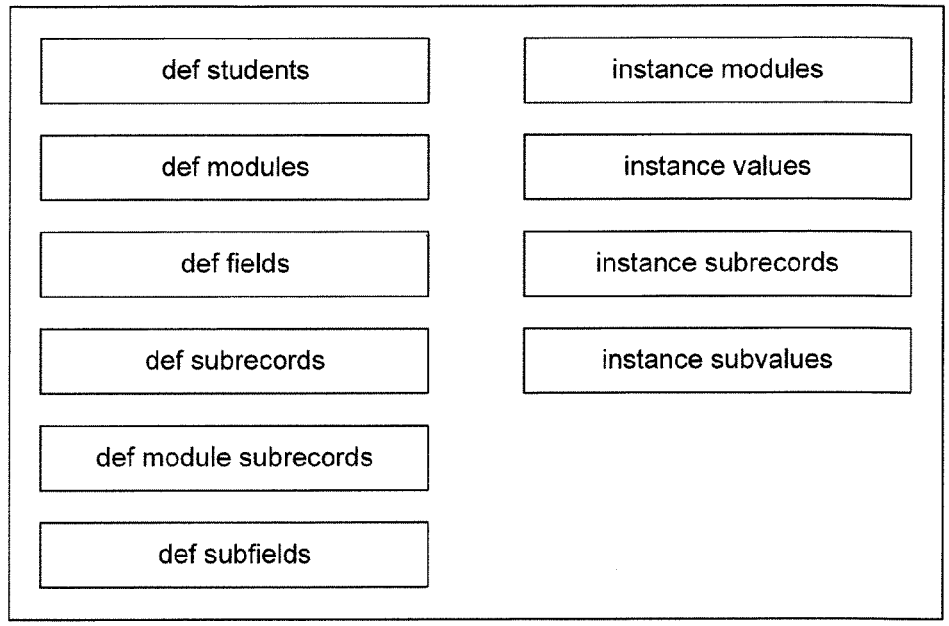
Employer-Related Tables:
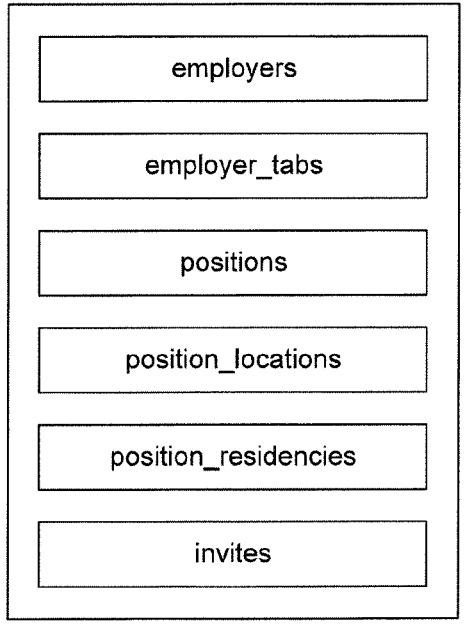
Rule-Related Tables:
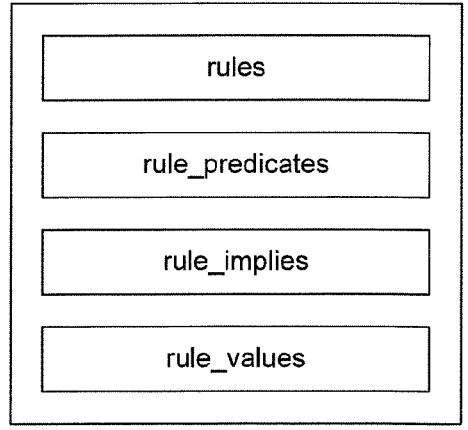
Figure 53

RECRUITING SYSTEM

CROSS-REFERENCE TO RELATED APPLICATIONS

The present application claims priority to Australian Patent Application No. 2010900247, filed on Jan. 22, 2010, which is incorporated herein by reference in its entirety.

FIELD

The present invention relates to recruiting systems, recruiting processes, and computer-readable media, e.g., for use in determining suitability of at least one recruitment candidate for at least one job position, or determining suitability of at least one job position for at least one recruitment candidate.

BACKGROUND

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In a modern economy, many people are searching for work (e.g., employment, jobs or positions), and many public and private recruiting entities (e.g., government bodies, corporations, partnerships, voluntary societies, recruitment agencies, etc.) are searching for people to do work (e.g., to be employed, do jobs or fill positions).

Finding work can be a time-consuming, difficult and stressful part of people's lives, especially for younger people, or people who are inexperienced in areas where they are searching for work. Inexperienced people can include new graduates (e.g., from a higher education course, a university course, a trade-related course, an apprenticeship, an undergraduate course, a research course, a community college, a technical school, etc.), or people newly arrived in a location or job market (e.g., immigrants from other countries, people moving to a new state, etc.). People can spend large amounts of time and money searching for the perfect position, or even finding a position that is acceptable.

Finding desirable, appropriate or even acceptable people to do work can also be a time-consuming, risky and expensive process for recruiting entities. Companies can spend large amounts of money and time in searching for and selecting appropriate job candidates: for example, much effort can be expended in human resource departments, recruitment agencies (or head hunting agencies), advertisements that positions are available, and promotions to attract job candidates.

It can be expensive, time consuming and difficult for a recruiter to determine a candidate's suitability for a position, or to determine and compare a plurality of candidates' strengths and weaknesses in respect of a given job. The decisions and comparisons can also be prone to human error (e.g., a recruiter's subjective opinion, or lapses in memory/judgement while reading a large number of résumés), e.g., when reading and trying to compare candidates' résumés. Existing recruiting systems and recruiting processes can fail to provide technical facilities that enable sufficiently convenient, efficient and error-free decision making in the processes of recruitment.

Some of the existing websites/systems catering for the Australian graduate recruitment market include: SEEK, MyCareer, CareerOne, GradConnection, LODE, and Unigrad.

SEEK, MyCareer, and CareerOne are the main job search engines that cater to the Australian recruitment market, with SEEK being the one with the highest market share. All three websites offer only a limited graduate recruitment service that predominantly caters for small organisations that recruit graduates on an ad-hoc basis. As such, they can fail to provide functions that allow for larger scale recruitment and ease of use. The responsibility for reviewing and filtering all received applications for suitability lies solely with the employer's recruitment staff, who can be overloaded for positions with many applicants, e.g., graduate recruitment programs.

GradConnection may provide candidates with a list of employers that meet their preferences by suggesting potential employers to candidates, graduates and prospective employees based on a limited set of lifestyle-related preferences specified by the employer (e.g.: that the employer allows graduates to use "Facebook" at work). However, the GradConnection website does not comprehensively determine the suitability of job candidates for a given position, and lacks tools for analysing job candidates' information.

LODE pools together résumés of graduates and candidates, allowing employers to headhunt/recruit directly from LODE's database. The responsibility of finding suitable applicants from within LODE's résumé database is placed on employers' recruiters. In addition, candidates may not be able to determine their suitability for a particular job position, or apply directly.

Unigrad publishes a graduate employers handbook annually and offers a graduate employer directory and graduate job listing service. In effect, Unigrad is a derivative of SEEK, MyCareer, and CareerOne that is targeted specifically at the graduate recruitment market.

It is desired to address or ameliorate one or more disadvantages or limitations associated with the prior art, or to at least provide a useful alternative.

SUMMARY

In accordance with the present invention there is provided a recruiting system for use in determining suitability of at least one recruitment candidate for at least one job position, or suitability of at least one job position for at least one recruitment candidate, the system including at least one server configured to:
  access rule data representing:
    one or more rules associated with the position,
    at least one rule value for each rule, and
    one or more model attributes for each rule, the model attributes being associated with a model candidate for the position;
  access candidate data representing a candidate profile with one or more candidate attributes of the recruitment candidate;
  determine matching ones of the rules based on whether the candidate attributes match the model attributes of each rule; and
  generate data representing a matching metric value, representing the suitability of the recruitment candidate for the position, based on the rule values that correspond to the matching rules.

The present invention also provides a recruiting process for use in determining the suitability of at least one recruitment candidate for at least one job position, or the suitability of at least one job position for at least one recruitment candidate, the process including:
  accessing rule data representing:
    one or more rules associated with the position,
    at least one rule value for each rule, and one or more model attributes for each rule, the model attributes being associated with a model candidate for the position;

accessing candidate data representing a candidate profile with one or more candidate attributes of the recruitment candidate;

determining matching ones of the rules based on whether the candidate attributes match the model attributes of each rule; and generating data representing a matching metric value, representing the suitability of the recruitment candidate for the position, based on the rule values that correspond to the matching rules.

The present invention also provides at least one computer-readable medium having stored thereon data which are used to generate a graphical user interface for recruiting that displays, to a user, one or more matching metric values representing suitability of at least one recruitment candidate for at least one job position, or suitability of at least one job position for at least one recruitment candidate, determined based on values of rules associated with each position, wherein each rule includes a predicate with rule attributes for matching attributes of the candidate.

The present invention also provides a recruiting system including at least one server configured to:

access data representing a plurality of available attributes associated with a model candidate in the recruiting system;

generate user interface data representing the available attributes for display to a user of a client computing device;

receive data representing a user selection of at least one model attribute of the available attributes, and a corresponding importance level of the model attribute;

generate data representing at least one rule that includes the model attribute and a corresponding rule value representing the importance level.

The present invention also provides a recruiting system including at least one server configured to:

access data representing a candidate profile including identification details and one or more candidate attributes of a recruitment candidate;

generate data representing a matching metric value, the matching metric value representing suitability of the recruitment candidate for a job position, determined based on at least one value of rules that include rule attributes matching the candidate attributes, the rule attributes being associated with a model candidate for the position; and generate user interface data representing the identification details and the corresponding matching metric value for the candidate.

In embodiments, the server is configured to determine the suitability of a plurality of candidates for one position, and/or the suitability of a plurality of positions for one candidate.

In embodiments, each rule includes a predicate used for matching the candidate attributes.

In embodiments, the matching metric value represents a ratio based on a comparison between: a combination of a plurality of matching values associated with a corresponding plurality of matching rules, and a combination of the values of the rules associated with the model candidate. In embodiments, the server is configured to: determine valid rules by selecting ones of the rules which have model attributes corresponding to portions of the candidate profile that are complete; generate data representing a raw matching score based on a combination of rule values of the matching ones of the valid rules; generate data representing a total matching score based on a combination of the rule values of the valid rules; and generate data representing the matching metric value using a comparison between the total matching score and the raw matching score. In embodiments, the server is configured to generate data representing a relevance score of the matching metric value using a comparison between the raw matching score and the total matching score. In embodiments, the server is configured to generate data representing an accuracy score of the matching metric value using a comparison between the number of valid rules and the total number of rules associated with the model candidate. In embodiments, the matching metric value is determined based on a combination of the relevance score and the accuracy score.

In embodiments, the server is configured to: for the rules associated with a given model candidate, determine valid rules by selecting ones of the rules which have model attributes corresponding to portions of the candidate profile that are complete; generate data representing a raw matching score based on a combination of rule values of the matching ones of the valid rules; generate data representing a total matching score based on a combination of the rules' values of the valid rules; generate data representing a relevance score of the matching metric value using a comparison between the raw matching score and the total matching score. In embodiments, the server is configured to generate an accuracy score of the matching metric value using a comparison between the number of valid rules and the total number of rules associated with the given model candidate. In embodiments, the matching metric value, otherwise known as the suitability score, is determined based on a combination of the relevance score and the accuracy score.

In embodiments, the one or more rules and the one or more attributes are selected based on their correspondence to a portion of the candidate profile, and the relevance score of the matching metric value represents the recruitment candidate's suitability in relation to that portion. In embodiments, the portion of the candidate profile can include at least a tertiary education portion, a secondary education portion, a work experience portion, a clubs-societies portion, an information-technology-skills portion, an achievements portion, or a languages portion.

The "portions" of the candidate profile can also be referred to as "modules" of the candidate profile.

In embodiments, the server is configured to generate user interface data for displaying the matching metric value as a corresponding fraction of a graphical object. In embodiments, the graphical object is a closed path, and the fraction corresponds to a fraction of length along the closed path. In embodiments, the fraction is represented by a line that starts at a top of the graphical object and extends around the graphical object in a clockwise direction. In embodiments, the closed path is a circular path and the fraction of length is an arc length. In embodiments, the closed path is a polygon-shaped path and the fraction of length follows the polygon-shaped path. In embodiments, the graphical object includes an outline, and the fraction corresponds to a filled fraction of the outline. In embodiments, the outline is a circular outline and the filled fraction starts at a top of the graphical object and extends around the graphical object in a clockwise direction. In embodiments, the server is configured to: receive data representing the candidate profile from a client computing device; and generate the user interface data dynamically as data representing each attribute in the candidate profile are received. In embodiments, the received data is based on data entered by a user of the client computing device, and the server is configured to send data to the client computing device to display the matching metric value once the data representing the candidate profile are entered.

In embodiments, the server is configured to generate user interface data for displaying a list of positions ranked in order of the respective matching metric values.

In embodiments, the server is configured to generate user interface data for displaying a list of candidate profiles ranked in order of the respective matching metric values.

Embodiments provide a recruiting system including a server configured to:
- access data representing a plurality of available attributes associated with a model candidate in the recruiting system;
- generate user interface data representing the available attributes for display to a user of a client computing device;
- receive data representing a user selection of at least one model attribute of the available attributes, and a corresponding importance level of the model attribute;
- generate data representing at least one model candidate rule that includes the model attribute and a corresponding model value representing the importance level.

In embodiments, the server is configured to access the data representing the available attributes in lookup table data in a computer database of the recruiting system.

Embodiments provide a recruiting system including a server configured to:
- access data representing a candidate profile including identification details and one or more attributes of a recruitment candidate;
- generate data representing a matching metric value, the matching metric value representing the recruitment candidate's suitability for a job position, determined based on at least one value of rules that include rule attributes matching the candidate profile's attributes, the rule attributes being associated with a model candidate for the position; and
- generate user interface data representing the identification details and the corresponding matching metric value for the candidate.

In embodiments, the components of the matching metric values (the accuracy and the relevance scores) are generated dynamically; they are not stored on disk/in a database.

In embodiments, the user interface data represent:
identifiers of portions of the candidate profile; and
respective portion matching metric values representing the recruitment candidate's suitability for the position based on the respective portions, determined based on at least one rule value of the rules that include rule attributes matching the candidate profile's attributes in the respective portions.

Embodiments provide a recruiting process for use in determining and ranking the suitability of at least one recruitment candidate for at least one job position, and vice versa, including:
- accessing rule data representing one or more rules associated with the position, each rule having a value and a model attribute associated with the model candidate for the position;
- accessing data representing a candidate profile that includes one or more candidate attributes of a recruitment candidate;
- for each rule, determining if that rule matches the recruitment candidate based on one of the candidate attributes matching that rule's model attribute; and
- generating data representing a matching metric value, representing the recruitment candidate's suitability for the position, based on one or more values of the one or more matching rules.

In embodiments, the process includes determining the suitability of a plurality of candidates for one position, and/or the suitability of a plurality of positions for one candidate.

In embodiments, the process includes: for the rules associated with a given model candidate, determining valid rules by selecting ones of the rules which have model attributes corresponding to portions of the candidate profile that are complete; generating data representing a raw matching score based on a combination of rule values of the matching ones of the valid rules; generating data representing a total matching score based on a combination of the rules' values of the valid rules; and generating data representing the relevance score of the matching metric value using a comparison between the total matching score and the raw matching score. In embodiments, the matching metric value (or "score") is determined based on a combination of the relevance score and the accuracy score. In embodiments, the process includes generating data representing an accuracy score of the matching metric value using a comparison between the number of valid rules and the total number of rules associated with the model candidate.

In embodiments, the process includes generating the user interface data dynamically as data representing each attribute in the candidate profile are received.

In embodiments, the process includes receiving data representing the candidate profile from a client computing device, wherein the received data is based on data entered by a user of the client computing device, the recruiting process including displaying the matching metric value once the data representing the candidate profile are entered.

In embodiments, the process includes generating user interface data for displaying a list of positions ranked in order of the respective matching metric values.

In embodiments, the process includes generating user interface data for displaying a list of candidate profiles ranked in order of the respective matching metric values.

Embodiments provide a recruiting process including:
- accessing data representing a plurality of available attributes associated with a model candidate in the recruiting process;
- generating user interface data representing the available attributes for display to a user of a client computing device;
- receiving data representing a user selection of at least one model attribute of the available attributes, and a corresponding importance level of the model attribute;
- generating data representing at least one model candidate rule that includes the model attribute and a corresponding model value representing the importance level.

In embodiments, the process includes accessing the data representing the available attributes in lookup table data in a computer database.

Embodiments provide a recruiting process including:
- accessing data representing a candidate profile including identification details and one or more attributes of a recruitment candidate;
- generating data representing a matching metric value, the matching metric value representing the recruitment candidate's suitability for a job position, determined based on at least one rule value of rules that include rule attributes matching the candidate profile's attributes, the rule attributes being associated with a model candidate for the position; and generating user interface data representing the identification details and the corresponding matching metric value for the candidate.

In embodiments, a recruiting system has components configured to execute the process. In embodiments, at least one tangible computer-readable medium has stored thereon one or more computer-executable modules configured for execution of the process.

Embodiments provide at least one computer-readable medium having stored thereon data representing a graphical user interface for recruiting that displays, to a user, one or more matching metric values representing at least one recruitment candidate's suitability for at least one position, determined based on values of rules associated with each position that include rule attributes matching attributes of the candidate.

Embodiments provide at least one computer-readable medium having stored thereon data which are used to generate a graphical user interface for recruiting that displays, to a user, one or more matching metric values representing at least one recruitment candidate's suitability for at least one position, determined based on values of rules associated with each position that include rule attributes matching attributes of the candidate.

BRIEF DESCRIPTION OF THE DRAWINGS

Preferred embodiments of the present invention are hereinafter further described, by way of example only, with reference to the accompanying drawings, wherein:

FIGS. 10 and 11 are example screen shots displayed in the candidate profile generation process;

FIGS. 12 to 26 are example screen shots displayed in the position and associated rules generation process;

FIG. 28 is an example screen shot displayed in the position matching process;

FIGS. 29 to 31 are example screen shots displayed in the candidate profile matching process;

FIGS. 32 to 42 are example screen shots displayed in a recruiter profile generation process of the recruitment process;

FIG. 43 is an unified modelling language (UML) diagram for the LookupTable class in an example embodiment of the recruiting system;

FIG. 44 is an UML diagram for the Field class and its associated FieldType enumeration in the example embodiment;

FIG. 46 is an UML diagram for the SiteConstants class in the example embodiment;

FIG. 47 is an UML diagram for the StudentProfile, Module Instance, SubrecordInstance, ModuleDefinition, and SubrecordDefinition classes in the example embodiment;

Figure 48:
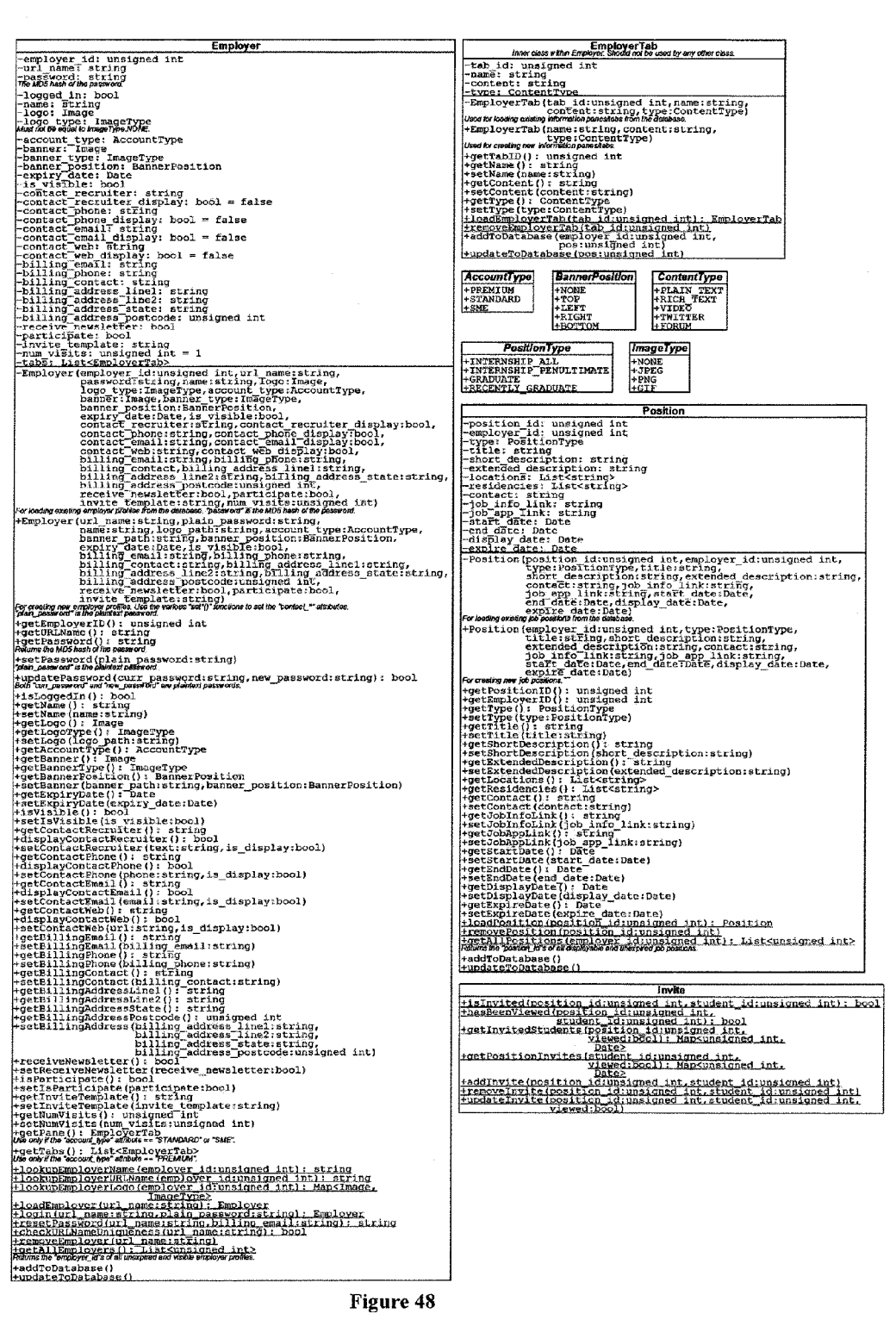

FIG. 48 is an UML diagram for the Employer, EmployerTab, Position, and Invite classes, and the AccountType, BannerPosition, ContentType, and ImageType enumerations in the example embodiment;

FIG. 49 is an UML diagram for the PositionRules and BasicPositionRules classes in the example embodiment;

FIG. 51 is an UML diagram for an example matching process of the example embodiment;

FIG. 53 is a block diagram of data structures of the example embodiment.

DETAILED DESCRIPTION

Overview

Figure 1:
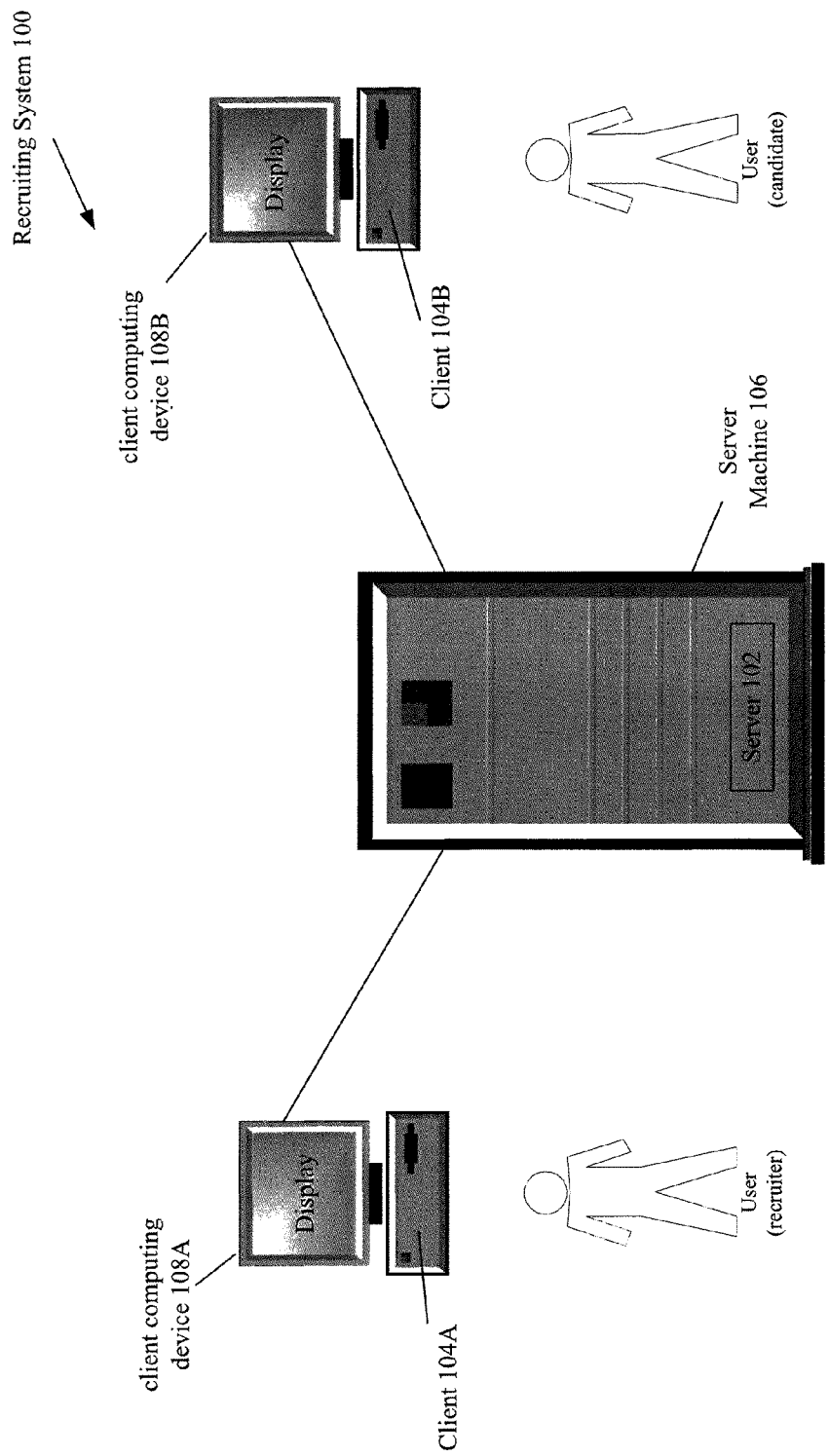
FIG. 1 is a schematic diagram of a recruiting system of embodiments of the present invention.

Recruitment refers to the process of finding one or more candidates suitable for jobs, which are also referred to as job positions. Each candidate is associated with information about the candidate in a candidate profile, which can be referred to as a résumé. Each résumé can have a number of sections or portions (e.g., for grouping related attributes in groups, such as for tertiary education, secondary education, work experience, other activities, etc.). These sections or portions are referred to as "modules" of the résumé or candidate profile. Each résumé has one or more attributes of the recruitment candidate: the attributes refer to characteristics, features or qualities of the candidate. The attributes can refer to general attributes (e.g., hair) that themselves have characteristics (e.g., red colour), or specific attributes or characteristics (e.g., having an average examination score above 78%).

The candidate can be a prospective worker, a recently graduated professional (e.g., having graduated in the past year, or two years or three years), a graduate, or an university student of all year levels. The job position can be a form of internship, co-op, graduate position, or a job position for recent graduates with limited work experience (e.g., specifically targeted towards senior university students and recent graduates).

A recruiting system 100 provides functionality for determining and comparing suitability of recruitment candidates (e.g., people applying for job positions, new graduates, prospective employees, etc.) for job positions (e.g., positions or jobs to fill, contracts for workers, employment opportunities, etc.), and vice versa. The recruiting system 100 provides matching functions, which allows the suitability for a recruitment candidate for a job position to be represented by a matching metric value, e.g., a score, a level, an alphanumeric quantity or a number, which quantifies the suitability. The matching metric is determined based on attributes of the candidate. The recruiting system 100 also provides the same functionality for determining and comparing the suitability of job positions for recruitment candidates. The attributes of the candidate are described in data representing the candidate's résumé, which is also referred to as a profile or curriculum vitae of the candidate.

The matching metric is determined based on rules which define an ideal, or model candidate for the position, where the model candidate is defined by the recruiter for that position (the recruiter may be the potential employer, an employment agency, a recruitment agency, etc.).

The rules specify required or desired attributes of the candidate by specifying a portion (also referred to as a "module") of the résumé, a predicate, and a value or level or weighting. A predicate is an expression that generates (or evaluates to) a Boolean value (e.g., true or false). The predicate specifies one or more fields in the module and a value or characteristic (e.g.: "university"), that is used when processing the contents of that field to generate a "yes" or "no" (Boolean) outcome for the rule. This is referred to determining whether the rule matches the candidate. The rule value of any matching rule is then used to determine the matching metric for that candidate and position combination.

The recruiting system 100 displays the matching metric value to users of the recruiting system using graphical devices, such as graphical indicators with circular graphs, which allow for efficient use of the recruiting system 100, and for rapid comparisons of the suitability between a plurality of candidates or a plurality of positions. The recruiting system 100 can also use the matching metric value for ranking candidates or positions.

The recruiting system 100 provides functionality for generating the rules, representing the model candidate, generating the résumés, and for viewing suitability metrics in association with representations of the résumés or the job positions.

Recruiting System 100

The recruiting system 100 includes a server 102, as shown in FIG. 1, which serves data to a plurality of clients 104A, 104B and receives data from these clients 104A, 104B in a client-server relationship. The server 102 operates in a server machine 106 which is a server computing device. The clients 104A, 104B operate in client computing devices 108A, 108B respectively. The clients 104A, 104B are in communication with the server 102 via digital communication links between the client computing devices 108A, 108B and the server machine 106, and these connections may include standard data communications connections, such as Ethernet and Internet links and networks. The server 102 can be, for example, a web server and the clients 104A, 104B can be web browsers (such as Microsoft's Internet Explorer, Apple's Safari, or Google's Chrome). The clients 104A, 104B receive data for displaying information to the system users, including one or more recruiters and one or more candidates. The users use the client computing devices 108A, 108B to enter and input information for sending data from the clients 104A, 104B to the server 102 during operation of the recruiting system 100.

Figure 2:
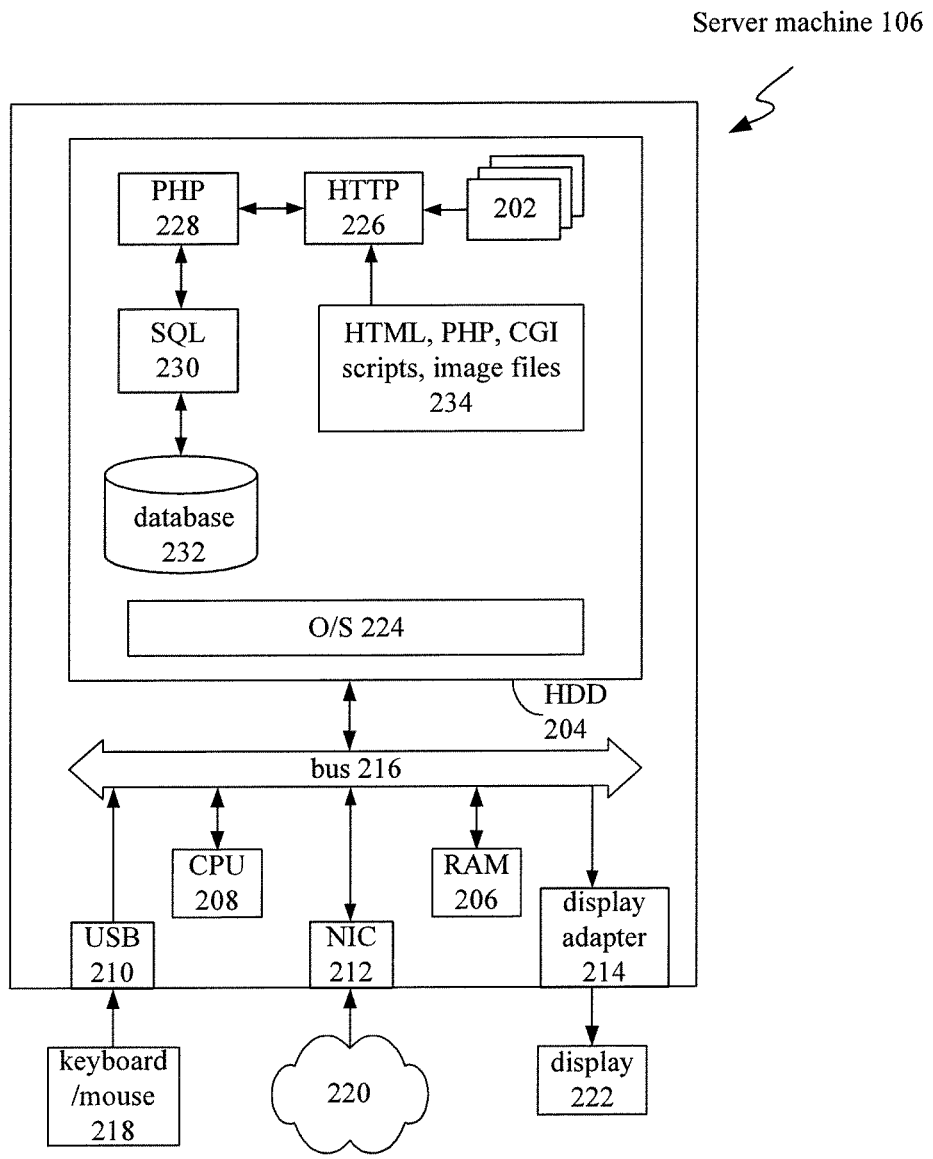
FIG. 2 is a block diagram of a server of the recruiting system.

In the described embodiment, the server machine 106 is a standard computer system such as an 32-bit or 64-bit Intel Architecture based computer system, as shown in FIG. 2, and the process 400 executed by the server machine 106 is implemented in the form of programming instructions of one or more software modules 202 stored on non-volatile (e.g., hard disk) storage 204 associated with the computer system, as shown in FIG. 2. Alternatively, at least parts of the software modules 202 could be implemented as one or more dedicated hardware components, such as application-specific integrated circuits (ASICs) and/or field programmable gate arrays (FPGAs).

The server machine 106 includes standard computer components, including random access memory (RAM) 206, at least one processor 208, and external interfaces all interconnected by a bus 216. The external interfaces include universal serial bus (USB) interfaces 210, at least one of which is connected to a keyboard and a pointing device such as a mouse 218, a network interface connector (NIC) 212 which connects the server machine 106 to a communications network such as the Internet 220, and a display adapter 214, which is connected to a display device such as an LCD panel display 222.

The server machine 106 also includes a number of standard software modules, including an operating system 224 such as Linux or Microsoft Windows XP, a web server 226 such as Apache, available at http://www.apache.org, scripting language support 228 such as PHP, available at http://www.php.net, or Microsoft ASP, and structured query language (SQL) support 230 such as PostgreSQL, available from http://www.postgresql.org, which allows data to be stored in and retrieved from an SQL database 232.

Together, the web server 226, scripting language 228, and SQL modules 230 provide the server machine 106 with the general ability to allow users of the Internet 220 with standard computing devices equipped with standard web browser software to access the server machine 106, and in particular to provide data to and receive data from the database 232.

However, it will be understood by those skilled in the art that the specific functionality provided by the server machine 106 to such users is provided by scripts accessible by the web server 226, including the one or more software modules 202 implementing the process 400, and also any other scripts and supporting data 234, including markup language (e.g., HTML, XHTML, XML) scripts, PUP (or ASP), JavaScript scripts, and/or CGI scripts, image files, CSS style sheets, and the like.

The boundaries between the modules and components in the software modules 202 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the server machine 106 may be executed by a module (of software modules 202) or a portion of a module. The processes may be embodied in a machine-readable and/or computer-readable medium for configuring a computer system to execute the method. The software modules may be stored within and/or transmitted to a computer system memory to configure the computer system to perform the functions of the module.

The server machine 106 normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process. Although described as a single computer system, the server machine 106 can be a plurality of computing system configured in a load-balanced server farm with redundant processes and databases, implementing the same functionality as the server machine 106.

Data Structures 300

Figure 3:
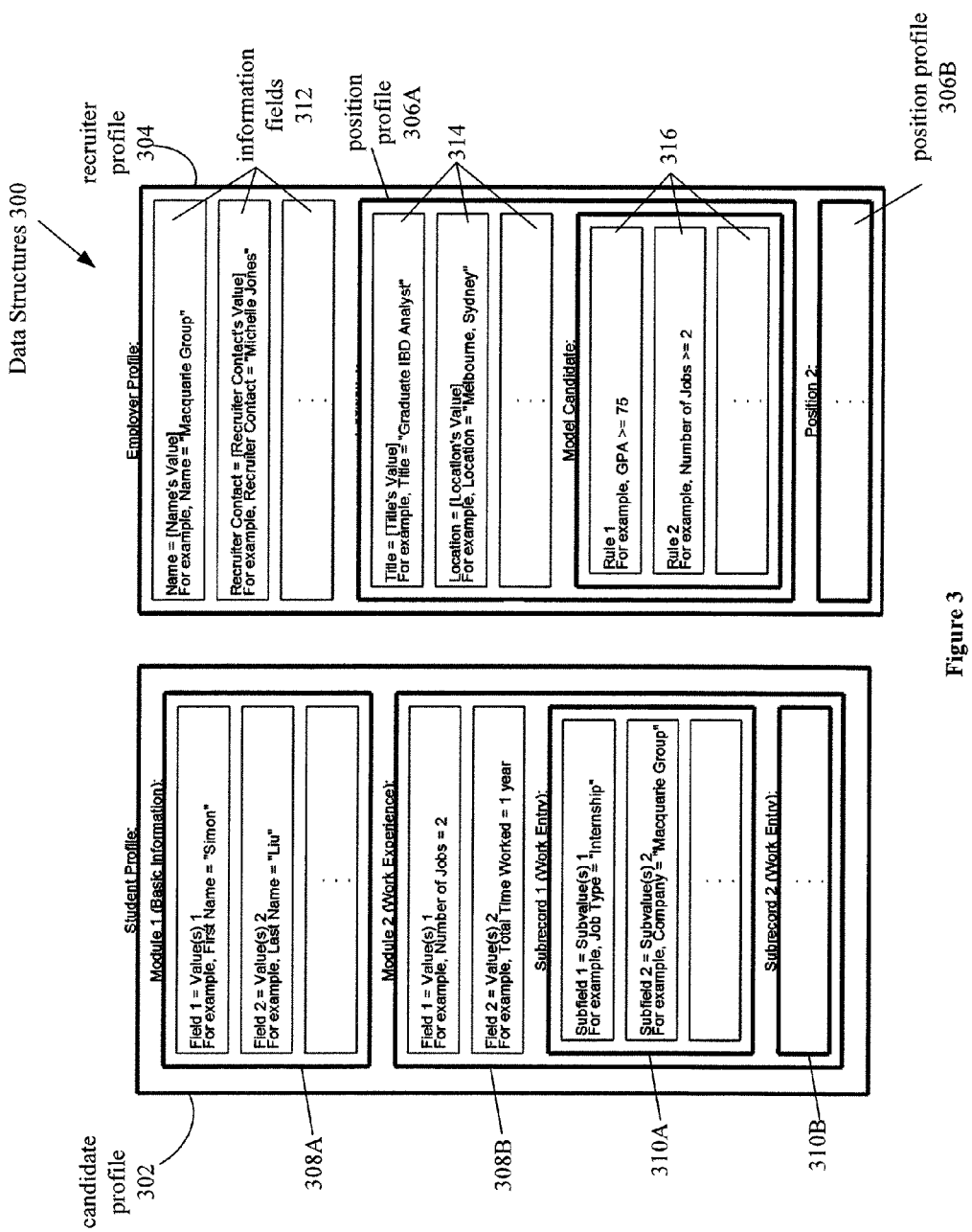
FIG. 3 is a block diagram of data structures of the recruiting system.

The database 232 stores data in data structures 300 which may be represented as at least one candidate profile 302 (also referred to as a résumé), and at least one recruiter profile 304, which includes a plurality of position profiles 306A, 306B, as shown in FIG. 3.

The candidate profile 302 includes a plurality of modules (also referred to as portions), with each module 308A, 308B corresponding to a portion of the candidate's résumé. For example, module 308A relates to basic information of the candidate, including a plurality of fields having values, such as a first name field having the value "Simon", and a last name field having the value "Liu". Module 308B can be a work experience module with a plurality of fields having values, such as a number of positions field with the value 2, and a total time worked field with the value 1 year. Each module may include a plurality of subrecords, each subrecord relating to its module, where the subrecords are smaller portions of the résumé than the modules. For example, subrecord 310A can be a work entry subrecord in the work experience module 308B, where the subrecord 310A includes a plurality of subfields, each with subvalues, such as the position type subfield with the subvalue "internship" and the company subfield with the subvalue "Macquarie Group". The candidate profile 302 includes information from the candidate's résumé describing the candidate's attributes and characteristics which are relevant for the recruitment system 100.

The recruiter profile 304 includes a plurality of information fields, 312, including data representing the name of the recruiter, the contact details of the recruiter, and general information about the recruiter. Each position profile, 306A, 306B includes general information about the position in position information fields 314, such as the title of the position and the locations of the position and a general description of the position. Each position profile 306A, 306B also includes model candidate rules 316 which define the model candidate associated with this position. In general, each job position is associated with exactly one model candidate, and vice versa. For example, the model candidate may be defined by a first rule requiring a grade point average (GPA) greater than or equal to 75, and a second rule may define the model candidate as having had a number of job positions equal to or greater than 2. The rules 316 of the model candidate specify requirements or criteria or attributes of the model candidate which relate to attributes in the fields and subfields of the candidate profile 302. For example, a rule 316 relating to the number of positions is associated with the number of positions in the work experience module 308B of the candidate profile 302.

By accessing the data in the candidate profile 302 and the recruiter profile 304, the recruiting system 100 can compare, rank, summarise and determine suitability of candidates defined in the candidate profile 302 for positions defined in the position profiles 306A, 306B, or vice versa.

Recruitment Process 400

The recruiting system 100 provides a recruitment process 400 to the users, who may be the recruiters or the candidates. The recruitment process 400 is performed by the server 102 in conjunction with at least one of the clients 104A, 104B and using data entered by the users.

Figure 4:
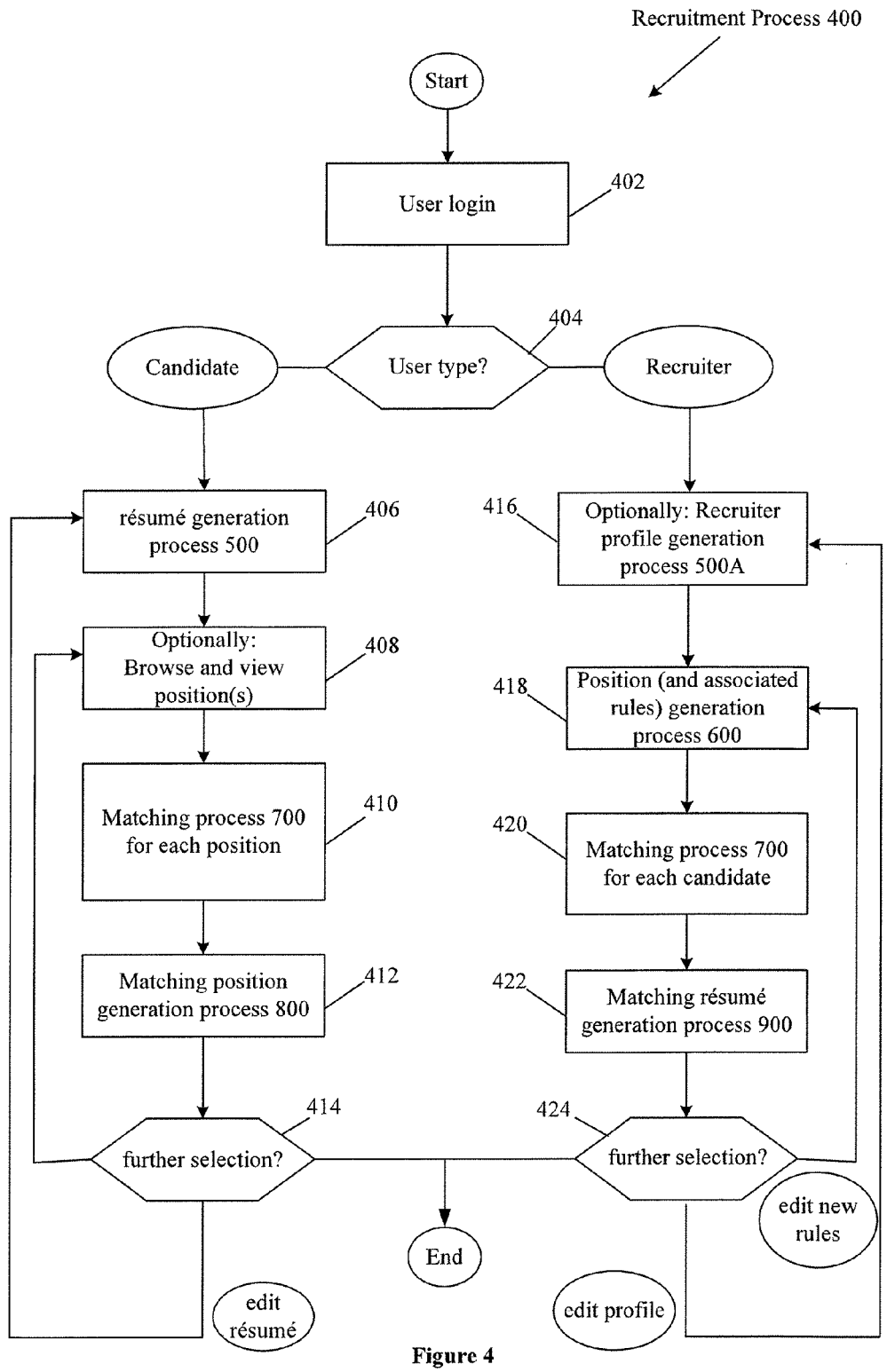
FIG. 4 is a flow chart of a recruitment process performed by the recruiting system.
Figure 5:
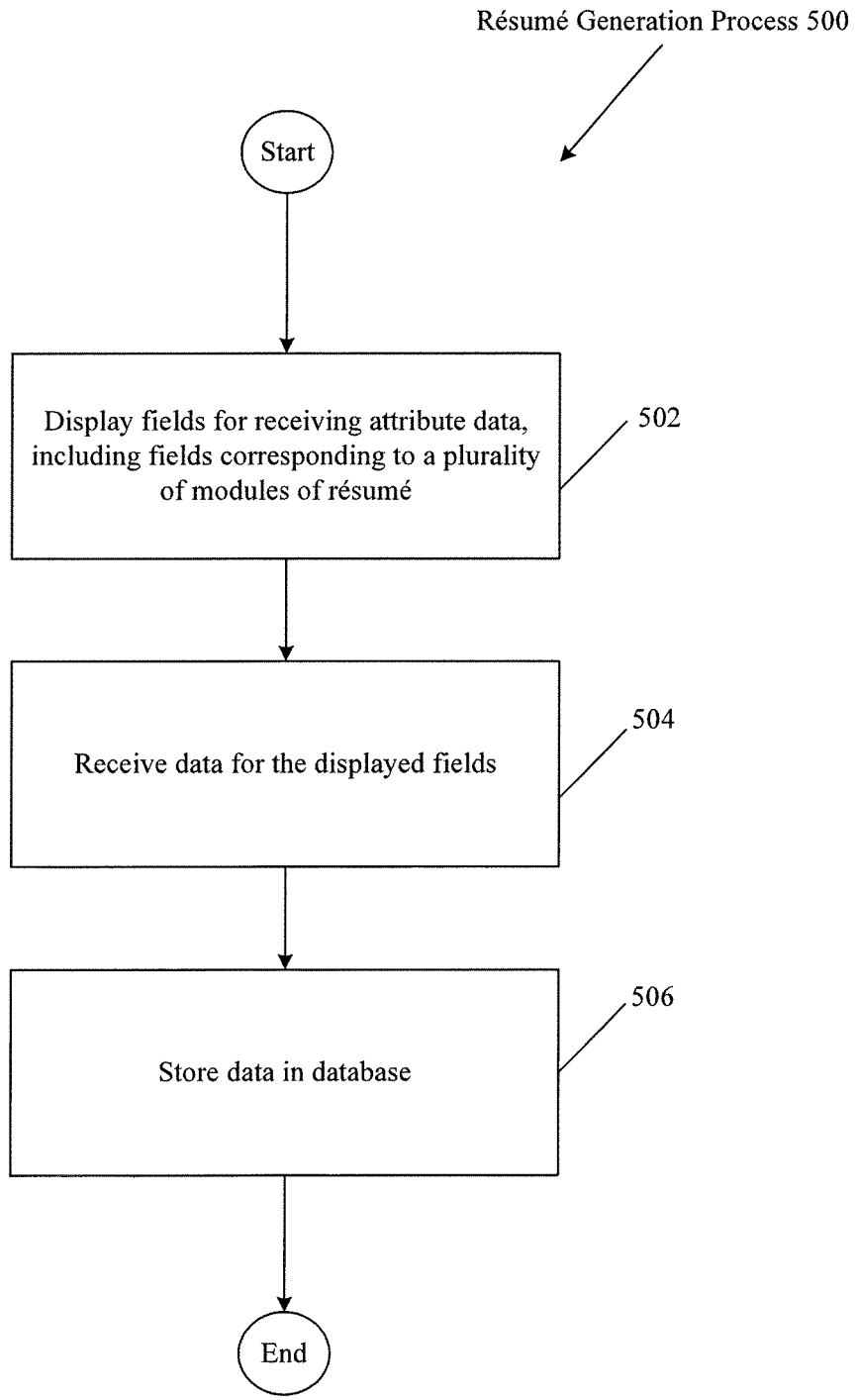
FIG. 5 is a flow chart of a candidate profile generation process of the recruitment process.
Figure 6:
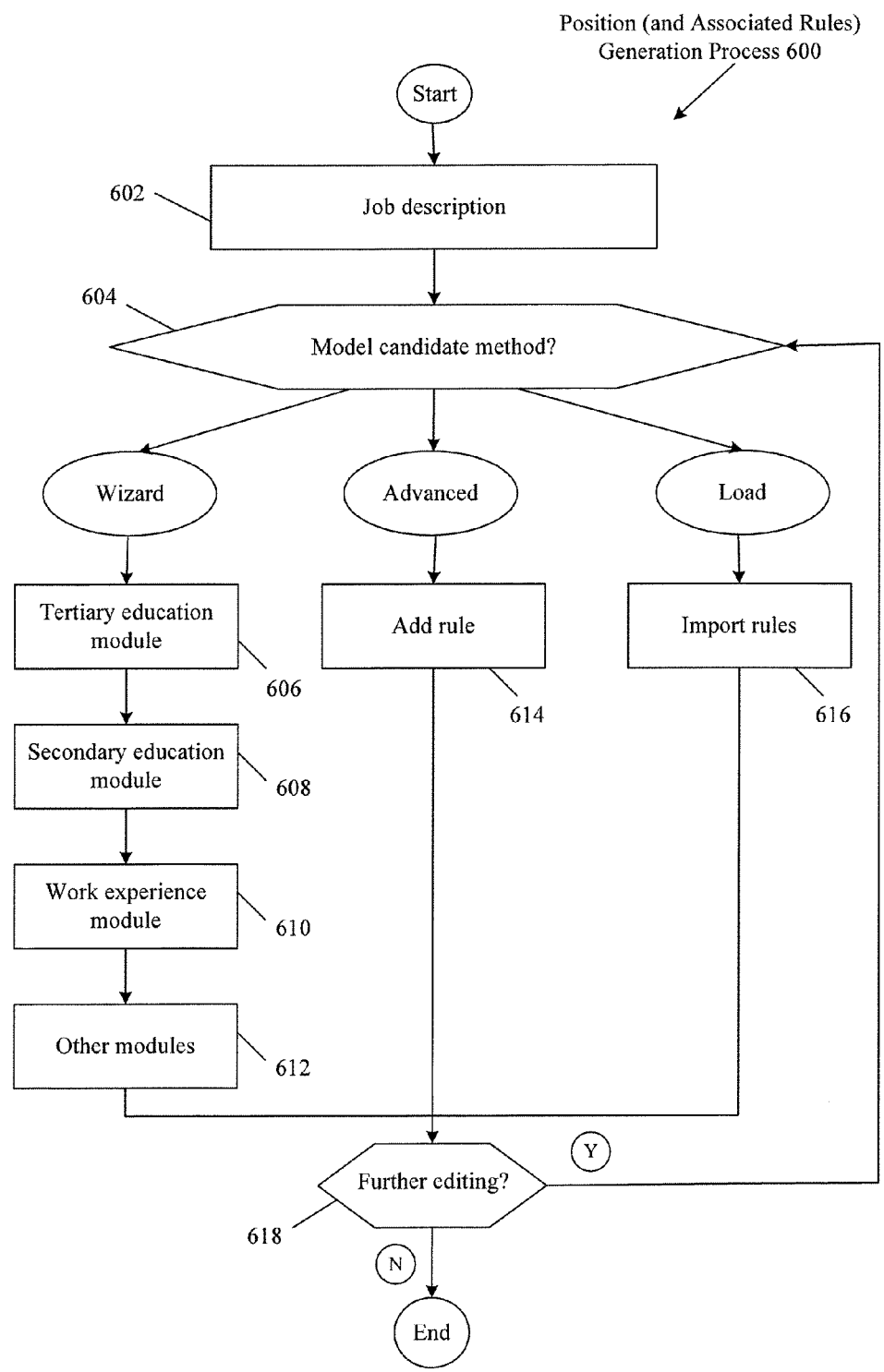
FIG. 6 is a flow chart of a position and associated rules generation process of the recruitment process.

The recruitment process 400 commences, as shown in FIG. 4, with the user accessing the server 102 using a client 104 (or clients 104A, 104B), which includes authentication of the user by the server 102, e.g., using login details such as usernames and passwords, and optionally establishing an encrypted communications link between the server 102 and the client 104 (step 402). When the user logs in, the server 102 determines the user type, based on the login credentials, to be either a candidate user or a recruiter user (step 404). In alternative embodiments, the user type can be determined before the user logs in, for example each user type can access a different web page served by the server 102 for logging into the system in step 402.

If the user is a candidate user, as determined in step 404, the server 102, in conjunction with the client 104, performs a résumé generation process 500, in which the candidate enters information to generate the candidate profile 302 (step 406).

In some embodiments, once the candidate profile 302 (also referred to as the résumé) has been entered, the candidate user can browse through one or more employer/recruiter profiles and view one or more positions represented in one or more position profiles 306A, 306B contained within these recruiter profiles. The chosen positions are selected by the candidate based on the matching metric value and on which positions interest them (step 408). The recruiting system 100 provides the matching process 700 for matching the selected positions stored in the server machine 106 to the candidate's résumé (step 410). In general, the system explicitly prevents candidate users from selecting only one or more portions of their résumé for use in the matching process: this is to prevent gaming of the matching algorithm to infer which rules have been specified for the job positions.

In other embodiments, as soon as the candidate user finishes filling in his/her candidate profile 302 (also referred to as their résumé), the matching process 700 is executed against all of the positions available within the system 100: once the candidate profile 302 has been entered, the recruiting system 100 provides the matching process 700 for matching all of the positions stored on the server machine 106 to the candidate's résumé (step 410). The matching process 700 in step 410 generates one or more matching metric values for each position. In some embodiments, only a single matching metric value is generated for each position. The server 102 uses the matching metric value(s) to rank and display positions that sufficiently match the résumé (and optionally the portions) in a matching position generation process 800 (step 412). In the matching position generation process 800, the determined matching positions, and their suitability and ranking, determined from the matching process 700 in step 410 are displayed to the candidate using the candidate's client 104B. The candidate can interact with the data using the client 104B to make further selections of positions of interest, returning to step 408 (in some embodiments), or the candidate can edit their résumé, returning to step 406, or the candidate can exit the recruitment process 400, thus ending it (step 414).

For a recruiter using the recruitment process 400, as determined in step 404, the recruiting system 100 provides an optional (not optional if the recruiter profile has yet to be setup) recruiter profile generation process 500A in which the recruiter enters information to generate the layout and content of the recruiter profile (step 416).

The recruiting system 100 provides a position (and associated rules) generation process 600 in which the recruiter enters information to generate at least one position profile 306A, 306B along with its model candidate rules 316 (step 418).

The recruiting system 100 performs the matching process 700 for all candidates stored on the server machine 106 (step 420). The matching résumés, and/or résumé modules, along with their matching metric values, are displayed and ranked in a résumé matching process 900 (for generating matching résumés) performed for each selected candidate and résumé module (step 422). The recruiter can view the results of the matching process 700 and the résumé matching process 900, from steps 420 and 422, using the client 104A. The recruiter can also use the client 104A to make selections of the recruiting system 100, including editing/amending the recruiter profile 304, returning to step 416, or editing/amending the position profile 306A, 306B, returning to step 418, or ending the recruitment process 400 (step 424).

The recruitment process 400 is generally provided by the server 102 in an ongoing fashion and the users can access the subprocesses of the recruitment process 400 without necessarily following the order described above. For example, once the résumé data and the rules data, representing the candidate profiles 302 and the position profiles 306A, 306B respectively, are entered into the recruiting system 100, the users can perform the matching processes without the requirement to enter further data for the résumés and the rules. The recruitment process 400 can also be used for new users: these new users do not log in in step 402, but instead establish user profiles which are subsequently used for logging in in subsequent executions of the recruitment process 400.

Résumé Generation Process 500

In the résumé generation process 500 the candidate enters information for their candidate profile 302 (also referred to as a résumé) including information for the various modules 308A, 308B and subrecords 310A, 310B of the candidate profile 302 (step 502). The server 102 receives data for the displayed fields and subfields from the candidate client 104B (step 504), and stores the received data in the database 232 (step 506).

Recruiter Profile Generator Process 500A

There are two use cases for the recruiter profile generation process 500A: when the recruiter logs into his/her employer profile for the first time and creates the employer profile, and when the recruiter edits his/her employer profile.

After an employer signs up with the system 100, the system administrators manually create a bare-minimum, non-visible employer profile with an employer-specified name or universal resource locator (URL), and an initial password. The name and password are supplied to the employer in preparation for an employer's recruiter to successfully log into the system 100 for the first time. Upon a recruiter logging into such an employer profile, the first-time use case is followed and a screen is shown which prompts the recruiter to enter his/her employer's billing details, as shown in FIG. 32.

Figures 32, 33:
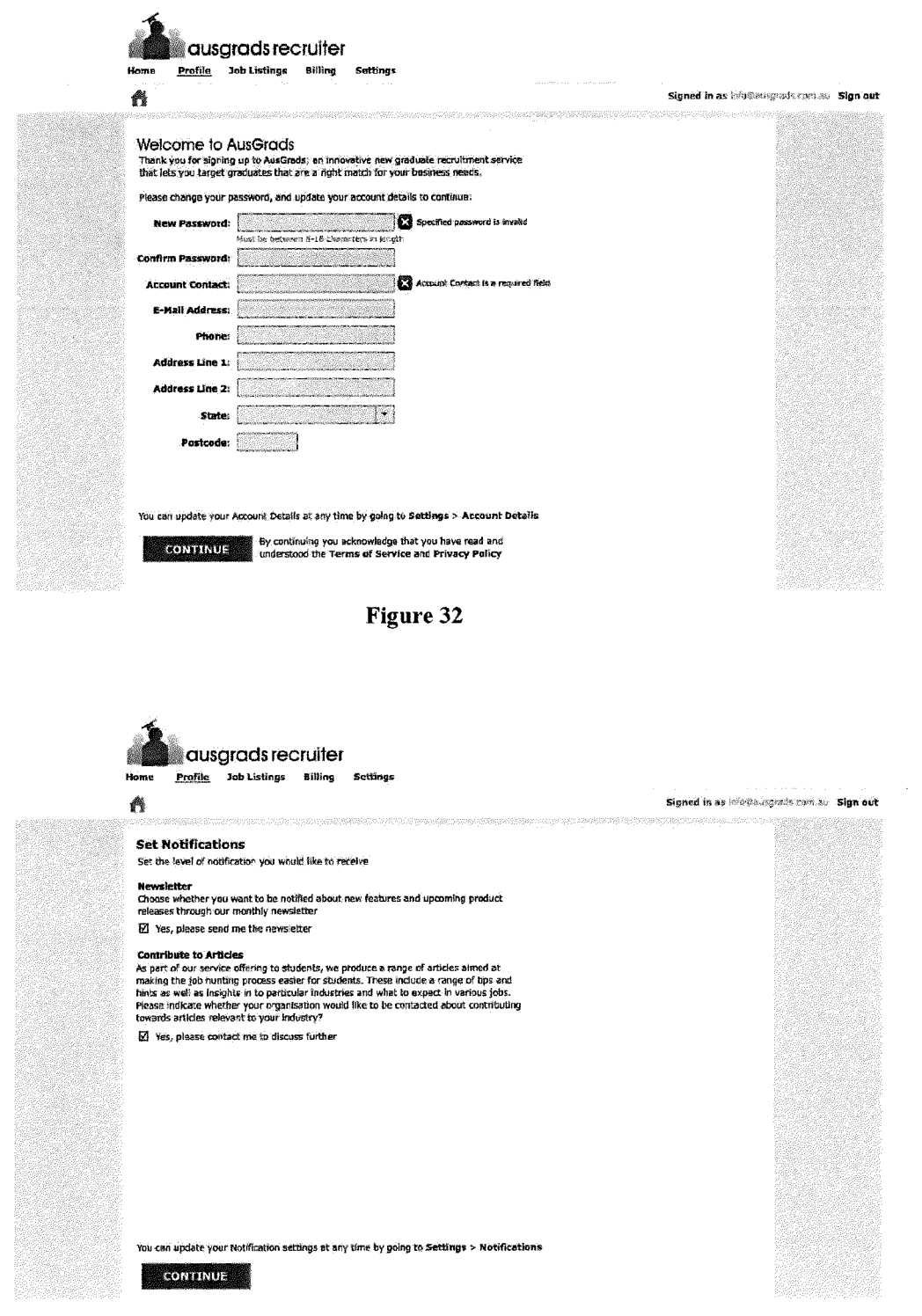

After the recruiter inputs valid data for all fields and clicks on the "Continue" button, the notification details screen is shown, which allows the recruiter to specify whether he/she would like to receive regular communications from the system 100, shown in FIG. 33.

Figures 34, 35:
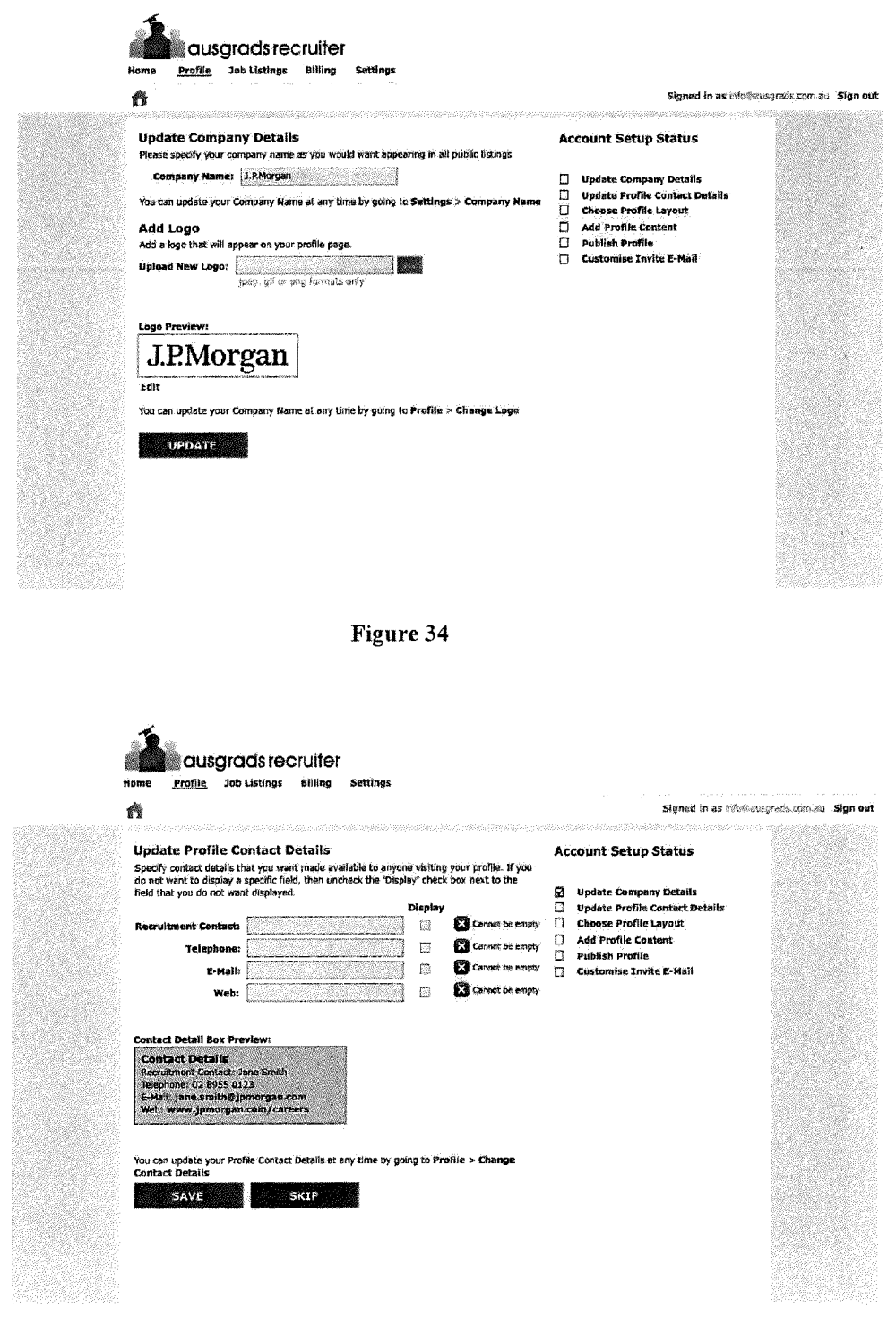

After clicking on "Continue", the company details screen is shown, which allows the recruiter to input the employer's company name and then upload the corporate logo, as shown in FIG. 34.

After clicking on the "Update" button, the recruiter is shown the employer profile contact details screen, where the recruiter inputs the publicly-viewable contact details for the employer profile (the billing-related details are only viewable by system administrators/staff), as shown in FIG. 35.

Figure 36:

After clicking either the "Save" or "Skip" buttons, the recruiter is shown the update layout screen, which allows the recruiter to configure the layout of the employer profile, as shown in FIG. 36.

Figure 37:
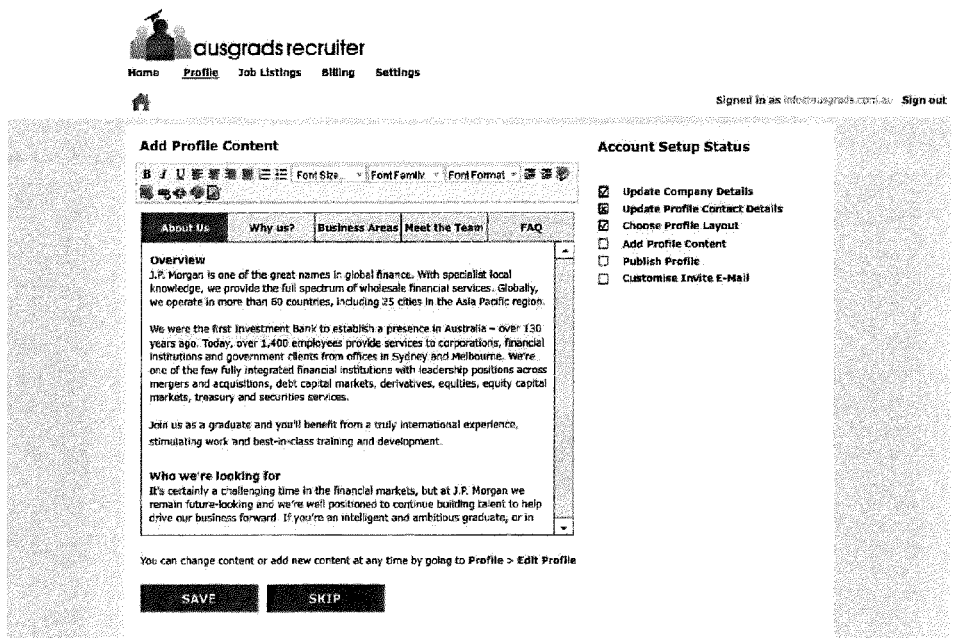

By clicking either the "Save" or "Skip" buttons, the recruiter can input the corresponding content for each tab specified in the update content screen, as shown in FIG. 37.

Figure 38:
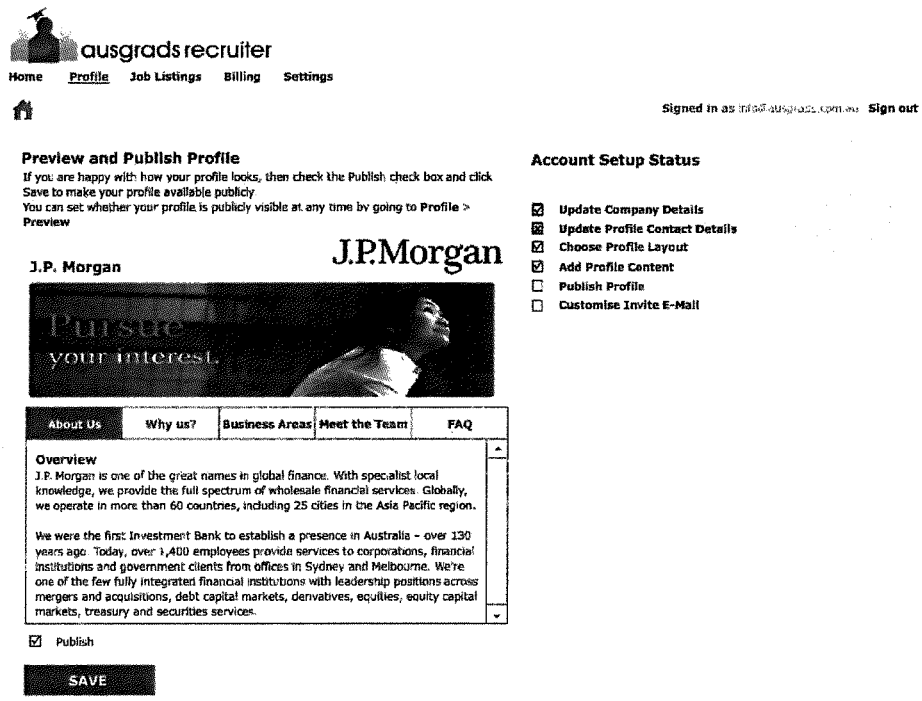

After editing the text, the recruiter progresses by clicking on either the "Save" or "Skip" buttons to transition to the preview and publish screen, where the system shows the recruiter a preview of the just-configured employer profile, as shown in FIG. 38. Here, the recruiter has the option of publishing the employer profile, i.e., making the employer profile publicly visible and accessible.

Figure 39:
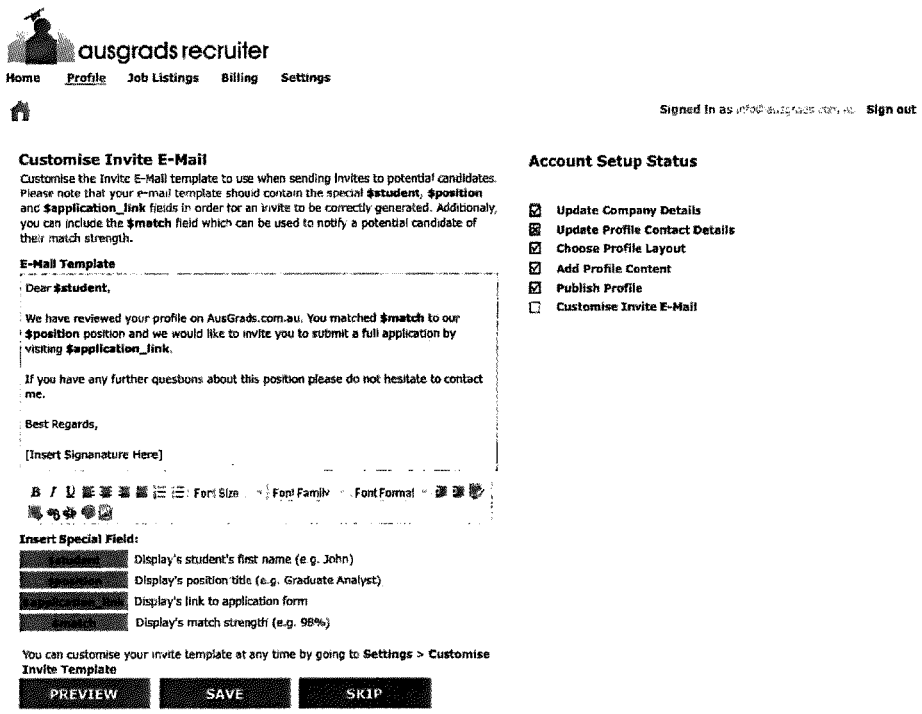

Upon clicking on the "Save" button, the recruiter is shown the invite message screen, where the recruiter is allowed to customise the invite message that is sent to each candidate when a recruiter invites him/her to apply for a given job position, as shown in FIG. 39.

Figure 40:
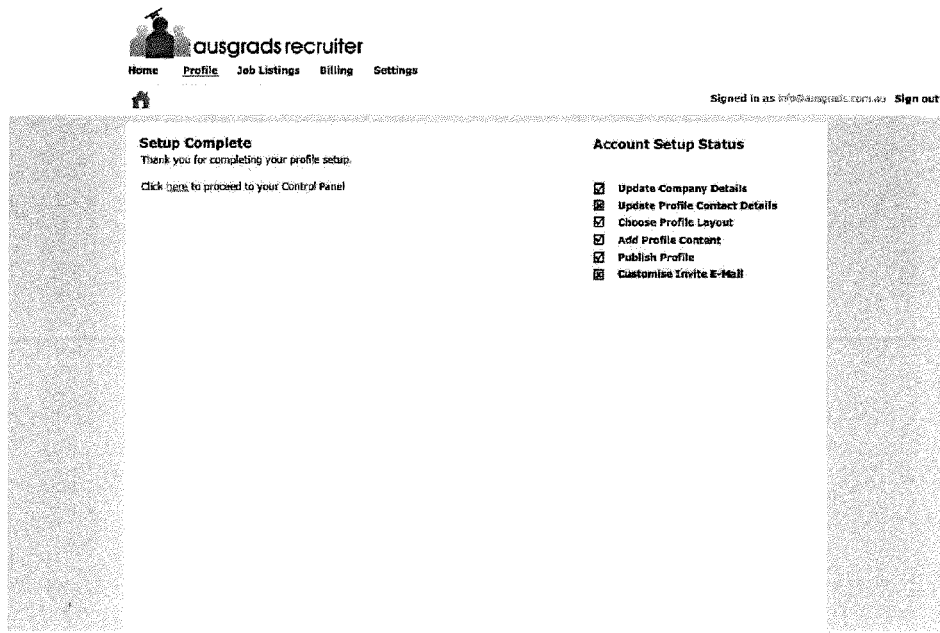

After clicking on either the "Save" or "Skip" messages, a screen is shown that informs the recruiter that the process for setting up the employer profile is complete, as shown in FIG. 40. The first-time use case then ends.

Figure 41:
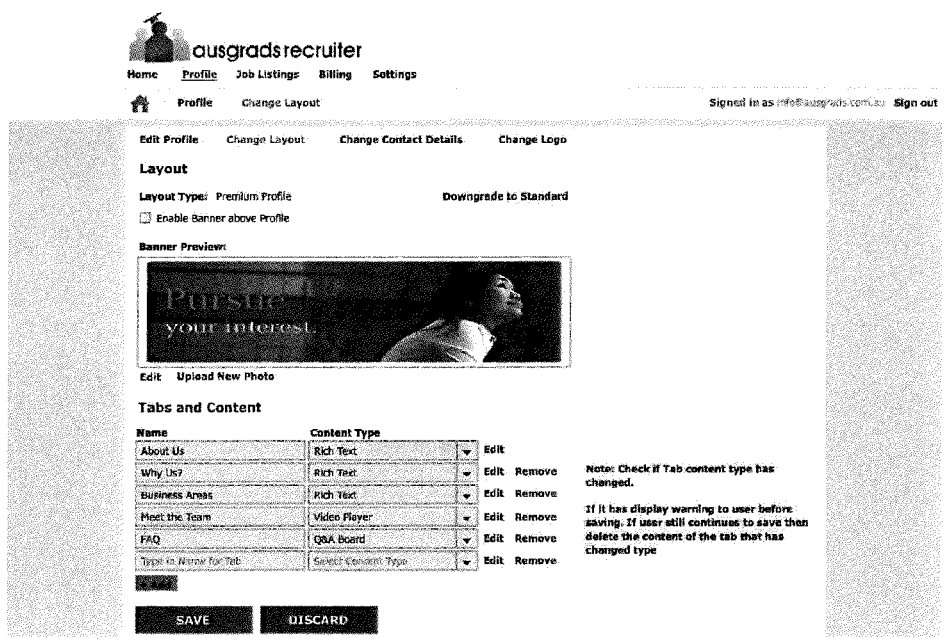

The editing use case, for editing the employer profile, is only executed when a recruiter is not logging into his/her employer profile for the first time. The recruiter can edit any aspect of his/her employer profile by first clicking on the "Profile" link in the recruiter-specific navigation pane at the top of the screen. Once this link is clicked, an edit contact details screen is displayed, as shown in FIG. 41.

Figure 42:
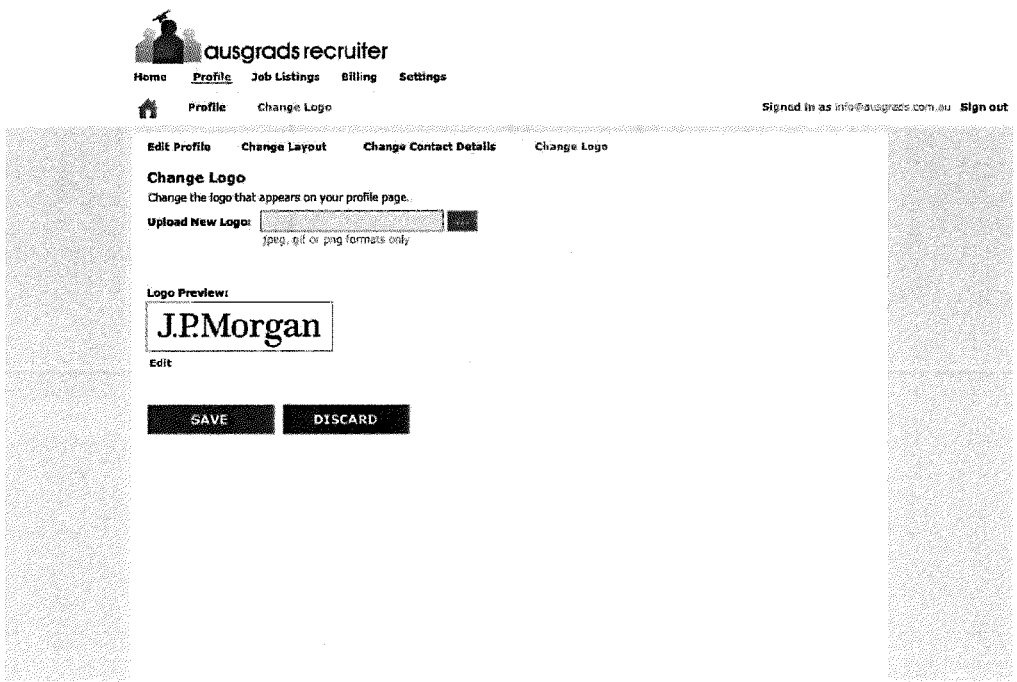
Figure 45:
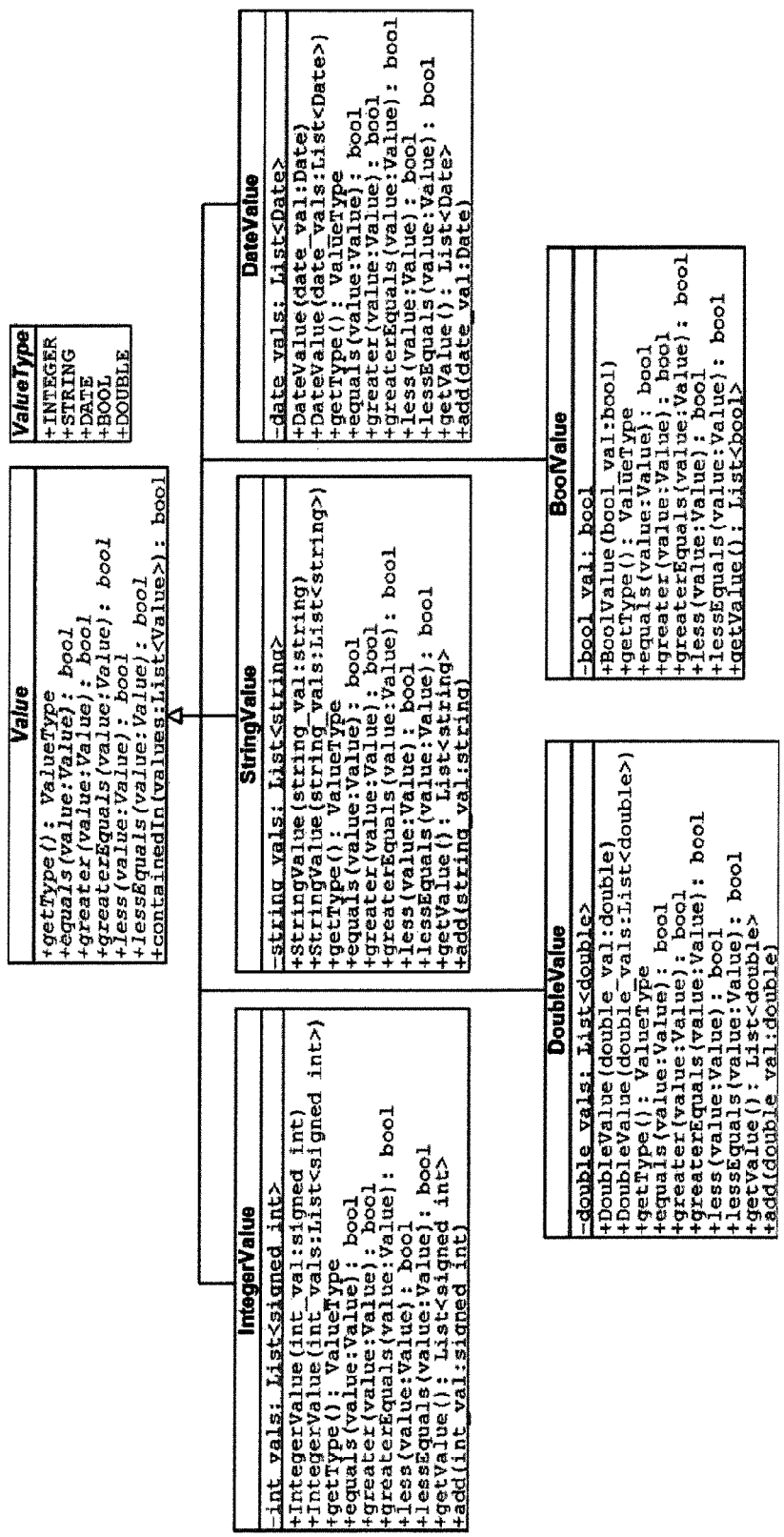
FIG. 45 is an UML diagram for the abstract Value class and the classes that implement it in the example embodiment.
Figure 50:
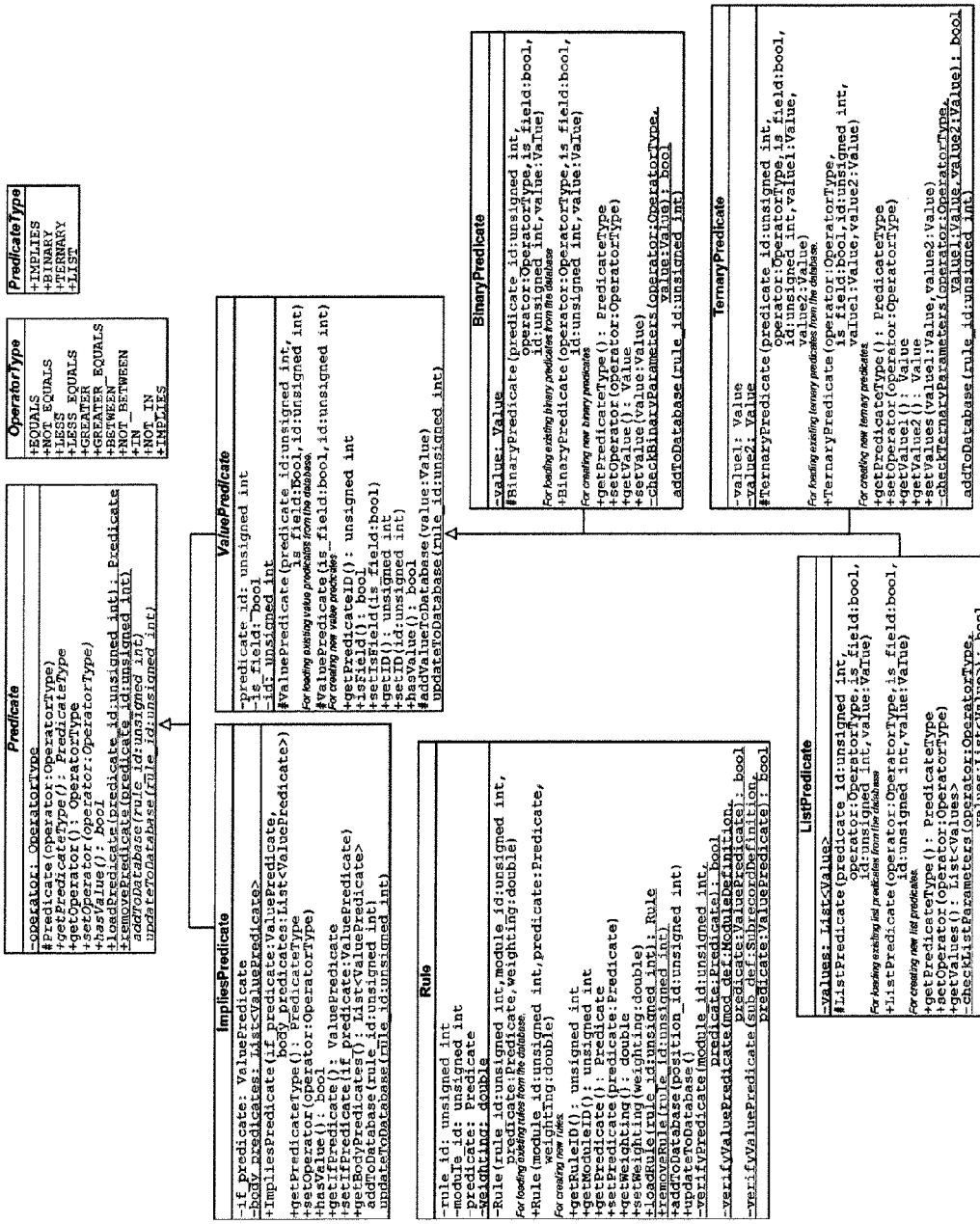
FIG. 50 is an UML diagram for the Rule class, the abstract Predicate class, and the subclasses that implement it in the example embodiment.
Figure 52:
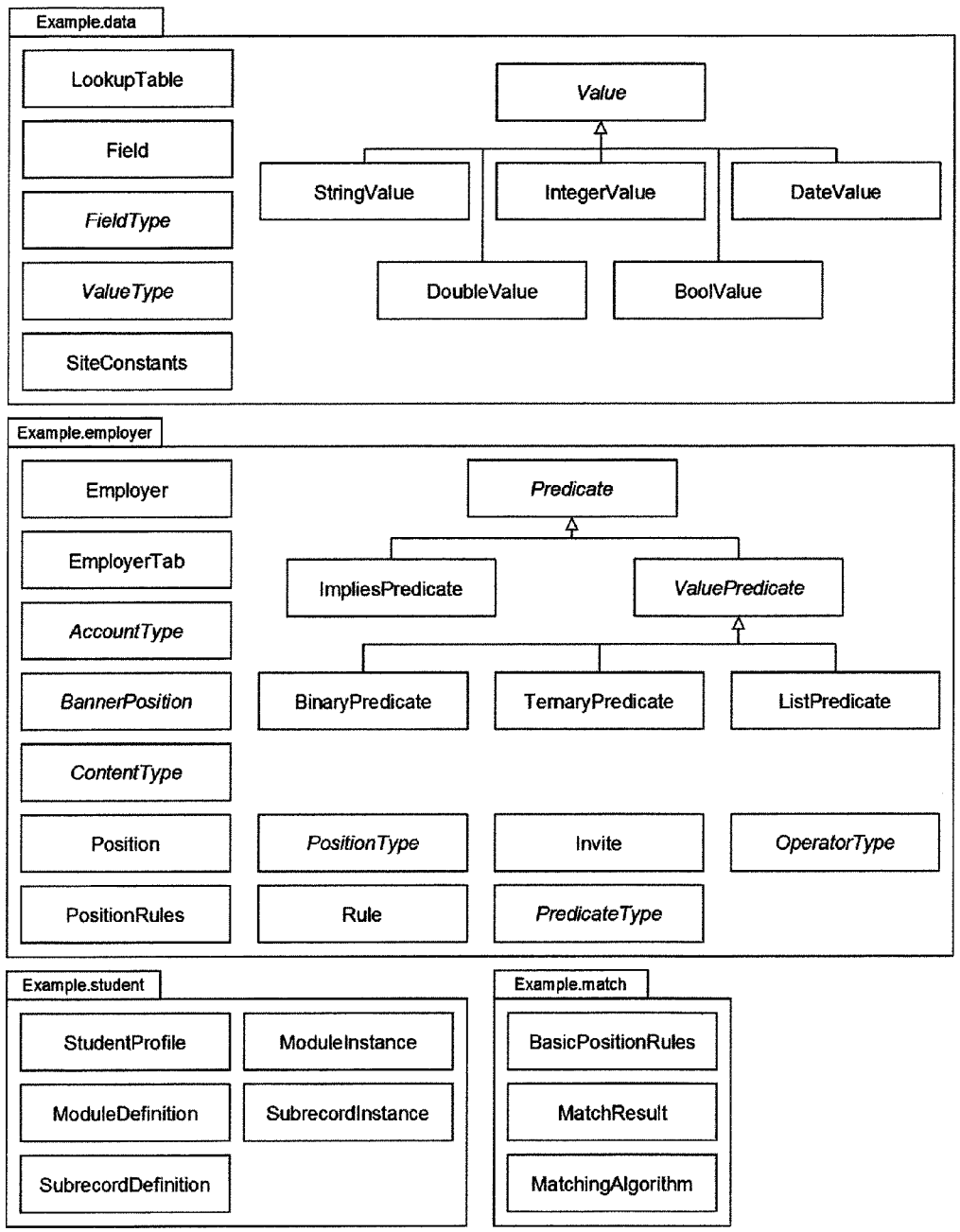
FIG. 52 is a block diagram of classes, enumerations and interfaces of the example embodiment.

The "Edit Profile", "Change Layout", "Change Contact Details", and "Change Logo" buttons allow the recruiter to navigate to the appropriate screen and edit any aspect of the employer profile that was originally setup in the first use case. All of these screens are very similar to the ones in the first-time use case described hereinbefore: as an example, clicking on the "Change Logo" link causes the recruiter to be shown the change logo screen, which is visually similar to the update company details screen in the first use case, as shown in FIG. 42.

Position (and Associated Rules) Generation Process 600

In the position (and associated rules) generation process 600 the recruiter enters information about at least one position using the client 104A to send data to the server 102. The server 102 generates interface data for displaying field names or titles corresponding to the information required in the position profiles 306A, 306B. The server 102 receives general information about the position, such as a position description etc., for the information fields 312 (step 602). The recruiting system 100 provides a plurality of methods for entering and editing the rules data in the position profiles 306A, 306B: the recruiter can select to enter/edit the information using a wizard process, an advanced editing process or by loading saved data representing a pre-defined position profile 306A, 306B (step 604).

In the wizard rules generation process, selected in step 604, the recruiting system 100 receives data representing tertiary education for the tertiary education module of the position profile, describing the tertiary education requirements of the model candidate (step 606). Secondary education rules are entered for the secondary education module (step 608), work experience rules are entered for the work experience module (step 610) and other rules, such as clubs and societies or memberships and affiliations, are entered for the other modules (step 612). The modules refer to portions of résumés in the recruiting system 100.

In the advanced editing process for generating rules, the recruiting system 100 generates displays for receiving information defining individual rules on a rule-by-rule basis (step 614). For example, each rule in the rules 316 of the model candidate can be defined by the model attribute to which it relates, which can include the module or relevant portion of the résumé, an operation or operator for operating on the attribute and a value or weighting associated with the rule. After the rules have been individually entered or edited in step 614, further editing can be selected in step 618.

In the uploading process for loading pre-saved rules, the recruiting system 100 performs an import rules process to import rules, e.g., from the client computing device 108A or from the recruiter profile 304 which is associated with one or more pre-saved rules in the database 232 (step 616). The imported rules can be further edited in step 618.

Matching Process 700

The matching process 700 is provided by the recruiting system 100 to match or compare candidates with positions. The matching process 700 can be used by a recruiter to match a plurality of candidates (represented by their résumés) with one or more positions, for determining the most suitable candidates for each position. Matching process 700 can also be used by a candidate to view the suitability of a plurality of available positions. Given one candidate profile and one position profile, the matching process 700 can also be used to generate matching metric values for each of the candidate profile's modules to determine the individual suitability of the modules for a position: for example, a recruiter can determine the suitability of the different portions of a candidate's résumé for a particular position, and thus determine where the candidate's strengths and weaknesses lie, relative to that position.

Figure 7:
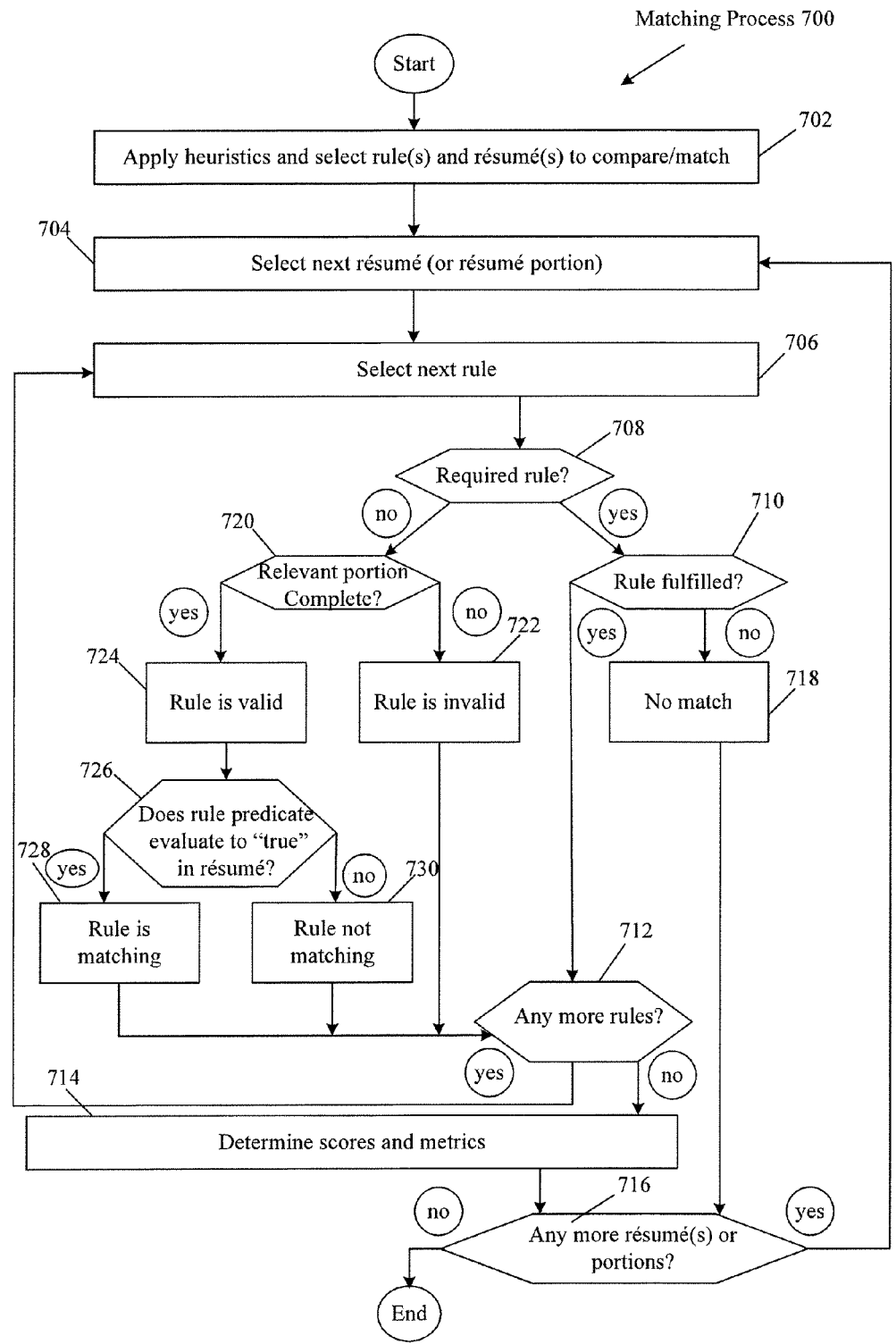
FIG. 7 is a flow chart of a matching process of the recruitment process.

The matching process 700 commences, as shown in FIG. 7, with the selection of rule(s) and résumé(s) to compare and match (step 702). To select these rules and résumés, a heuristic filtering process is used on the data records stored in the server machine 106 to reduce the number of rules/resumes that the matching process 700 must process, and hence increase its execution performance. In the heuristic filtering, an heuristic filter is used to select the data associated with at least one job position, and/or candidate data associated with the at least one recruitment candidate, from stored data representing all possible job positions and/or all possible recruitment candidates. The heuristic filter includes one or more position profile attributes (e.g., recently created positions, or the location or residency requirements of the position) and/or candidate profile attributes (e.g., active or recently generated candidate profiles, or the residency/location of the candidate). An example heuristic filtering process is described in more detail with reference to an example embodiment hereinafter.

The matching process 700 generates a relevance score and an accuracy score, which are then combined to give the matching metric value, for each résumé-position pair, and these are iteratively selected for the résumé or résumé portion of the selected résumés (step 704) and the next rule for the position (step 706). For the selected résumé and rule, the recruiting system 100 determines whether the rule is a required rule, which is a rule defining an aspect of the résumé that must be present for the position, or equivalently must not be present (step 708). For example, a required rule may be that the résumé includes tertiary education, or that the candidate has a grade point average (GPA) above a certain level. A required rule can be defined by a rule value or weighting equal to unity (1.0): the process of step 708 can efficiently determine which candidates should be considered based on these required rules. If the rule is a required rule (as determined in step 708), and the recruiting system 100 determines that the required rule is fulfilled (step 710) the recruiting system 100 determines whether there are any more rules in the selected rules for this iteration of the matching process 700 (step 712). If there are further rules, the next rule is selected in step 706. If there are no further rules, the metrics and scores for the selected rules are determined (step 714) and the recruiting system 100 determines whether there are any more résumés or résumé portions (modules) to be matched (step 716). If there are more résumés or résumé portions in the selected résumés, the next résumés is selected in step 704; if there are no further résumés or résumé portions, the matching process 700 ends. Returning to step 710, if it is determined that the required rule is not fulfilled, then the recruiting system 100 determines that there is no match between this rule and this resume/portion (step 718) and the recruiting system 100 determines whether there are any further résumés or portions to be matched in step 716.

If it is determined that the selected rule is not a required rule in step 708, the recruiting system 100 determines whether the relevant portion/module of the résumé relating to this rule is complete (step 720). The portion tested in step 720 are the fields/subfields referenced in the predicate associated with the given rule. If not all of these fields/subfields have been filled in the résumé, the rule is deemed to be invalid (step 722), and if there are any further rules determined in step 712, the next rule is tested starting in step 706. If all of the fields/subfields tested in step 720 have been filled in the résumé, the rule is determined to be a valid rule (step 724) and the recruiting system 100 determines whether the rule's predicate evaluates to "true" in the résumé (step 726). Determining whether the rule's predicate evaluates to "true" in the résumé includes determining that the résumé conforms with the requirements of the rule, which may have requirements for certain attributes to be present or absent or related to criteria of the rule by operators of the rule (e.g., binary operators or Boolean operators). If the rule requirements are satisfied, the rule is determined to be a matching rule (step 728) and the value of the rule, which is a numerical weighting level or quantitative measure, is used for determining the metrics and scores in step 714. If the requirements of the rule are determined not to be met in step 726, the rule is determined to be a non-matching rule, and it is determined whether there are any further rules in step 712 before determining metrics and scores in step 714.

In embodiments, the metrics and scores are determined based on values relating to the matching rules and no values are used from the non-matching rules. In alternative embodiments, the values from all the rules are used, with the values of the matching rules providing a positive contribution to the metrics and scores while the values of the non-matching rules provide negative contributions to the metrics and scores; alternatively, the values of the matching and non-matching rules are used in alternative calculation methods, where the values of the matching rules and the values of the non-matching rules are differentiated to indicate suitability of the résumé (or résumé portion) in accordance with the requirements of the rules.

Position Matching Process 800

Figure 8:
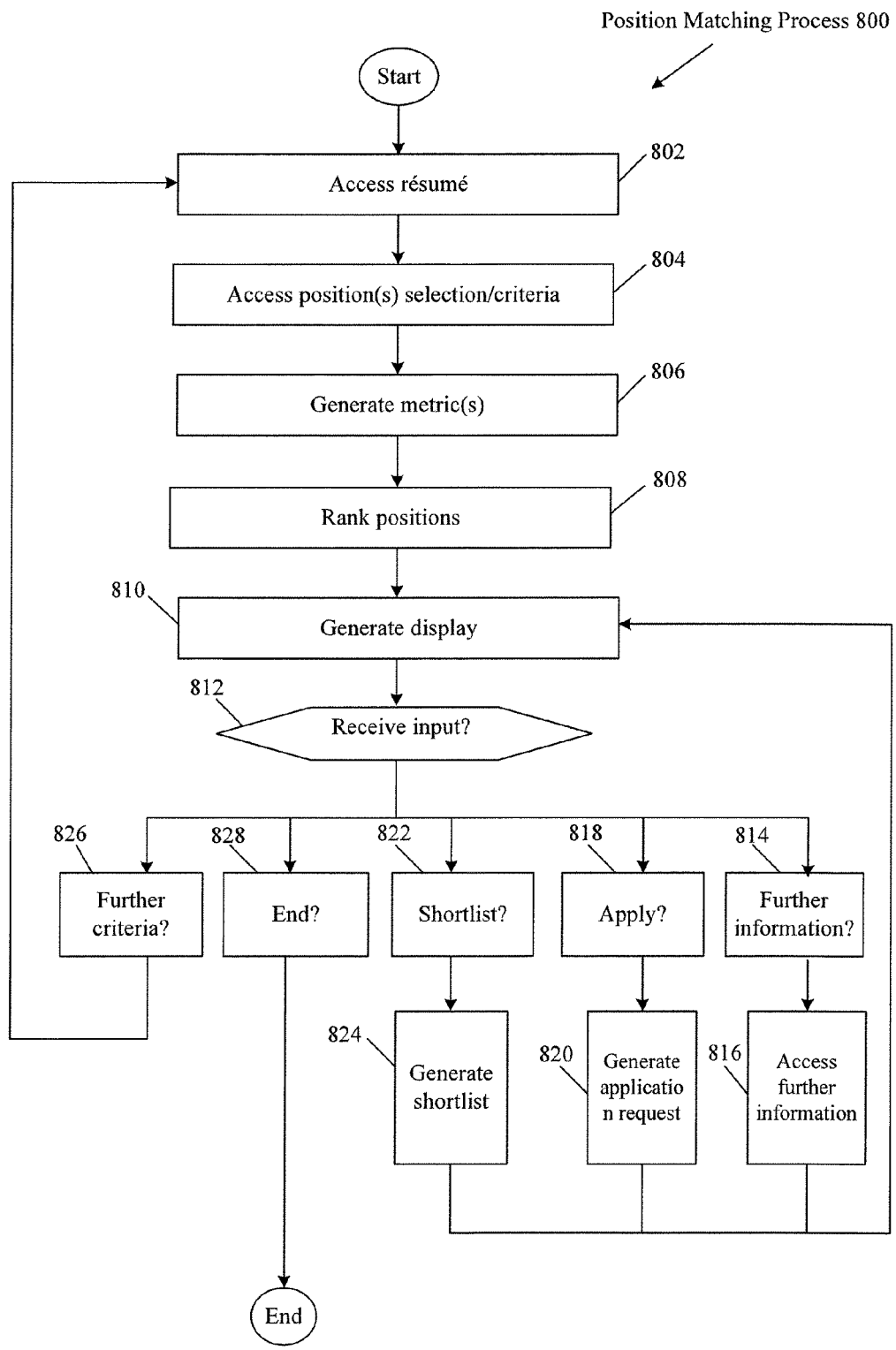
FIG. 8 is a flow chart of a position matching process of the recruitment process.
Figure 9:
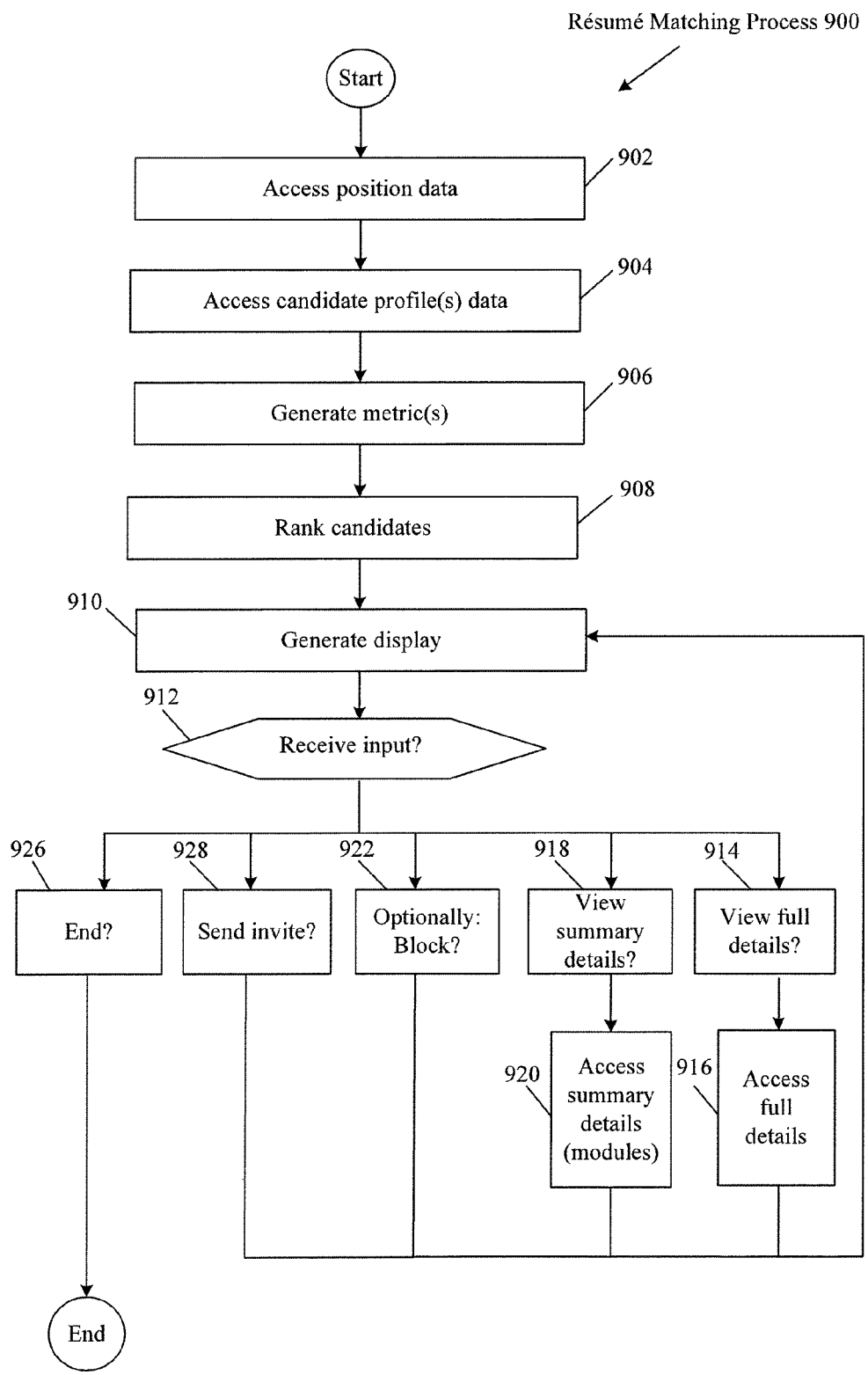
FIG. 9 is a flow chart of a candidate profile matching process of the recruitment process.
Figure 18:
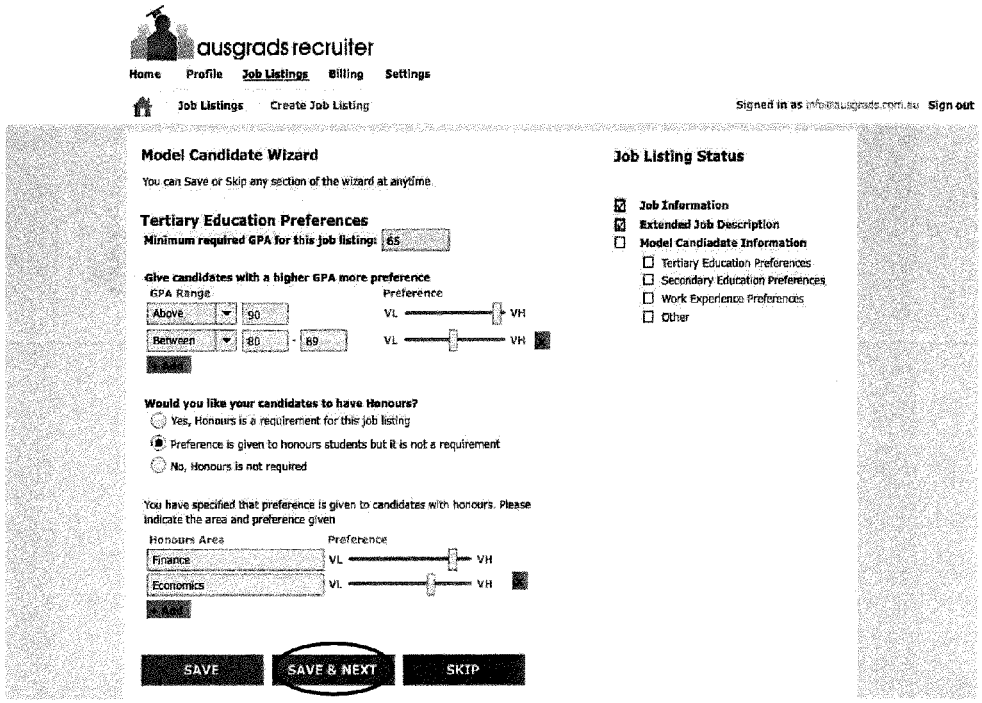
Figure 19:
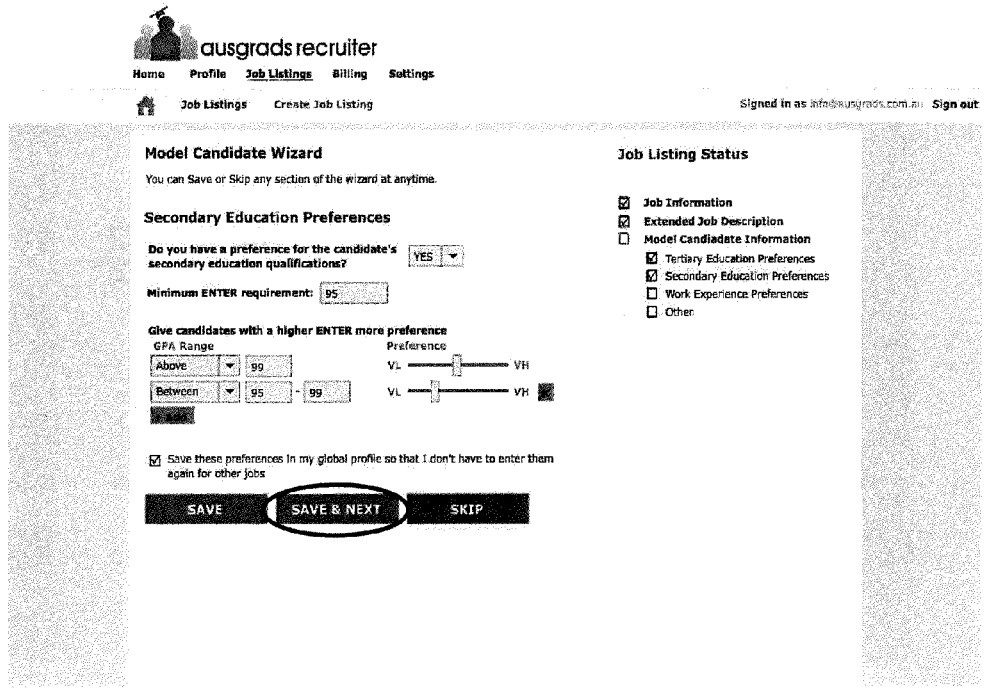
Figure 22:
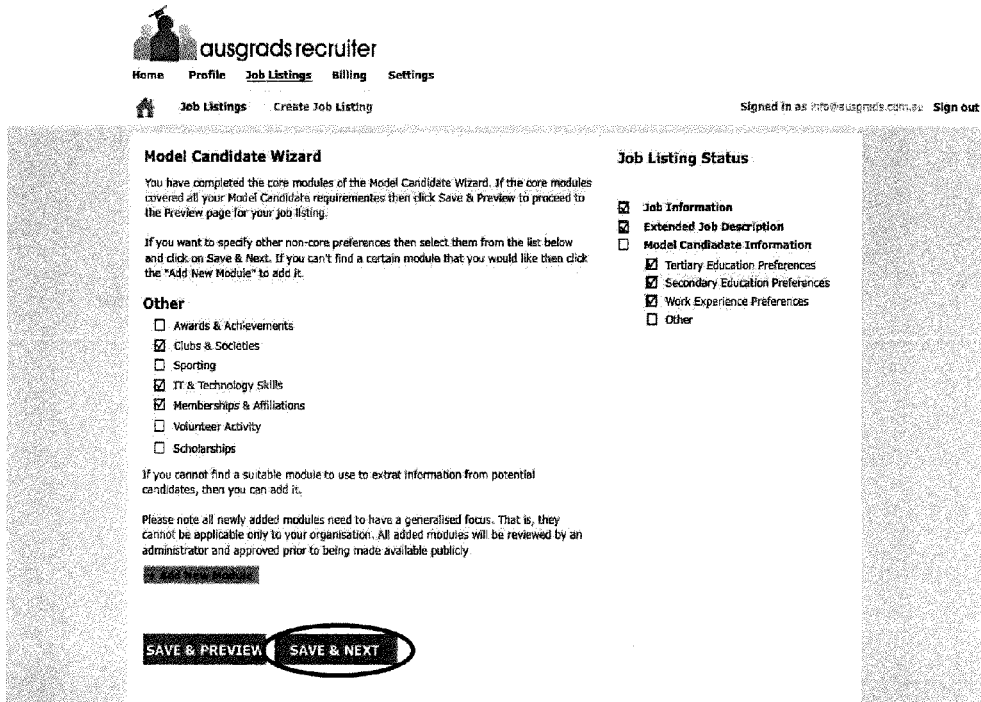

In the position matching process 800 for matching positions for a candidate, the recruiting system 100 accesses data representing the candidate's résumé (step 802) then receives (or accesses) criteria for selecting or filtering positions which interest the candidate (step 804), as shown in FIG. 8. Example selection criteria include positions advertised within a certain distance of the candidate's location, or within a certain area, either geographical or technical. The recruiting system 100 accesses or generates metrics comparing the résumé with the selected positions (step 806). The metrics may be generated dynamically or on-the-fly, using the matching process 700 executed by the server 102; alternatively, the metrics generated in step 806 can use information about the metrics between this résumé and the positions which have been previously generated and stored in the database 232. Once the metrics are generated, the positions are ranked in order of suitability for this candidate (step 808). The recruiting system 100, using the client 104B and data from the server 102, generates a display of the selected positions and their metrics and ranking (step 810). At this point, the recruiting system 100 can receive input from the candidate user (step 812). The input can be a request for further information related to one of the positions, such as details about the conditions of the position (step 814). The server 102 accesses this further information (step 816) and uses it to generate the display in step 810. The input can represent an application request from the candidate for the position (step 818), in which case the recruiting system 100 generates an application request relating to the position for sending to the recruiter (step 820), the result of which is displayed in step 810. The input can be a request for short listing one or more of the displayed positions (step 822) in which case the recruiting system 100 generates and/or edits a short list associated with the candidate profile 302 including the selected displayed positions (step 824), and displays this short list in step 810. The input can be further criteria for selecting the processed positions (step 826), which causes the recruiting system 100 to access the positions based on the new selection criteria in step 804. The input can be a request to finalise the position matching process 800 (step 828) in which case the position matching process 800 ends.

Résumé Matching Process 900

The résumé matching process 900 for matching résumés to at least one predefined position, for viewing the suitability of the résumés by a recruiter, commences by accessing position data representing the positions selected for viewing by the recruiter (step 902). Data representing résumés stored on the server machine 106 are accessed based on the available résumés in the recruiting system 100, and in some embodiments based on selection criteria from the recruiter for selecting a subset of the résumés (step 904). The matching metrics are generated between each position and each accessed résumé using the matching process 700, which may be performed dynamically or at least partially using pre-processed data stored in the database 232 (step 906). The résumés, and thus the candidates, are ranked using the metrics (step 908) and information about the candidates and their ranking and their suitability for each position is processed to generate a display for the recruiter (step 910). Once the display is generated, the recruiting system can receive input from the recruiter (step 912). The input can be a request to view the full details of the résumé (step 914) which causes the server 102 to access additional data associated with the résumé and generate a display of all details, e.g., in a pop-up window in front of the ranked list of candidates (step 916), which is displayed in step 910. The recruiter can select to view brief details or a subset of details for a selected candidate (step 918) which causes the recruiting system 100 to access the summary details of the résumé, e.g., showing each module of the résumé and its suitability for the position (step 920) and display these in step 910. In some embodiments, the recruiter can select to block an individual résumé from the display (step 922). The recruiter can select to send an invitation to the corresponding candidate (step 924). Sending an invitation is performed by the recruiting system 100, which generates a message for the candidate describing the position and/or the recruiter. The input can be a request for process termination, in which case the résumé matching process 900 ends (step 926).

Example Screen Shots

In the recruitment process 400, the recruiting system 100 generates user interfaces including user interface displays, for example the graphical user interface screen shots shown in FIGS. 10 to 31.

Figures 10, 11:
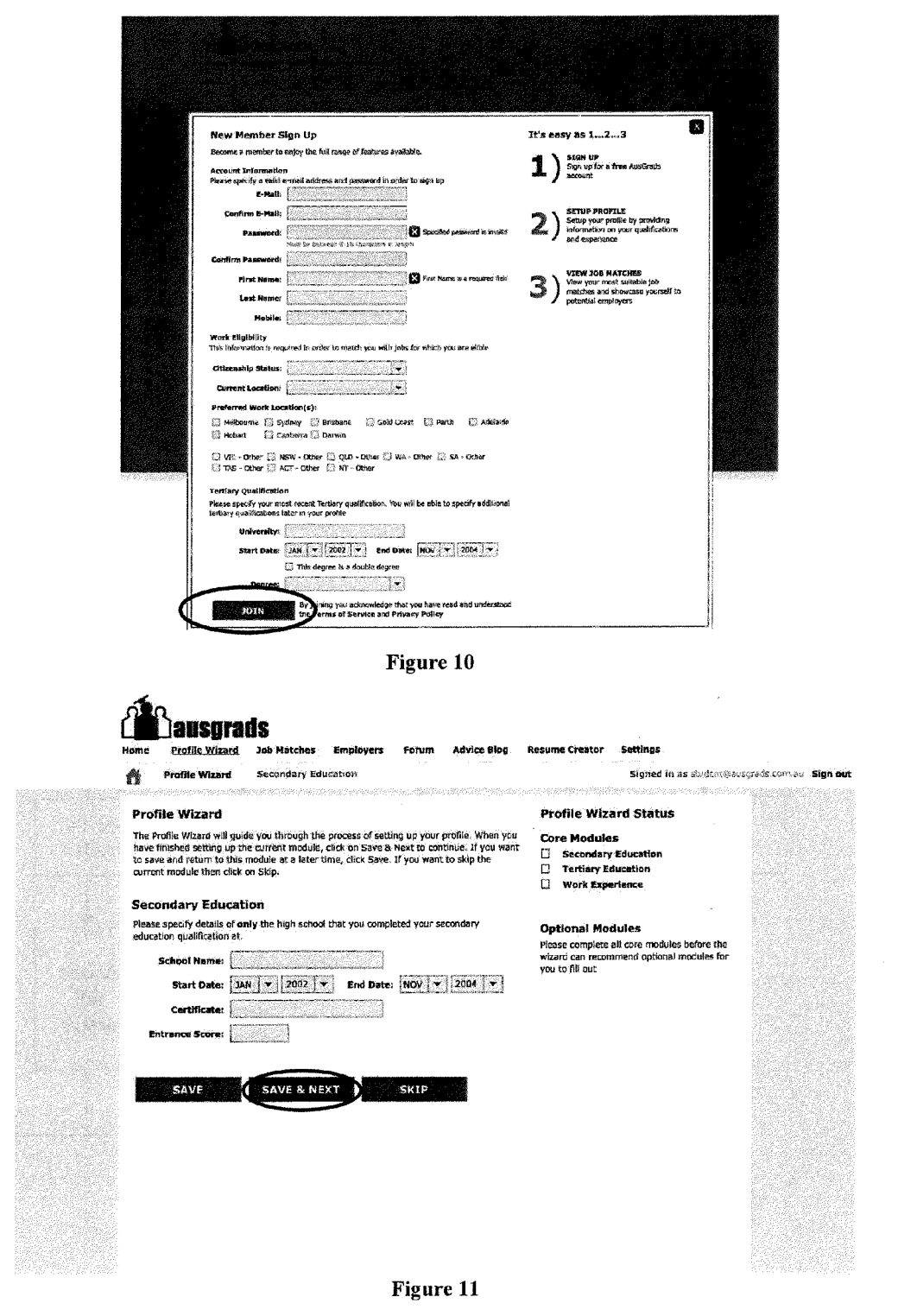

FIG. 10 shows a screen shot generated during the candidate's login and résumé generation process 500 which includes a display of fields for the candidate to enter information for their candidate profile 302. The résumé generation process 500 provides an interactive graphical user interface, which is referred to as a student profile creation wizard. The fields displayed, which correspond to information to be entered for the candidate profile 302 include: email, login username, login password, candidate's name, candidate's telephone number(s), candidate's postal/residential address(es) and other contact and identification details of the candidate. The student profile creation wizard displays and receives data for the following modules (i.e., portions of the résumé) and their fields:

1. the basic information module, which includes the candidate's citizenship status and their acceptable/preferred work locations (e.g., Melbourne, Sydney, Brisbane, Victoria, New South Wales, Australia, England, New York, etc.);
2. the tertiary qualification module, including the university, the start date of study, the end date, and any degree names;
3. the secondary education module, including the name of the high school/secondary school, the start date, the end date, the certificate of secondary education and a final high school score or grade (e.g., a tertiary education entrance ranking score);
4. the work experience module; and
5. other modules, e.g., clubs and societies or activities and sports.

The student profile creation wizard includes a plurality of user interface screens similar to the user interface screen shown in FIG. 11.

The position generation process 600 generates a position profile creation wizard, which is a user interface with a series of screens for entering information to create the position profile 306A, 306B, and to edit the position profile 306A, 306B, e.g., user interface screens shown in FIGS. 12 to 26. Each rule is defined in relation to a résumé module (e.g., tertiary education preference, shown in FIG. 15), attributes of the résumé (e.g., "The University of Melbourne", "Monash University" or "University of Sydney", as shown in FIG. 15), and a value or level quantifying the importance of the attribute(s), e.g., shown as a slider lying between "very low" and "very high" in FIG. 15.

Figure 23:
Figure 24:
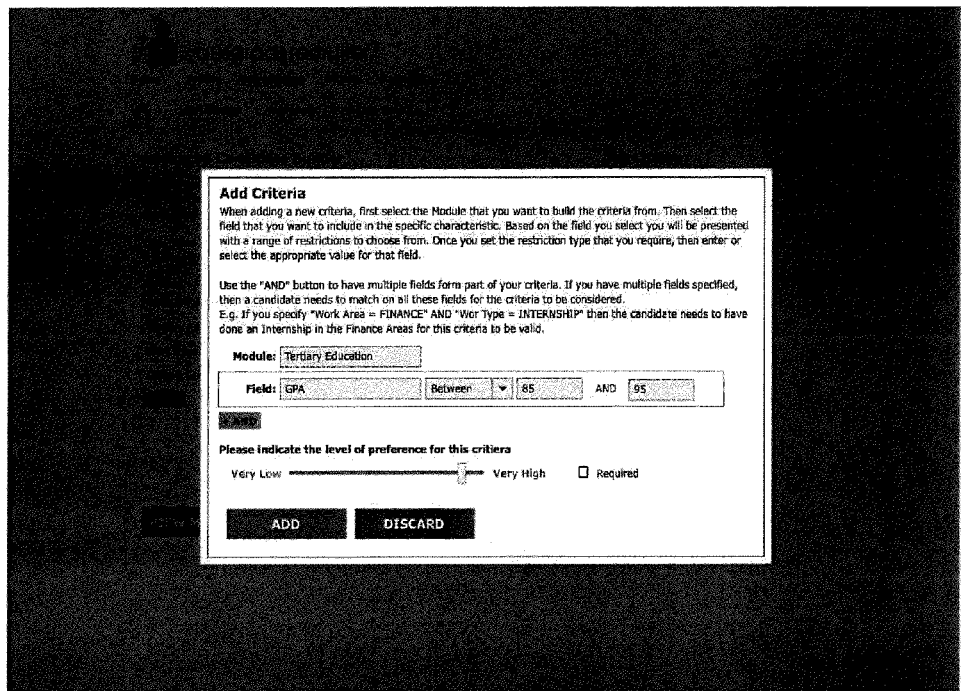
Figure 25:
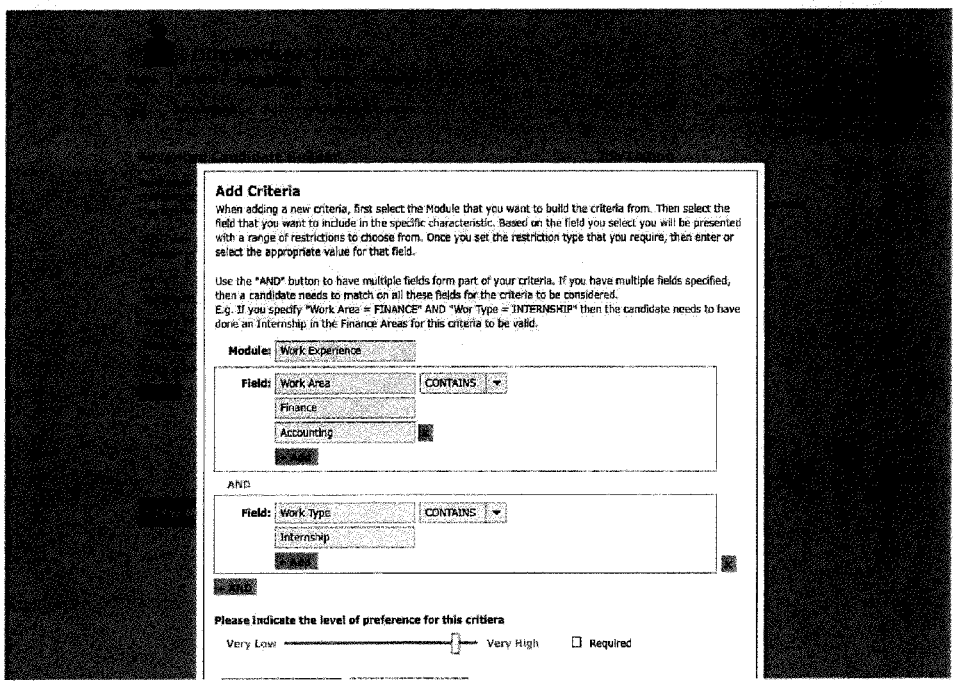
Figure 26:

The position generation process 600 includes an advanced model candidate builder screen, as shown in FIGS. 23, 24 and 25, in which individual rules can be entered. The position generation process 600 can also include an interface for importing rules, also referred to as "candidate criteria" as shown in FIG. 26.

Figure 27:
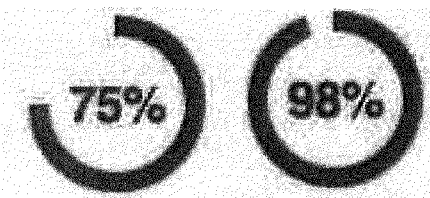
FIG. 27 is an example screen shot displayed in the matching process.

The metrics and scores of the matching process 700 can be shown using a dynamically generated circular graph which is highly understandable for determining and comparing suitability of candidates and positions, for example the circular graph shown in FIG. 27 which includes an arch representing the matching metric as a percentage of the complete circle, and a number representing the matching metric as a percentage in the centre of the circular graph.

Figures 28, 29:
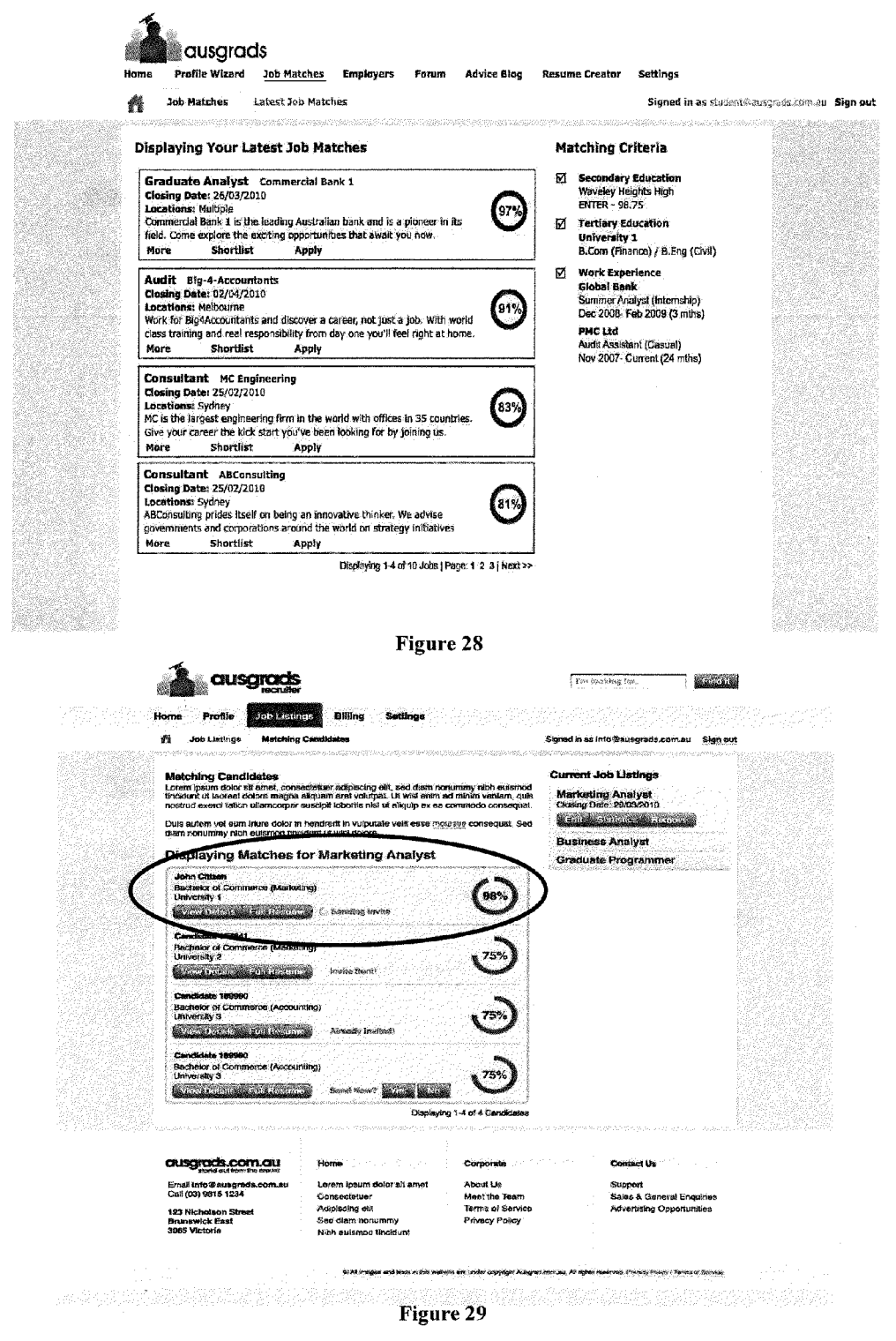

The position matching process 800 generates a listing of position matches, e.g., as shown in FIG. 28.

Figure 30:
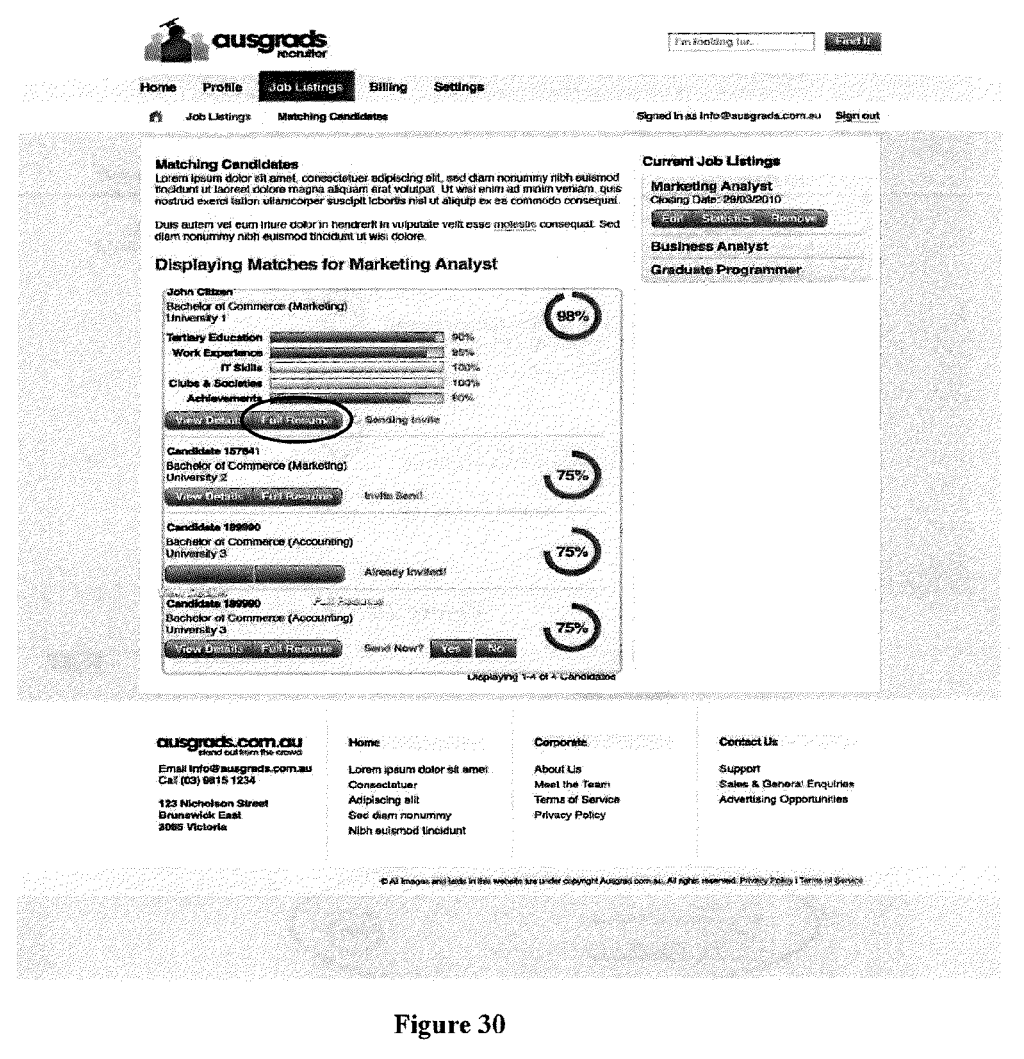
Figure 31:
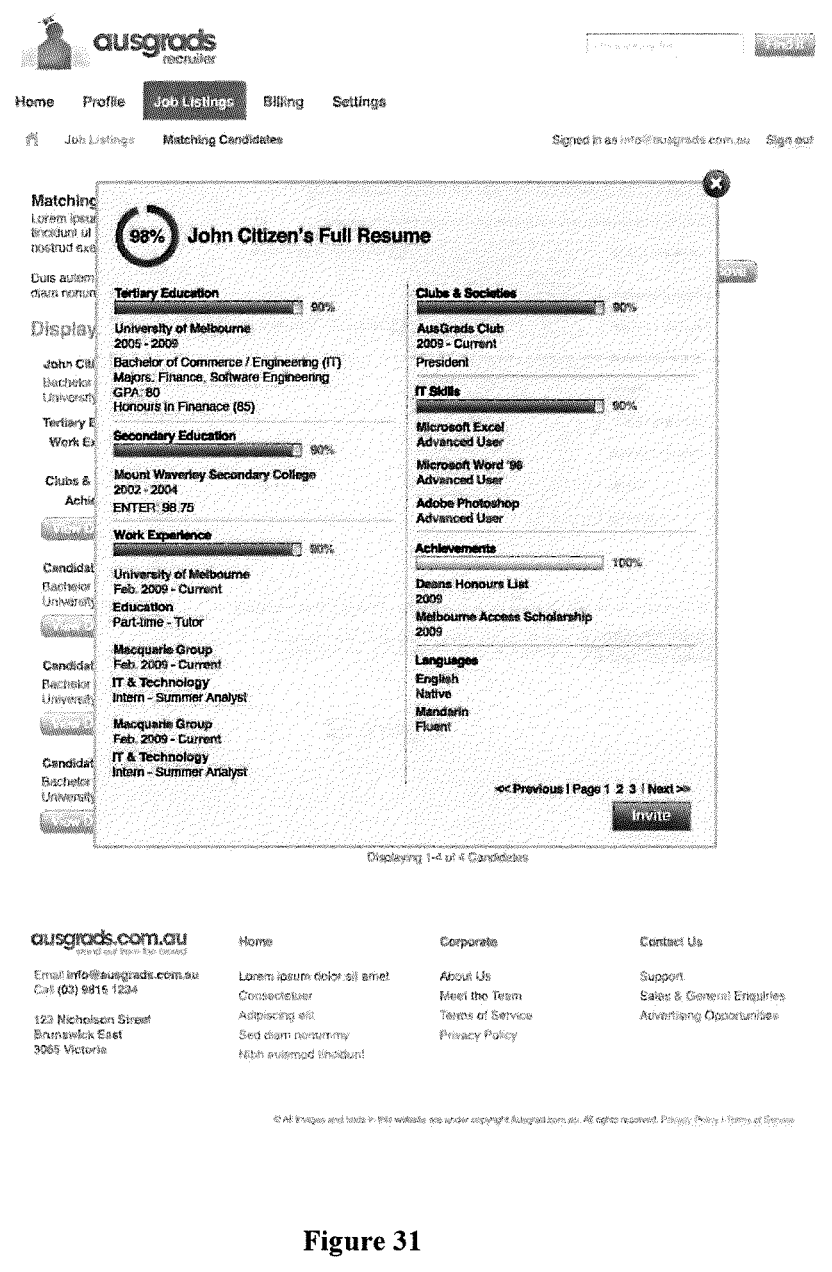

The résumé matching process 900 generates data for a series of interfaces, as shown in FIGS. 29 to 31, including: a ranking of matching candidates and their metrics (FIG. 29), a display of details, specifically the matching modules and their individual matching metric values, of a selected candidate (FIG. 30), and a pop-up view of detailed information of a candidate's résumé, including the modules, the respective metrics and details of attributes in the modules, including natural language descriptions (FIG. 31).

Example Embodiment

An example embodiment of the recruiting system 100 is described hereinafter, which includes details of the implementation of the recruiting system 100 with application to candidates who have recently, or will recently, complete their studies, such as students.

The example system searches and matches the job position with compatible candidates available from the system's database, ranking each candidate based on his/her perceived compatibility to the position, and vice versa. Again, this searching, matching, and ranking is performed by the matching process described here. Hence, the matching process is responsible for the searching, matching, and ranking for the following two cases: generating a list of suitable graduate job positions for a given candidate, and generating a list of compatible candidates for a given job position. A "graduate" refers to a person who is a university student (at any year level), a university graduate, or a recent graduate.

Each candidate creates his/her own student profile, which contains all of the job-related personal information that the candidate enters into the example system. The student profile contains no fields itself; instead, it acts as a container for the various modules that the candidate chooses to fill in. A module represents a grouping of related fields and their related single or multiple values, with each value being one of the following types: Integer, String, Date, Boolean, or Double.

For example, the Basic Information module contains fields such as the prospective candidate's: First and last names, Date of birth, City of residence, and Citizenship and residency status.

To avoid data redundancy, the fields of each module must be distinct from the fields of all other modules available within the system. Apart from a core set of modules whose fields the candidate must fill in completely in order to successfully create a student profile, filling in the fields of other modules is optional. Additionally, to cater for the variation amongst job application procedures amongst companies, graduate recruiters can request for additional modules to be added to the system. Multiple sub records, which are non-unique subunits of input data, can be contained within a single module, and they are used whenever multiple groups of related data needs to be inputted. The fields within a subrecord are known as subfields, and their corresponding values are known as subvalues. Each subvalue can take the same types as the values defined above. For example, for the Work Experience module, candidates need to be able to input information regarding their past and present positions, with each position entry requiring at least the following details: Position title, Company, Start Date, End Date, and Description.

Each of the position entries can be encapsulated into a subrecord, such that each Work Experience module can contain multiple Work Entry subrecords. Unlike in the case for modules, subrecords are non-unique and multiple subrecord instances of the same type can be contained within a single module.

As an example, consider the following student profile for a candidate currently studying a combined Bachelor of Software Engineering and Science (Physics) at the University of Melbourne:

1. [Module] Basic Information: First Name: Simon; Last Name: Liu; Email Address: simon@mycorp.com.au; Address: 1 Myname Avenue; Suburb: Balwood; State: Victoria; Postcode: 3100; Mobile Number: 0400 000 000; Residency: Australian Citizen; Willing to Relocate: Yes;
2. [Module] Secondary Education: High School: Launceston College; City: Launceston; State: Tasmania; Start Date: February 2003; End Date: January 2004; ENTER Score: 99.75;
3. [Module] Tertiary Education: University: Tokyo Institute of Technology; Start Date: September 2005; End Date: August 2006; Average Grade: 85;
    (a) [Subrecord] Degree Entry: Degree Type: Exchange; Majors: Computer Science;
    (b) [Subrecord] Subject Information: Year: 2005; Subject: Natural Language Processing; Grade: A;
    (c) . . .
4. [Module] Tertiary Education: University: University of Melbourne; Start Date: March 2004; End Date: December 2009; Average Grade: 80;
    (a) [Subrecord] Degree Entry: Degree Type: Bachelor of Engineering; Majors: Software Engineering, Computer Science;
    (b) [Subrecord] Degree Entry: Degree Type: Bachelor of Science; Majors: Physics;
    (c) [Subrecord] Subject Information: Year: 2004; Subject: 640-121 Mathematics A; Grade: 75;
    (d) . . .
5. [Module] Work Experience: Number of Positions: 2; Total Work Time: 4 Months;
    (a) [Subrecord] Work Entry: Company: Macquarie Group; Work Type: Internship; Start Date: December 2008; End Date: February 2009; Area: Technology; Position Title: IT Analyst Intern;
    (b) [Subrecord] Work Entry: Company: MyCorp; Work Type: Full-Time; Start Date: November 2009; End Date: (Blank); Area: Technology; Position Title: Director (Business Relations).

As can be seen, this prospective candidate has filled in four distinct modules: Basic Information, Secondary Education, Tertiary Education, and Work Experience, with the Tertiary Education module being filled in twice due to him having studied at two different universities (Tokyo Institute of Technology and the University of Melbourne). By design, the Basic Information and Secondary Education modules do not contain any subrecords, however the Tertiary Education and Work Experience modules do. Graduate recruiters can request for additional modules to be created by prototyping the layout of the new module using the module construction facility, and then submitting it for approval. If the administrators deem the module sufficiently useful for other companies/graduate job positions, they will approve the new module, causing the module to be added to the database, thus allowing candidates to fill in its fields. Custom modules can also be created on an ad-hoc basis by manually creating the necessary database structures and PHP pages.

Similarly, each employer maintains their own employer profile, which contains a brief description of the employer, and acts as a container for the graduate job positions posted by the employer's graduate recruiters. The employer profile can contain fields such as: Employer name, Employer logo, Employer description, Billing details, and Contact details.

Each graduate job position is represented by a position, which contains general details regarding the particular graduate job position, such as the position's: Title, Location, Application closing date, Commencement date, and Description.

In addition, each position specifies details on its model candidate in the form of rules, which are weighted predicates used by the matching process to match and rank a given student profile and position. An example set of rules could be that for this position, it is highly important that candidates possess a GPA of at least 75, and that it is moderately important that candidates have a background in Finance. Translating these two natural language rules into predicates yields:

$$r_1 = \{m_1 = \text{Tertiary Education}; \rho_1 := (\text{GPA} \geq 75); w_1 = 0.9\}$$

$$r_2 = \{m_2 = \text{Tertiary Education}; \rho_2 := (\text{Majors} = \text{Finance}); w_2 = 0.5\}$$

Where $r_i$ denotes the $i^{th}$ rule, and $m_i$, $\rho_1$, and $w_i$ denote the module, predicate, and weighting associated with rule i, respectively. A more detailed explanation of these rules is given in the next section.

As an example, consider the following hypothetical employer profile for Macquarie Group Limited:
1. Employer Details: Employer Name: Macquarie Group Limited; Employer Logo: macquarie_logo.jpg; Employer Description: A global investment banking and diversified financial services group, providing banking, financial, advisory, and investment services to investors, corporations, and governments. It is the pre-eminent Australian investment bank and has its global headquarters located in Sydney; Contact Details: http://www.macquarie.com.au/.
2. [Position] First Position:
   Title: Graduate IBD Analyst
   Location: Melbourne, Sydney
   Application Closing Date: 24 Dec. 2009
   Commencement Date: 1 Mar. 2009
   Description: Work on pitch books.
   Model Candidate:
   (a) Candidates must possess a degree in Commerce or Law.
   (b) Highly important for candidates to have a GPA of at least 80.
   (c) Highly important that candidates are completing their degrees at a reputable university.
   (d) etc. . . .
3. [Position] Second Position:
   Title: Graduate IT Analyst
   Location: Sydney
   Application Closing Date: 24 Dec. 2009
   Commencement Date: 1 Mar. 2009
   Description: Implement asset management platforms.
   Model Candidate:
   (a) Candidates must possess a degree in Software Engineering, Computer Science, IT, or Electrical Engineering.
   (b) Highly important for candidates to have a GPA of at least 80.
   (c) Moderately important that candidates are familiar with UNIX, shell scripting, and SQL.
   (d) . . .

A summary of the structures of recruiter and student profiles is given in FIG. 3.

Model Candidate Rules

Each graduate job position requires the specification of the model candidate, which is the set of ideal attributes/characteristics graduate recruiters look for in the candidates for that particular position. These attributes/characteristics are expressed as weighted rules of the following form:

$$r_i = \{m_i; \rho_i; w_i\} \quad (1)$$

Where $r_i$ denotes the $i^{th}$ rule within the position's model candidate, $m_i$ specifies the module that rule i acts on, $\rho_i$ is the predicate for this rule that acts on the fields and values within module $m_i$ (each predicate refers to the fields and values of one module), and $0 \leq w_i \leq 1$ in increments of $\Delta w = 0.1$ is the rule's associated weighting. Hence, each rule is comprised of the following three components:
1. The module whose fields and values the predicate is acting on.
2. The predicate that evaluates the specified fields and values within the given module. Attributes/characteristics that graduate recruiters find desirable within candidates for the given graduate job position are expressed as predicates, such that these predicates evaluate to true for candidates that possess these desirable traits.
3. The weighting that indicates the importance of this rule to the position's model candidate, with w=0 indicating that this rule is of no importance, and w=1 indicating that this rule is of absolute importance (i.e., only candidates for which the corresponding predicate evaluates to true are considered).

Each predicate $\rho$ can take the following four forms:
1. Binary Predicate: Defined as:

$$[\text{field}][\text{binary-op}][\text{value}] \quad (2)$$

Where [field] specifies the field/subfield within the candidate's given module/subrecord whose corresponding value/subvalue is to be compared, [binary-op] is the binary operator that will perform the comparison, and [value] is the value to be compared to. The value of [field] must be of the same type as [value]. The = and ≠ binary operators can take all possible value types (that is, Integer, String, Date, Boolean, and Double), however the <, ≤, >, and ≥ binary operators are only able to take Integer, Date, and Double value types. Hence, [binary-op] can take one of the following binary operators:

| Binary Operator | Enumeration Constant |
| --- | --- |
| = | EQUALS |
| ≠ | NOT_EQUALS |
| < | LESS |
| ≤ | LESS_EQUALS |
| > | GREATER |
| ≥ | GREATER_EQUALS |

Binary predicates are evaluated by finding, within the given module, the fields and subfields of a candidate that match the [field] specified. The values and subvalues of these fields and subfields are then compared to [value] using the binary operator given by [binary-op].

2. Ternary Predicate: Defined as:

$$[\text{field}][\text{ternary-op}]([\text{value1}],[\text{value2}]) \quad (3)$$

Where [field] specifies the field/subfield within the candidate's given module/subrecord whose corresponding value/subvalue is to be compared, [ternary-op] is the ternary operator that will perform the comparison, and [value1]≤[value2] are the two values to be compared to. [value1] must always be less than or equal to

[value2], and the value of [field] must be of the same type as both [value1] and [value2]. This predicate form can take the following value types: Integer, Date, or Double. Specifically, the ternary predicate form cannot take String and Boolean value types. Denoting [value1] as $v_1$ and [value2] as $v_2$, [ternary-op] can take one of the following ternary operators:

| Ternary Operator | Enumeration Constant |
|---|---|
| $v_1 \leq [\text{field}] \leq v_2$ | BETWEEN |
| $[\text{field}] < v_1 \vee [\text{field}] > v_2$ | NOT_BETWEEN |

Ternary predicates are evaluated by finding, within the given module, the fields and subfields of a candidate that match the [field] specified. The values and subvalues of these fields and subfields are then compared to [value1] and [value2] using the ternary operator given by [ternary-op].

3. List Predicate: Defined as:

$$[\text{field}][\text{list-op}]\{[\text{value1}],[\text{value2}],\ldots,[\text{valuen}]\} \quad (4)$$

Where [field] specifies the field/subfield within the candidate's given module/subrecord whose corresponding value/subvalue is to be compared, [list-op] is the list operator that will perform the comparison, and [value1], [value2], ..., [valuen] are the values to be compared to. All values [value1], [value2], ..., [valuen] must be of the same value type, and the value of [field] must also be of this type. This predicate form can take the following value types: Integer, String, Date, Double. Specifically, the list operator form cannot take the Boolean value type. [list-op] can take one of the following list operators:

| List Operator | Enumeration Constant |
|---|---|
| $\in$ | IN |
| $\notin$ | NOT_IN |

List predicates are evaluated by finding, within the given module, the fields and subfields of a candidate that match the [field] specified. The values and subvalues of these fields and subfields are then compared to [value1], [value2], ..., [valuen] using the list operator given by [list-op].

4. Implies Predicate: Defined as:

$$[\text{if-pred}] \rightarrow [\text{pred1}] \wedge [\text{pred2}] \wedge \ldots \wedge [\text{predn}] \quad (5)$$

Where [if-pred] denotes the predicate for the if clause of the implies predicate, and [pred1], [pred2], ..., [predn] denotes the individual predicates that comprise the body of the implies predicate. To prevent excessive execution time, the maximum number of predicates in the body is set to 10. All of these constituent predicates can take any of the previous three predicate types; as predicate nesting is forbidden, none of [pred1], [pred2], ..., [predn] can be another implies predicate.

Implies predicates are interpreted differently to the other three predicate types, in that they model if statements. Within the given module of a candidate, if the predicate given by [if-pred] evaluates to true for one of the module instance's fields, then [pred1], [pred2], ..., [predn] are evaluated in turn against the fields of that particular module instance. Only if all predicates in the body evaluate to true does the entire implies predicate evaluate to true. On the other hand, if the predicate given by [if-pred] evaluates to true for one of the subrecord instance's subfields within the given module, then [pred1], [pred2], ..., [predn] are evaluated in turn against the subfields of that particular subrecord instance. Only if all predicates in the body evaluate to true does the entire implies predicate evaluate to true. Of course, if [if-pred] evaluates to false for the given module of a candidate, the entire implies predicate evaluates to false, and so the predicates in the body must not be evaluated.

As an example, consider a hypothetical Graduate IT Analyst position at Deutsche Bank whose model candidate attributes/characteristics are as follows:

1. Candidates must be completing a degree in either Software Engineering, Computer Science, IT, or Electrical Engineering.
2. Candidates must possess an active interest in Finance.
3. It is highly important that candidates are completing their degrees at a reputable university.
4. It is highly important that candidates have an average grade of at least 80.
5. It is highly important that candidates are familiar with UNIX, shell scripting, SQL, and Java.
6. It is highly important that candidates have prior work experience.
7. It is moderately important that candidates have completed an internship within the financial services industry.
8. It is somewhat important for the candidate to have a major in Finance.

These natural language descriptions can be converted into candidate model rules that the matching process can then use to search, match, and rank results by. For the first attribute/characteristic, it is clear that we require a rule targeting the Tertiary Education module. A list predicate is also necessary, and the weighting for this rule should be set to w=1 as the attribute/characteristic is essential for successful candidates. Hence we have:

$$r_1 = \{m_1; \rho_1; w_1\}$$

Where:

$$m_1 = \text{Tertiary Education}$$

$$\rho_1 := (\text{degree} = \{\text{Software Engineering,Computer Science,IT,Electrical Engineering}\})$$

$$w_1 = 1$$

The second attribute/characteristic is similar, except that the rule must target the Interests module, and a binary predicate must be used to match for the value of the "interest" field being Finance:

$$r_2 = \{m_2 = \text{Interests}; \rho_2 := (\text{interest}=\text{Finance}); w_2 = 1\}$$

The third attribute/characteristic requires a rule that targets the Tertiary Education module, looking for the names of reputable universities such as the University of Melbourne and Monash University. Assuming the term "highly important" translates to a weighting of w=0.8, we have:

$$r_3 = \{m_3; \rho_3; w_3\}$$

Where:

$$m_3 = \text{Tertiary Education}$$

$\rho_3:=(university=\{University\ of\ Melbourne, Monash\ University, ...\})$ $w_3=0.8$ The fourth attribute/characteristic can be translated in a straightforward manner to:

$r_4=\{m_4=Tertiary\ Education; \rho_4:=(average\_score \geq 80); w_4=0.8\}$

The fifth attribute/characteristic requires multiple rules that target the Technical Skills module, with each rule containing a binary predicate that checks the "skill" field for UNIX, shell scripting, SQL, and Java:

$r_5=\{m_5=Technical\ Skills; \rho_5:=(skill=UNIX); w_5=0.8\}$ $r_6=\{m_6=Technical\ Skills; \rho_6:=(skill=Shell\ Scripting); w_6=0.8\}$ $r_7=\{m_7=Technical\ Skills; \rho_7:=(skill=SQL); w_7=0.8\}$ $r_8=\{m_8=Technical\ Skills; \rho_8:=(skill=Java); w_8=0.8\}$ For the sixth attribute/characteristic, the term "prior work experience" is equivalent to saying "at least one previous job". Hence, the following rule can be generated:

$r_9=\{m_9=Work\ Experience; \rho_9:=(num\_jobs \geq 1); w_9=0.8\}$

The seventh attribute/characteristic requires the use of an implies predicate that tests whether a candidate has completed an internship, and if so, whether that internship was undertaken at a company within the financial services industry. Assuming the term "moderately important" translates to a weighting of w=0.5, we have:

$r_{10}=\{m_{10}; \rho_{10}; w_{10}\}$

Where:

$m_{10}$=Work Experience $\rho_{10}:=(job\_type=Internship \rightarrow work\_area=Financial\ Services)$ $w_{10}=0.5$ Finally, the eighth attribute/characteristic can be translated relatively straightforwardly into (assuming the term "somewhat important" translates to a weighting of w=0.2):

$r_{11}=\{m_{11}=Tertiary\ Education; \rho_{11}:=(major=Finance); w_{11}=0.2\}$

Hence the eight natural language model candidate attributes/characteristics for the hypothetical Graduate IT Analyst position translate into eleven model candidate rules that can be interpreted and used by the matching process.

Matching Metrics

Given a rule r={m; ρ; w}, a valid predicate is defined as follows. For the binary, ternary, and list predicate types, a valid predicate is one where the predicate's value or subvalue corresponding to the [field] specifier (defined in equations (2) to (4)) within the given module m of the candidate's student profile is non-empty. For the implies predicate type, a valid predicate is one where every predicate contained within the implies predicate is valid. That is, every one of [if-pred], [pred1], [pred2], ..., [predn] defined in equation (5) is valid. An invalid predicate is a predicate that is not valid. Hence, a valid rule is defined as a rule containing a valid predicate, and similarly, an invalid rule is defined as a rule containing an invalid predicate. For example, given the following student profile fragment for a candidate:

1. [Module] Tertiary Education:
    1. University: (Blank)
    2. Start Date: March 2004
    3. End Date: December 2009
    4. Average Grade: (Blank)
    5. Subrecords:
        (a) [Subrecord] Degree Entry:
            a. Degree Type: Bachelor of Commerce
            b. Majors: (Blank)
2. [Module] Work Experience:
    1. Number of Jobs: 1
    2. Total Work Time: 3 Months
    3. Subrecords:
        (a) [Sub record] Work Entry:
            a. Company: CBA
            b. Work Type: Internship
            c. Start Date: December 2008
            d. End Date: February 2009
            e. Area: (Blank)
            f. Job Title: (Blank)

And the following set of model candidate rules:

$r_1=\{m_1=Tertiary\ Education; \rho_1:=(university=RMIT); w_1=0.8\}$ $r_2=\{m_2=Tertiary\ Education; \rho_2:=(degree=Public\ Relations); w_2=0.9\}$ $r_3=\{m_3=Work\ Experience; \rho_3:= (job\_type=Internship \rightarrow work\_area=HR); w_3=0.8\}$ Then we can see that only rule $r_2$ is valid: all others are invalid: the student profile's "University" field is empty, invalidating rule $r_1$, and the "Area" subfield within the Work Entry subrecord of the Work Experience module is also empty, invalidating rule $r_3$. Note that even though a rule is valid, it does not mean that the predicate for that rule will evaluate to true. For example, even though rule $r_2$ above is valid (the "Degree Type" subfield within the Degree Entry subrecord of the Tertiary Education module is non-empty), $r_2$ evaluates to false for this student profile since a Bachelor of Commerce degree is not related to Public Relations.

Given a student profile and a position with its set of N model candidate rules $\{r_i\}$, with the $i^{th}$ rule $r_i$ defined as $r_i=\{m_i; \rho_i; w_i\}$, the raw matching score $M_{raw}$ is defined as the matching score between the given student profile and the given position, and is given by:

$$M_{raw} = \sum_{i=1}^{N_{valid}} \sum_{j=1}^{n(m)_i} w_i^j \qquad (6)$$

Where $0 \leq N_{valid} \leq N$ is the number of valid rules for the given student profile, $n(m)_i$ is the number of fields and subfields in module $m_i$ of the given student profile that the $i^{th}$ rule evaluated to true on, and $w_i^j$ is the weighting associated with the $i^{th}$ rule raised to the power of j.

The total matching score $M_{total}$ is defined as the perfect matching score between the student profile and the given position, in which all valid rules evaluated to true at least once, and is given by:

$$M_{total} = \sum_{i=1}^{N_{valid}} \alpha_i \qquad (7)$$

Where $\alpha_i$ for the $i^{th}$ rule is defined as:

$$\alpha_i = \begin{cases} w_i & \text{for } n(m) = 0 \\ \sum_{j=1}^{n(m)_i} w_i^j & \text{for } n(m) \neq 0. \end{cases} \quad (8)$$

The relevance $0 \leq R \leq 1$ of the student profile to the position can be calculated from equations (6) and (7) via:

$$R = \frac{M_{raw}}{M_{total}} \quad (9)$$

Multiplying R by 100 yields a percentage value that can be displayed on the system's user interface frontend. The accuracy $0 \leq A \leq 1$ of the relevance score (also referred to as the relevance "metric") can be determined by dividing the number of rules considered (i.e., the number of valid rules for the given student profile $N_{valid}$) by the total number of model candidate rules for the given position N:

$$A = \frac{N_{valid}}{N} \quad (10)$$

Again, multiplying A by 100 yields a percentage value that can be displayed on the system's user interface frontend. For any given student profile and position, the matching process will return the tuple (R, A) containing the calculated relevance and accuracy metrics for the given pairing.

When sorting a set of (R, A) tuples for the student to positions or position to students case, we define suitability $0 \leq S \leq 1$ to be the average of the relevance and accuracy metrics:

$$S = \frac{R + A}{2} \quad (11)$$

By sorting (R, A) tuples according to their derived metric S, equal consideration for both relevance and accuracy are given, resulting in a more suitable sorting order for the list of returned matching results.

As an example, the following student profile fragment shows only the relevant modules, fields, subrecords, and subfields:

1. [Module] Secondary Education:
    1. High School: Box Hill High School
    2. City: Melbourne
    3. State: Victoria
    4. Start Date: February 1999
    5. End Date: December 2003
    6. ENTER Score: 95.75
2. [Module] Tertiary Education:
    1. University: Monash University
    2. Start Date: March 2004
    3. End Date: December 2008
    4. Average Grade: 75
    5. Subrecords:
        (a) [Sub record] Degree Entry:
            a. Degree Type: Bachelor of Commerce
            b. Majors: Accounting, Finance
            c. Minors: Japanese
3. [Module] Work Experience:
    1. Number of Jobs: 2
    2. Total Work Time: 3 Years
    3. Subrecords:
        (a) [Sub record] Work Entry:
            a. Company: Woolworths
            b. Work Type: Part-Time
            c. Start Date: January 2004
            d. End Date: (Blank)
            e. Area: Retail
            f. Job Title: Shelf Stacker
        (b) [Sub record] Work Entry:
            a. Company: Footscray Two Dollar Shop
            b. Work Type: Part-Time
            c. Start Date: January 2001
            d. End Date: (Blank)
            e. Area: Retail
            f. Job Title: Helping Out Mum and Dad A hypothetical Graduate Shelf Stacker position at a Coles supermarket can have following model candidate rules:

$r_1 = \{m_1 = \text{Secondary Education}; \rho_1 := (\text{ENTER} > 75); w_1 = 0.8\}$ $r_2 = \{m_2 = \text{Tertiary Education}; \rho_2 := (\text{degree} \in \{\text{Arts}, \text{Commerce}, \text{Science}, \ldots\}); w_2 = 0.2\}$ $r_3 = \{m_3 = \text{Work Experience}; \rho_3 := (\text{num\_jobs} \geq 1); w_3 = 0.7\}$ $r_4 = \{m_4 = \text{Work Experience}; \rho_4 := (\text{total\_work\_length} \geq 5 \text{ years}); w_4 = 0.7\}$ $r_5 = \{m_5 = \text{Work Experience}; \rho_5 := (\text{job\_type} = \text{Part Time} \rightarrow \text{work\_area} = \text{Retail}); w_5 = 0.9\}$ $r_6 = \{m_6 = \text{Interests}; \rho_6 := (\text{interest} = \text{Food}); w_6 = 0.6\}$ To determine the matching metrics (i.e., the relevance R and accuracy A) of the example student profile with respect to the hypothetical graduate job position given above, we first calculate the raw matching score using equation (6). Model candidate rules $r_1$ to $r_5$ are valid, however since the candidate's student profile does not contain the Interests module, rule $r_6$ is invalid and hence excluded from consideration. Rules $r_1$ to $r_3$ evaluate to true exactly once each, rule $r_4$ does not evaluate to true, while rule $r_5$ evaluates to true twice: one for the part-time Woolworths work entry, and once for the part-time Footscray Two Dollar Shop work entry. Hence, the raw matching score $M_{raw}$ is given by:

$$\begin{aligned} M_{raw} &= \sum_{i=1}^{N_{valid}} \sum_{j=1}^{n(m)_i} w_i^j \\ &= w_1 + w_2 + w_3 + (w_5 + w_5^2) \\ &= 0.8 + 0.2 + 0.7 + 0.9 + 0.9^2 \\ &= 3.41 \end{aligned}$$

In calculating the total matching score $M_{total}$, rule $r_4$ is incorporated into the calculations as it is a valid rule. Hence:

$$\begin{aligned} M_{total} &= w_1 + w_2 + w_3 + w_4 + (w_5 + w_5^2) \\ &= 0.8 + 0.2 + 0.7 + 0.7 + 0.9 + 0.9^2 \\ &= 4.11 \end{aligned}$$

Thus the relevance for this pairing is given by:

$$R = \frac{M_{raw}}{M_{total}}$$
$$= \frac{3.41}{4.11}$$
$$= 0.830$$

Or R=83.0%. Similarly, the accuracy for this pairing is given by:

$$A = \frac{N_{valid}}{N}$$
$$= \frac{5}{6}$$
$$= 0.833$$

Or A=83.3%. Therefore the matching metrics for this particular student profile and graduate job position is (R=0.830, A=0.833). When sorting the resulting list of matching metric results, the suitability for this pairing will be $$S = \frac{0.830 + 0.833}{2},$$

or S=83.2%

Example Matching Process

The matching process, which includes an example heuristic filtering process, is used in the following two use cases:
1. generating a list of suitable job positions for a given candidate's profile (also referred to as the "student to positions" case); and
2. generating a list of compatible candidates' profiles for a given job position (also referred to as the "position to students" case).

The high-level execution sequences for both cases are detailed hereinafter.

In the Student-to-Positions Case of the Example Matching Process, given a candidate's student profile (such as when a candidate has just completed filling in his/her student profile, and would now like to see the list of graduate job positions suitable for him/her), the heuristic filtering process must first prune the search space of all possible graduate job positions (which could number in the thousands to tens of thousands), in order to constrain matching process execution time to near real-time levels. This is done by applying a pre-filter with heuristic rules or criteria (also referred to as "heuristics") that filter the available job positions based on one or more of the following criteria:
1. The student's residency status: Only positions that allow for the student's residency status can be considered. For example, international students cannot apply for Australian Government jobs, as they require job applicants to be Australian citizens. Hence, given an international student's student profile, all Australian Government jobs should be eliminated from consideration.
2. Position location and the cities to which the student is willing to relocate: Only those positions that are located in the student's city of residence, or one of the cities to which the student is willing to relocate, are considered.
3. The student's degrees, including majors and minors: Assuming that the subjects listed in the student profile's list of majors and minors give a good indication of the areas of work that the candidate is interested in, only those positions that satisfy one of the following criteria are considered:
   a. Do not specify subject preferences.
   b. Specifies subject preferences that match at least one of the subjects listed in the student profile's list of majors and minors.
4. The type of university student: If the student is:
   a. Not in his/her penultimate or final year, and has yet to graduate: Only consider internship positions that are targeted towards all university students.
   b. In his/her penultimate year, or if the student is completing a five-year double degree and is currently in their third year of study: Only consider internships that are targeted towards all university students, as well as penultimate year internships.
   c. In his/her final year, or has graduated within the past year: Only consider graduate positions whose commencement date is later than the student's expected completion date.
   d. Recently graduated: Only consider positions that are specifically targeted towards recently graduated professionals.
5. Displayable and unexpired job positions: Only those job positions that are displayable (i.e., the current date exceeds the position's "display date" field) and whose application dates have not elapsed (i.e., the current date is less than the position's "expire date" field) are considered.

Only graduate job positions that satisfy these heuristics need to be considered further. These heuristics can reduce the search space of all possible graduate job positions from potentially thousands of records to just hundreds.

For each of these graduate job positions P in the pruned down list:
1. Load the set of model candidate rules $\{r_i\}$ corresponding to this position into memory.
2. Evaluate this set of rules $\{r_i\}$ against the given student profile according to equations (6) to (10) defined in the section Matching Metrics. Hence, for each position P considered, the tuple ($R_p$, $A_p$) containing the relevance and accuracy metrics for this particular pairing is produced.

Once all positions P have been processed to yield the set of tuples $\{(R_p, A_p)\}$, this set is then sorted in descending order according to the derived metric S (suitability) defined in equation (11). This results in the set of tuples $\{(R_p, A_p)\}$ being sorted such that graduate job positions with the highest relevance and accuracy are placed at the beginning of the set. The sorted set is then returned to the system's user interface frontend for display. In the Position-to-Students Case of the Example Matching Process, given a graduate job position (such as when a graduate recruiter has just added a new graduate job position to the example system, and would now like to view the list of suitable candidates for that position), the heuristic filtering process must first prune the search space of all possible student profiles (which could number in the hundreds of thousands), in order to constrain matching process execution time to acceptable levels. This is done by applying the heuristic filter that includes rules or criteria (also referred to as "heuristics") that filter the available job positions based on one or more of the following criteria:
1. The position's residency requirements: Only student profiles that meet the position's residency requirements are considered.
2. Position location and the cities to which the student is willing to relocate: Only those students who live in, or are willing to relocate to, the same cities in which the position is available are considered.
3. The position's areas of work: If the position specifies subject preferences and assuming that the subjects listed in the student profile's list of majors and minors give a good indication of the areas of work that candidates are interested in, only those student profiles whose list of majors and minors contain the position's areas of work are considered.
4. The type of university students being targeted: If the students being targeted by this job position are:
   a. Not in their penultimate or final year, and have yet to graduate: Only consider student profiles whose expected completion dates are still several years away. That is:
   [current_date]<[completion_date]−1 year
   b. In their penultimate year: Only consider student profiles whose expected completion dates are between 1 and 2 years away. That is:
   [completion_date]−2 years≤[current_date]≤[completion_date]−1 year
   c. In their final year: Only consider student profiles whose expected completion dates are less than a year away and earlier than the position's commencement date, or those student profiles whose completion dates are between now and a year ago. That is:

([completion_date] − 1 year < [current_date] < [completion_date] ∨ [completion_date] < [current_date] < [completion_date] + 1 year) ∧ ([completion_date] < [this.start_date])

d. Recently graduated: Only consider student profiles whose university completion dates were at least a year ago. That is:
   [current_date]>[completion_date]+1 year
5. Active and visible student profiles: Only those student profiles that have been active within the past 3 months (i.e., the candidate has logged onto the system's web site during the past 3 months) and are visible to graduate recruiters (i.e., the student profile's "is visible" field is set to "true") are considered.
6. Completely filled-in student profiles: Only those student profiles that have been completely filled-in in the relevant fields and modules are considered. "Completely filled-in" here refers to the candidate having filled in all of the fields that the model candidate rules for this position will look at. This will result in all model candidate rules being valid for all considered student profiles, ensuring an accuracy metric of 100% for each returned result.

Only student profiles that satisfy these heuristics need to be considered further. If, even after applying these 6 heuristics, the search space of all possible student profiles is not reduced to less than a selected number of records, the following heuristic is applied: the top n highest-weighted rules (excluding any rules containing implies predicates; converting rules containing implies predicates to SQL statements can be too difficult to warrant their consideration in the heuristic) associated with the given graduate job position are selected, and only those student profiles that successfully match all of these n rules are considered. Starting with n=1, n is iteratively increased in increments of 1 until the search space of all possible student profiles is reduced to less than the selected number of records (e.g., 200 records).

For each of these student profiles $\Re$ in the pruned down list:
1. Load the modules, its associated fields and values, subrecords, and its associated subfields and subvalues corresponding to this student profile into memory.
2. Evaluate the set of model candidate rules $r_i$ from the given graduate job position against the just-loaded student profile according to equations (6) to (10) defined in section 1.3. Hence, for each student profile $\Re$ considered, the tuple $(R_\Re, A_\Re)$ containing the relevance and accuracy metrics for this particular pairing is produced. Note that $A_\Re$ will always be equal to 1 due to the heuristic that considers only completely filled-in student profiles.

Once all student profiles $\Re$ have been processed to yield the set of tuples $\{(R_\Re, A_\Re)\}$, this set is sorted in descending order according to the derived metric S (suitability) defined in equation (11). This results in the set of tuples $\{(R_\Re, A_\Re)\}$ being sorted such that student profiles with the highest relevance are placed at the beginning of the set (accuracy does not need to be considered since $A_\Re=1$ for all considered student profiles). The sorted set is then returned to the system's user interface frontend for display.

Example Embodiment of the Matching Process

In the example embodiment, the matching process-related functions and accompanying database tables can be implemented using PHP5 and PostgreSQL 8.1. All front-end related functionality (such as the Model Candidate Wizard, Matching Metric Graph, and Interactive Résumé Viewer) can be implemented using XHTML 1.0, CSS 2.0 and 3.0, JavaScript, jQuery 1.3, and PHP5. The following description relates to the example embodiment for graduate recruitment of students; however, a person skilled in the art can recognise that embodiments can be used for recruitment of candidates who are not students.

[matchPositions( ): Implements the Student to Positions Case Matching Process]

The matchPositions( ) function can be implemented as follows:
1) Load the student profile corresponding to the given student ID into the student_profile variable.
2) Apply the heuristics defined for the student to positions case by executing the matchPositionsHeuristics( ) function using student_profile. Store the returned list of position IDs into the filtered_positions list.
3) For each position ID in filtered_positions:
   a. Load the set of model candidate rules associated with the currently considered position ID into pos_rules.
   b. Evaluate the set of model candidate rules stored in pos_rules with the student profile stored in student_profile by calling the evaluateRules( ) function. Append the resulting matching metric values for this particular student profile and job position combination into the retval list.

4) Sort the resulting matching metric values stored in retval, calculated for each student profile and job position combination considered, according to the derived suitability (S) metric.

5) Return retval.

The matchPositionsHeuristics( ) function can be implemented as follows:

1) Looking at the university student's most recent University start and end dates:

If the university student is not in his/her final year:
   If the university student is in his/her penultimate year, or is completing a double degree and is in his/her third year, assign position_type to denote penultimate internships.
   Otherwise, assign position_type to denote internships in general.

If the university student is in his/her final year, assign position_type to denote graduate positions.

Otherwise, assign position_type to denote recently graduated professionals.

2) Storing into the basic_query string, generate a SQL query fragment that selects only those job positions that meet all of the following criteria:

The position type of the job matches that given by position_type.

The display date of the job is less than or equal to the current date.

The expiry date of the job is greater than or equal to the current date.

If position_type denotes graduate job positions, then also ensure that the start date of the job position is greater or equal to the student profile's latest University end date.

3) Storing into the residency_query string, generate a SQL query fragment that selects only those job positions whose list of allowable residency statuses match the student profile's residency status.

4) Storing into the location_query string, generate a SQL query fragment that selects only those job positions whose list of work locations match either the student profile's city of residence, or the list of cities to which the university student is willing to relocate.

5) Merge and extract only those unique subject values from the student profile's list of majors and minors, storing the resulting list in merged_subjects. Then generate a SQL query that excludes job positions that specify a preference for majors and minors that are not included in merged_subjects. This can be done by generating two (2) SQL query fragments, stored in exclude_query and exclude_query2, respectively.

6) The complete SQL query string is then formed by concatenating all of the previous SQL query fragments together. Storing into the total_query string, the complete SQL query string is constructed by concatenating the following substrings:

| | |
|---|---|
| a. | "(" |
| b. | basic_query |
| c. | " INTERSECT " |
| d. | residency_query |
| e. | " INTERSECT " |
| f. | location_query |
| g. | ") EXCEPT ((" |
| h. | exclude_query |
| i. | ") EXCEPT (" |
| j. | exclude_query2 |
| k. | "))" |

7) The total_query string is then executed as a SQL query on the database. For each position ID returned (corresponding to a job position that passes the heuristics), append its value to the retval list.

8) Return retval.

The evaluateRules( ) function can be implemented as follows:

1) Set raw_score to 0.0, total_score to 0.0, and num_invalid to 0.

2) For each rule contained in the given job position's set of model candidate rules:
   a. Call the evaluatePredicate( ) function using the given student profile, the rule currently being considered, and the rule's module ID. Store the returned value in num_matches.
   b. Looking at the value of num_matches:
      If num_matches is less than or equal to 0 and the weighting of the rule currently being considered is equal to 1.0, return null.
      If num_matches is less than 0, increment num_invalid by 1 and continue onto the next iteration of this loop.
      If num_matches is equal to 0, increment total_score by the weighting of the rule currently being considered, before continuing to the next iteration of this loop.
      Otherwise, update the values of raw_score and total_score according to equations 6 and 7.

3) If total_score is equal to 0.0, return null.

4) Calculate the values for relevance (R) and accuracy (A) according to equations 9 and 10, respectively. Calling the appropriate constructor, return a new instance of MatchResult using the given student profile's student ID, the given job position's position ID, and the calculated values for relevance (R) and accuracy (A).

The evaluatePredicate( ) function can be implemented as follows: if the given predicate is a value predicate, then call and return the evaluateValuePredicate( ) function using the given student profile and target value predicate. Otherwise, call and return the evaluateImpliesPredicate( ) function using the given student profile, given implies predicate, and given module ID.

The evaluate ValuePredicate( ) function can be implemented as follows:

1) Set retval to 0.

2) Looking at whether the given value predicate refers to a field ID or not:
   If the value predicate refers to a field ID, retrieve all Value instances corresponding to the value predicate's field ID, storing them in values.
   If the value predicate refers to a subfield ID, retrieve all Value instances corresponding to the value predicate's subfield ID, storing them in values.

3) If the number of Value instances contained in values is equal to 0, return −1.

4) For each Value instance contained in values, call the evaluateValue ( ) function using the currently considered Value instance and the given value predicate. If this function returns true, increment retval by 1. The evaluateValue( ) function simply calls the given Value instance's appropriate member function contained in the Value class, returning true or false depending on whether the predicate successfully evaluated for the given Value instance.

5) Return retval.

The evaluateImpliesPredicate( ) function can be implemented as follows:

1) Call the isValidImpliesPredicate( ) function using the given student profile, given implies predicate, and given module ID. If false is returned, return −1. The isValidImpliesPredicate( ) function checks to see whether all of the if and body value predicates comprising the given implies predicate are valid for the given student profile.
2) Set if_pred to the given implies predicate's if predicate, and body_preds to the given implies predicate's list of body predicates.
3) If if_pred refers to a field ID, we have module instance-specific matching:
   a. Set total_matches to 0.
   b. For each module instance contained within the given student profile:
      i. If the currently considered module instance's module ID does not equal the given module ID, continue onto the next iteration of the loop.
      ii. Set inner_matches to 0. Then use the field ID extracted from if_pred to retrieve the currently considered module instance's field ID's value. Store the resulting value instance in value.
      iii. If value is equal to null, continue onto the next iteration of the loop.
      iv. If the evaluateValue( ) function returns false using value and if_pred, continue onto the next iteration of the loop.
      v. For each value predicate contained within body_preds:
         1. If the currently considered value predicate refers to a field ID:
            a. Retrieve the Value instance contained within the currently considered module instance, with the field ID corresponding to the currently considered value predicate's field ID. Store this in value.
            b. If value is equal to null, break out of the body_preds loop.
            c. If calling the evaluateValue( ) function using value and the currently considered value predicate returns true, increment inner_matches by 1.
         2. Otherwise, the currently considered value predicate must refer to a subfield ID:
            a. Retrieve the list of Value instances contained within the subrecord instances of the currently considered module instance, with the subfield ID corresponding to the currently considered value predicate's subfield ID. Store this in subvalues.
            b. If the number of value predicates contained within subvalues is equal to 0, break out of the body_preds loop.
            c. For each value instance contained within subvalues, call the evaluateValues( ) function along with the currently considered value predicate. If true is returned, increment inner_matches by 1 and break out of the body_preds loop.
      vi. If inner_matches is equal to the number of value predicates contained within body_preds, increment total_matches by 1.
   c. Return total_matches.
4) Otherwise, if_pred refers to a subfield ID and we have subrecord instance-specific matching:
   a. Set total_matches to 0.
   b. For each module instance contained within the given student profile:
      i. If the currently considered module instance's module ID does not equal the given module ID, continue onto the next iteration of the loop.
      ii. For each subrecord instance contained within the currently considered module instance:
         1. Set inner_matches to 0, and retrieve the Value instance contained within the currently considered subrecord instance, with the subfield ID corresponding to the subfield ID referred to by if_pred. Store this in value.
         2. If value is equal to null, continue onto the next iteration of the subrecord instance loop.
         3. If the evaluateValue( ) function returns false using value and if_pred, continue onto the next iteration of the subrecord instance loop.
         4. For each value predicate contained within body_preds:
            a. If the currently considered value predicate refers to a field ID, return −1 immediately.
            b. Retrieve the Value instance contained within the currently considered subrecord instance, with the subfield ID corresponding to the subfield ID referred to by the currently considered value predicate. Store this in value.
            c. If value is equal to null, break out of the body_preds loop.
            d. If the call to the evaluateValue( ) function using value and the currently considered value predicate returns true, increment inner_matches by 1.
         5. If inner_matches is equal to the number of value predicates contained within body_preds, increment total_matches by 1.
   c. Return total_matches.

[matchStudents( ) Implements the Position to Candidates Case Matching Process]

The matchStudents( ) function can be implemented as follows:
1) Load the set of model candidate rules associated with the given position ID into pos_rules.
2) Apply the heuristics defined for the position to students case by executing the matchStudentsHeuristics( ) function using the given position ID. Store the returned list of student IDs into the filtered_students list.
3) For each student ID in filtered_students:
   a. Load the student profile associated with the currently considered student ID into student_profile.
   b. Evaluate the set of model candidate rules stored in pos_rules with the student profile stored in student_profile by calling the evaluateRules( ) function. Append the resulting matching metric values for this particular student profile and job position combination into the retval list.
4) Sort the resulting matching metric values stored in retval, calculated for each student profile and job position combination considered, according to the derived suitability (S) metric.
5) Return retval.

The matchStudentsHeuristics( ) function can be implemented as follows:
1) Storing into the residency_query string, generate a SQL query fragment that selects only those student profiles whose specified residency status matches with the list of allowable residency statuses for this particular job position.
2) Storing into the location_query string, generate a SQL query fragment that selects only those student profiles whose city of residence or list of cities to which they wish to relocate matches with the list of allowable work locations for this particular job position.
3) Looking at whether the set of model candidate rules for this particular job position specifies a preference for majors or minors:
   If a preference for majors and minors is specified: Storing into the subject_query string, generate a SQL query fragment that selects only those student profiles that have specified major and minor subjects that match with this particular job position's majors or minors preferences.

Otherwise, leave the subject_query string empty.
4) Looking at the position type of this particular job position:

If this is a general internship position: Storing into the type_query string, generate a SQL query fragment that selects only those student profiles whose most recent University completion date is more than a year from the current date.

If this is a penultimate internship position: Storing into the type_query string, generate a SQL query fragment that selects only those student profiles whose most recent University completion date is between one (1) to two (2) years from the current date.

If this is a graduate position: Storing into the type_query string, generate a SQL query fragment that selects only those student profiles whose most recent University completion date is either less than a year away from the current date, or was less than a year ago.

If this is a recently graduated position: Storing into the type_query string, generate a SQL query fragment that selects only those student profiles whose most recent University completion date is less than the current date.

5) Storing into the active_visible_query string, generate a SQL query fragment that selects only those student profiles in which the access date is less than three (3) months ago, and the student profile is set to be visible to graduate recruiters.

6) The complete SQL query string is then formed by concatenating all of the previous SQL query fragments together. Storing into the total_query string, the complete SQL query string is constructed by concatenating the following strings:
   a. residency query
   b. "INTERSECT"
   c. location_query
   d. "INTERSECT"
   e. If the subject_query string is not empty, append subject_query, followed by "INTERSECT".
   f. type_query
   g. "INTERSECT"
   h. active_visible_query 7) The total_query string is then executed as a SQL query on the database. For each student ID returned (corresponding to a student profile that passes the heuristics), append its value to the retval list.

8) If the number of student IDs contained in retval is greater or equal to MAX_STUDENT_RESULTS (e.g., set to 200), cull the list of returned student IDs even further by calling the applyHighestWeightedRules( ) function using this particular job position's set of model candidate rules, as well as retval. Store the returned value in retval as well.

9) For each student ID in retval:
   a. Execute a SQL query to select the entire set of distinct, value-containing field IDs associated with the currently considered student profile. Store the resulting field IDs in field_ids.
   b. Execute a SQL query to select the entire set of distinct, subvalue-containing subfield IDs associated with the currently considered student profile. Store the resulting subfield IDs in subfield_ids.
   c. Determine whether the currently considered_student profile is completely filled in by calling the isFilledIn( ) function using this particular job position's set of model candidate rules, the field_ids list, and the subfield_ids list. Only if the isFilledIn( ) function returns true, does the student ID get appended to the final_list list.

10) Return final_list.

The applyHighestWeightedRules( ) function can be implemented as follows:
1) Sort the given set of model candidate rules according to their weighting.
2) For each rule contained within the set of model candidate rules, if the rule contains a value predicate (i.e., binary, ternary, or list predicate), append the value predicate to the sorted_predicates list.
3) Set retval to the given list of student IDs, and num_rules to 1.
4) While the number of student IDs stored in retval is greater or equal to MAX_STUDENT_RESULTS, and num_rules is less than or equal to the number of rules contained within the given set of model candidate rules:
   a. Call the applyNPredicates( ) function using the sorted_predicates list, retval, and num_rules. Store the returned value in retval.
   b. Increment num_rules by 1.
5) Return retval.

The applyNPredicates( ) function can be implemented as follows:
1) Storing into the query string, generate the SQL query fragment corresponding to the first element in the given value predicates list, which contains the value predicates sorted according to their parent rule's weighting. This SQL query fragment acts to further refine the list of student IDs by only considering those student profiles that match the target model candidate rule. This is done by calling the generatePredicateSQL( ) function with the first element in the given value predicates list, along with the given list of student IDs. As value predicates encompass binary, ternary, and list predicates, converting their predicate specifications to SQL query fragments is relatively straightforward.
2) Set i to 1.
3) While i is less than the number of rules in the set of model candidate rules, and is less than the number of value predicates contained in the given value predicates list, append to the following to the query string: the concatenation of "INTERSECT" and the result of the generatePredicateSQL ( ) function (which is passed the $i^{th}$ element of the given value predicates list and the list of student IDs).
4) The query string is then executed as a SQL query. Clear the retval list, and for each student ID returned from the SQL query, append it into retval.
5) Return retval.

The isFilledIn( ) function can be implemented as follows:
1) Retrieve all of the value predicates from the given set of model candidate rules, storing them into the predicates list. Value predicate-containing rules have their value predicates stored directly into predicates, however implies predicate-containing rules first need to be broken down into its components. The if predicate is then added to predicates, followed by each value predicate contained in the implies predicate's body predicates list.
2) For each value predicate contained in predicates:
   If the currently considered value predicate refers to a field ID, assign the value predicate's field ID to field_id. Then check to see whether the field_id$^{th}$ index of the given field IDs list is empty. If so, return false.

If the currently considered value predicate refers to a subfield ID, assign the value predicate's subfield ID to subfield_id. Then check to see whether the subfield_id$^{th}$ index of the given subfield IDs list is empty. If so, return false.

3) Return true.

[matchBreakdown( ) Implements the Module-by-Module Position-Candidate Matching Process]

The matchBreakdown( ) function can be implemented as follows:

1) Load the student profile corresponding to the given student ID into student_profile.
2) Load the set of model candidate rules associated with the given position ID into pos_rules.
3) Initialise module_rules to be an empty associative array with the key being the module ID, and the value being an array of rules.
4) For each rule contained within pos_rules' set of model candidate rules, use the currently considered rule's module ID as the key for module_rules, and append the currently considered rule to the associative array's corresponding value (which is an array of rules).
5) Initialise retval to be an empty associative array, with the key being the module ID, and the value being a MatchResult instance.
6) For each module ID key contained within the module_rules associative array:
   a. Set entry to be the associative array's corresponding value (which is an array of rules).
   b. If the number of rules contained within entry is 0, continue onto the next iteration of the loop.
   c. Call the evaluateRules( ) function using student_profile and entry, converted into a BasicPositionRules instance. This will evaluate only those model candidate rules associated with the currently considered module ID. If null is returned, create a new MatchResult instance with the relevance and accuracy metrics set to 0.0. In both cases, store the result in res.
   d. Set the key of retval to the currently considered module ID, and the value to res, which contains the newly-created MatchResult instance.
7) Return retval.

Example Matching Metric Graph

The Matching Metric Graph is a dynamically generated circular graph. The following procedure is followed whenever an instance of the Matching Metric Graph is to be generated and rendered:

1. Set the width and height integer variables to 280 px, and the resampled_width and resampled_height integer variables to 70 px. Let the percent integer variable (with a value between 0 and 100, inclusive) denote the value of the suitability metric to be rendered.
2. Create a true colour image of width given by the width variable and height given by the height variable. Store the returned true colour image in the img variable.
3. Find the coordinates for the centre of this image by integer dividing the width and height variables by two (2), to give the variables x_origin and y_origin, respectively.
4. Flood fill the image stored in the img variable using a light blue colour (hex colour code: #E5F7FD), starting from the origin (0, 0).
5. Calculate the angle to which the arc that will represent the given percentage value of the suitability metric must be drawn via:

$$\text{arc\_angle} = \text{percent}/100*360-90$$

Where it is assumed that 0° corresponds to the 3 o'clock position, and the arc is drawn in a clockwise manner.
6. Draw the 59 px-wide arc representing the percentage value of the suitability metric on the img variable by plotting two (2) pie graphs. The first pie graph is of a dark blue colour (hex colour code: #3399FF) with a width given by (width—1) and a height given by (height—1). It must be centred at the centre of the image (i.e.: at point (x_origin, y_origin)) and be drawn clockwise from the 12 o'clock position through to an angle given by the arc_angle variable. The second pie graph is of a light blue colour (hex colour code: #E5F7FD, same as the image's background) with a width given by (width—60) and a height given by (height—60). It must be centred at the centre of the image and be drawn clockwise from the 12 o'clock position through the entire 360°.
7. Using a 50 px Verdana font, write the value of the percent variable along with a trailing percent character ('%') to the image img using a left-to-right reading order. The y-coordinate for this text's basepoint is fixed to 160 px, while the corresponding x-coordinate is either 46 px, 70 px, or 90 px, depending on whether the percent variable is equal to 100, between 1 and 99 inclusive, or less than 10, respectively.
8. Create a true colour image of width given by the resampled_width variable and height given by the resampled_height variable. Store the returned true colour image in the resampled_img variable.
9. Copy and reduce the entire image stored in the img variable to fit the dimensions of the resampled_img variable. Free any memory associated with the img variable.
10. Set the HTTP header associated with the image stored in the resampled_img variable to indicate that this image must not be cached and that it is a PNG image.
11. Convert the image stored in the resampled_img variable into PNG format and free any memory associated with the resampled_img variable.

Example Interactive Résumé Viewer

The Interactive Résumé Viewer allows student profile information to be condensed and summarised succinctly, eliminating all irrelevant information, and only including actionable information that graduate recruiters can use to quickly and efficiently make recruitment decisions on. As such, the time required for recruiters to review individual job applicants can be decreased significantly, and all candidate profiles can be accessed through a single standard interface.

Given the unique identifier for a candidate profile (e.g., a student ID), the student profile is loaded. Then, for each module instance stored in the candidate profile, execute the following actions:

1. If this is an instance of the Tertiary Education module, generate the required output that only contains the following fields:
   University.
   Start and end dates.
   Degree(s).
   Majors and minors.
   GPA.
   Any honours undertaken.
   Then ensure that the resulting output is placed at the top of the Interactive Résumé Viewer's first column.

41

2. If this is an instance of the Secondary Education module, generate the required output that only contains the following fields:
   High school.
   Start and end dates.
   ENTER score.
Ensure that the resulting output is placed in the middle of the Interactive RésuméViewer's first column.

3. If this is an instance of the Work Experience module, iterate through each of its Work Component subrecord instances, generating the required output that only contains the following fields:
   Organisation.
   Start and end dates.
   Work area (Industry).
   Job title.
Ensure that the resulting output is placed at the bottom of the Interactive Résumé Viewer's first column.

4. Any instances of non-core modules such as IT Skills and Achievements are handled in a manner specific to that particular module type.

5. Concatenate all of the resulting output into a popup panel, and then render final Interactive Résumé Viewer instance.

Interpretation

Many modifications will be apparent to those skilled in the art without departing from the scope of the present invention.

The invention claimed is:

1. A recruiting system for use in determining suitability of at least one recruitment candidate for at least one job position, or suitability of at least one job position for at least one recruitment candidate, the system including at least one server configured to:
   access rule data representing:
      one or more rules associated with the position,
      at least one rule value for each rule, and
      one or more model attributes for each rule, the model attributes being associated with a model candidate for the position;
   access candidate data representing a candidate profile with one or more candidate attributes of the recruitment candidate;
   determine matching ones of the rules based on whether the candidate attributes match the model attributes of each rule; and
   generate data representing a matching metric value, representing the suitability of the recruitment candidate for the position, based on the rule values that correspond to the matching rules, wherein the matching metric value is based on a comparison between:
   a combination of the rule values that correspond to the matching rules, and
   a combination of the rule values that correspond to the rules associated with the position,
   and wherein the server is configured to:
   select valid ones of the rules based on whether the model attributes of each rule correspond to completed portions of the candidate profile;
   generate data representing a raw matching score based on a combination of the rule values that correspond to matching ones of the valid rules;
   generate data representing a total matching score based on a combination of the rule values that correspond to the valid rules; and
   generate data representing a relevance score of the matching metric value using a comparison between the total matching score and the raw matching score,
   wherein the server is configured to generate data representing an accuracy score of the matching metric value using a comparison between the number of the valid rules and the total number of the rules associated with the position, and
   wherein the matching metric value is determined based on the relevance score and the accuracy score.

2. The recruiting system of claim 1, wherein the server is configured to determine the suitability of a plurality of candidates for one position, and/or the suitability of a plurality of positions for one candidate.

3. The recruiting system of claim 1, wherein the rule data represent a predicate for each rule, wherein each predicate includes the model attributes of the corresponding rule, and wherein the predicate is used for the determining whether the candidate attributes match the model attributes of each rule.

4. The recruiting system of claim 1, wherein a subset of the rules and a subset of the candidate attributes are selected based on their correspondence to a portion of the candidate profile, and the matching metric value represents the suitability in relation to that portion.

5. The recruiting system of claim 1, wherein the server is configured to use an heuristic filter using position profile attributes and/or candidate profile attributes to select the rule data associated with the at least one job position, and/or the candidate data associated with the at least one recruitment candidate, from stored data representing all possible job positions and/or all possible recruitment candidates.

6. The recruiting system of claim 1, wherein the server is configured to generate user interface data for displaying the matching metric value as a corresponding fraction of a graphical object, and wherein the graphical object is a closed path, and the fraction corresponds to a fraction of length along the closed path.

7. The recruiting system of claim 1, including a client computing device, wherein the at least one server or the client computing device is configured to generate data for displaying the matching metric value to a user, and/or for ranking and displaying a plurality of candidates and/or positions using respective ones of the matching metric value.

8. A recruiting process for use in determining the suitability of at least one recruitment candidate for at least one job position, or the suitability of at least one job position for at least one recruitment candidate, the process including:
   accessing rule data representing:
      one or more rules associated with the position,
      at least one rule value for each rule, and
      one or more model attributes for each rule, the model attributes being associated with a model candidate for the position;
   accessing candidate data representing a candidate profile with one or more candidate attributes of the recruitment candidate;
   determining matching ones of the rules based on whether the candidate attributes match the model attributes of each rule; and
   generating data representing a matching metric value, representing the suitability of the recruitment candidate for the position, based on the rule values that correspond to the matching rules, wherein the matching metric value is based on a comparison between:
   a combination of the rule values that correspond to the matching rules, and
   a combination of the rule values that correspond to the rules associated with the position, and wherein the recruiting process comprises:
  selecting valid ones of the rules based on whether the model attributes of each rule correspond to completed portions of the candidate profile;
  generating data representing a raw matching score based on a combination of the rule values that correspond to matching ones of the valid rules;
  generating data representing a total matching score based on a combination of the rule values that correspond to the valid rules; and
  generating data representing a relevance score of the matching metric value using a comparison between the total matching score and the raw matching score,
wherein the process includes generating data representing an accuracy score of the matching metric value using a comparison between the number of the valid rules and the total number of the rules associated with the position, and
  wherein the matching metric value is determined based on the relevance score and the accuracy score.

9. The recruiting process of claim 8, wherein the rule data represent a predicate for each rule, wherein each predicate includes the model attributes of the corresponding rule, and wherein the predicate is used for the determining whether the candidate attributes match the model attributes of each rule.

10. At least one non-transitory computer-readable medium having stored thereon data which are used to perform the method of claim 8.

11. The recruiting system of claim 1, wherein the server is configured to:
  access data representing a plurality of available attributes for association with the model candidate in the recruiting system;
  generate user interface data representing the available attributes for display to a user of a client computing device;
  receive data representing a user selection of at least one attribute of the available attributes to be one of the model attributes, and a corresponding importance level of the attribute; and
  generate data representing at least one of the rules that includes the selected attribute and a corresponding rule value representing the importance level.

12. The recruiting system of claim 1, wherein the server is configured to:
  access data representing the candidate profile including identification details and the one or more candidate attributes; and
  generate user interface data representing the identification details and the corresponding matching metric value for the candidate.

* * * * *